United States Patent
Kim et al.

(10) Patent No.: US 10,712,847 B2
(45) Date of Patent: Jul. 14, 2020

(54) TOUCH SENSOR INTEGRATED TYPE DISPLAY DEVICE

(71) Applicant: LG Display Co., Ltd., Seoul (KR)

(72) Inventors: Cheolse Kim, Daegu (KR); Juhan Kim, Bucheon-si (KR); Jinseong Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 408 days.

(21) Appl. No.: 14/981,817

(22) Filed: Dec. 28, 2015

(65) Prior Publication Data
US 2016/0320886 A1 Nov. 3, 2016

(30) Foreign Application Priority Data

Apr. 30, 2015 (KR) .................. 10-2015-0061264
Dec. 8, 2015 (KR) .................. 10-2015-0174422

(51) Int. Cl.
*G06F 3/044* (2006.01)
*G06F 3/041* (2006.01)
(Continued)

(52) U.S. Cl.
CPC ............ *G06F 3/0412* (2013.01); *G06F 3/044* (2013.01); *G06F 3/047* (2013.01); *G06F 3/0416* (2013.01);
(Continued)

(58) Field of Classification Search
CPC ...... G06F 3/0412; G06F 3/044; G06F 3/0416; G06F 3/047; G06F 2203/04106; G09G 3/2096
See application file for complete search history.

(56) References Cited

U.S. PATENT DOCUMENTS 8,884,917 B2 * 11/2014 Seo .................. G06F 1/3262
345/174
8,994,687 B2 * 3/2015 Yeh .................. G06F 3/044
345/174
(Continued)

FOREIGN PATENT DOCUMENTS

CN 102681715 A 9/2012
CN 103425314 A 12/2013
(Continued)

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*
(Continued)

*Primary Examiner* — Jeff Piziali
(74) *Attorney, Agent, or Firm* — Fenwick & West LLP

(57) ABSTRACT

A touch sensor integrated type display device includes a display panel. The display panel includes a multiplexing unit that supplies a common voltage to touch/common electrodes of the display panel during a display driving period of one frame period of the display panel to display an image on the display panel. The multiplexing unit senses the touch/common electrodes using a self-capacitive method during a first touch driving period of the one frame period and a mutual capacitive method during a second touch driving period of the one frame period of the display panel to sense touch of the display panel.

20 Claims, 35 Drawing Sheets

(51) Int. Cl.
*G06F 3/047* (2006.01)
*G09G 3/20* (2006.01)

(52) U.S. Cl.
CPC . *G09G 3/2096* (2013.01); *G06F 2203/04106* (2013.01)

(56) References Cited

U.S. PATENT DOCUMENTS

| | | | |
|---|---|---|---|
| 9,128,574 B2* | 9/2015 | Song | G06F 3/044 |
| 9,285,910 B2* | 3/2016 | Kim | G06F 3/0412 |
| 9,329,739 B2* | 5/2016 | Jang | G06F 3/044 |
| 9,501,191 B2* | 11/2016 | Kim | G06F 3/044 |
| 9,830,025 B2* | 11/2017 | Han | G06F 3/0412 |
| 2012/0169660 A1 | 7/2012 | Seo | |
| 2013/0088459 A1 | 4/2013 | Yeh et al. | |
| 2013/0307793 A1 | 11/2013 | Song et al. | |
| 2014/0132558 A1 | 5/2014 | Jang | |
| 2014/0184543 A1 | 7/2014 | Kim et al. | |
| 2014/0210779 A1 | 7/2014 | Katsuta et al. | |
| 2015/0062062 A1 | 3/2015 | Han et al. | |
| 2015/0116263 A1 | 4/2015 | Kim | |
| 2016/0224095 A1 | 8/2016 | Jang | |

FOREIGN PATENT DOCUMENTS

| | | |
|---|---|---|
| CN | 103809824 A | 5/2014 |
| CN | 103914175 A | 7/2014 |
| CN | 104423757 A | 3/2015 |
| CN | 104571755 A | 4/2015 |
| JP | 2010-198586 A | 9/2010 |

OTHER PUBLICATIONS

European Partial Search Report, European Application No. 15202686.0, dated Sep. 6, 2016, 8 pages.
European Extended Search Report, European Application No. 15202686.0, dated Jan. 30, 2017, 14 pages.
State Intellectual Property Office of the People's Republic of China, First Office Action, Chinese Patent Application No. 201510996587.0, dated Jul. 4, 2018, fourteen pages.

* cited by examiner

TOUCH SENSOR INTEGRATED TYPE DISPLAY DEVICE

CROSS REFERENCE TO RELATED APPLICATIONS

This application claims the benefit of Korean Patent Application No. 10-2015-0061264 filed on Apr. 30, 2015 and Korean Patent Application No. 10-2015-0174422 filed on Dec. 8, 2015, each of which is incorporated by reference in its entirety.

BACKGROUND

Field of Technology

Embodiments of the invention relate to a touch sensor integrated type display device.

Discussion of the Related Art

In recent years, various input devices, such as a keyboard, a mouse, a track ball, a joystick, and a digitizer, have been used to allow users to interface with home appliances or information telecommunication devices. However, when the user makes use of these input devices, the user's dissatisfaction with the input devices increase because the user is required to learn how to use the input devices and the input devices occupy space. Thus, a demand for a convenient and simple input device capable of reducing erroneous operations is increasing. In response to the demand, a touch sensor was proposed to recognize information when the user inputs the information by directly touching the screen with his or her hand or a pen.

The touch sensor has a simple configuration capable of reducing the erroneous operations. The user can also perform an input action without using a separate input device and can quickly and easily manipulate a display device through the contents displayed on the screen. Thus, the touch sensor has been applied to various display devices.

The touch sensor used in the display device may be classified into an add-on type touch sensor, an on-cell type touch sensor, and an integrated type (or in-cell type) touch sensor depending on its structure. The add-on type touch sensor is configured such that the display device and a touch sensor module including the touch sensor are individually manufactured and then the touch sensor module is attached to an upper substrate of the display device. The on-cell type touch sensor is configured such that elements constituting the touch sensor are directly formed on the surface of an upper glass substrate of the display device. The in-cell type touch sensor is configured such that elements constituting the touch sensor are mounted inside the display device to thereby achieve a thin profile of the display device and increase the durability of the display device.

Among the above touch sensors, because the in-cell type touch sensor may share a common electrode of the display device as a touch electrode, a thickness of the display device may decrease as compared to the other type of touch sensors. Further, because the touch elements of the in-cell type touch sensor are formed inside the display device, the durability of the display device may increase. Hence, the in-cell type touch sensor has been widely used.

The in-cell type touch sensor can solve the problems generated in the add-on type touch sensor and the on-cell type touch sensor because of the advantages of the thin profile and the improvement in durability. The in-cell type touch sensor may be divided into a light type touch sensor and a capacitive touch sensor depending on a method for sensing a touched portion. The capacitive touch sensor may be subdivided into a self capacitive touch sensor and a mutual capacitive touch sensor.

The self capacitive touch sensor forms a plurality of independent patterns in a touch area of a touch sensing panel and measures changes in a capacitance of each independent pattern, thereby deciding whether or not a touch operation is performed. The mutual capacitive touch sensor crosses X-axis electrode lines (for example, driving electrode lines) and Y-axis electrode lines (for example, sensing electrode lines) in a touch/common electrode formation area of a touch sensing panel to form a matrix, applies a driving pulse to the X-axis electrode lines, and senses changes in voltages generated in sensing nodes defined as crossings of the X-axis electrode lines and the Y-axis electrode lines through the Y-axis electrode lines, thereby deciding whether or not a touch operation is performed.

In the mutual capacitive touch sensor, a mutual capacitance generated in touch recognition of the mutual capacitive touch sensor is very small, but a parasitic capacitance between a gate line and a data line constituting the display device is very large. Therefore, it is difficult to accurately recognize a touch position because of the parasitic capacitance.

Further, because a plurality of touch driving lines for a touch driving mode and a plurality of touch sensing lines for a touch sensing have to be formed on the common electrode for the multi-touch recognition of the mutual capacitive touch sensor, the mutual capacitive touch sensor requires a very complex line structure.

On the other hand, because the self capacitive touch sensor has a simpler wiring structure than the mutual capacitive touch sensor, touch accuracy of the self capacitive touch sensor may increase. Hence, the self capacitive touch sensor has been widely used, if necessary or desired.

A related art touch sensor integrated type display device is described below with reference to FIGS. 1 and 2. FIG. 1 is a plane view of a related art touch sensor integrated type display device, and FIG. 2 is a plane view showing a touch sensing location obtained by the touch sensor integrated type display device shown in FIG. 1.

Referring to FIG. 1, the related art touch sensor integrated type display device includes an active area AA, in which touch/common electrodes T11-T1a, T21-T2a, T31-T3a, T41-T4a, T51-T5a, T61-T6a, T71-T7a, and T81-T8a are disposed and data is displayed, and a bezel area BA positioned outside the active area AA. In the bezel area BA, various wires and a source and touch driving integrated circuit (IC) 10 are disposed.

The active area AA includes the plurality of touch/common electrodes T11-T1a, T21-T2a, T31-T3a, T41-T4a, T51-T5a, T61-T6a, T71-T7a, and T81-T8a divided in a first direction (for example, x-axis direction) and a second direction (for example, y-axis direction) crossing the first direction and a plurality of touch/common routing wires W11-W81, W12-W82, W13-W83, W14-W84, W15-W85, W16-W86, W17-W87, W18-W88, W19-W89, and W1a-W8a, which are respectively connected to the plurality of touch/common electrodes T11-T1a, T21-T2a, T31-T3a, T41-T4a, T51-T5a, T61-T6a, T71-T7a, and T81-T8a and are arranged in the second direction.

The plurality of touch/common electrodes T11-T11a, T21-T2a, T31-T3a, T41-T4a, T51-T5a, T61-T6a, T71-T7a, and T81-T8a in the active area AA are formed by dividing a common electrode of the display device, and thus operate as common electrodes in a display driving mode for displaying data and operate as touch electrodes in a touch driving mode for recognizing a touch location.

The bezel area BA positioned outside the active area AA includes the source and touch driving IC 10 and various wires. In the display driving mode, the source and touch driving IC 10 supplies display data to data lines (not shown) in synchronization with a drive of gate lines (not shown) of the display device and supplies a common voltage to the touch/common electrodes (or the common electrodes). In the touch driving mode, the source and touch driving IC 10 supplies a touch driving voltage to the touch/common electrodes and scans a change in a capacitance of each touch/common electrode before and after a touch operation, thereby calculating a touch location, at which the touch operation is performed. The various wires include the touch/common routing wires W11-W81, W12-W82, W13-W83, W14-W84, W15-W85, W16-W86, W17-W87, W18-W88, W19-W89, and W1a-W8a connected to the touch/common electrodes T11-T1a, T21-T2a, T31-T3a, T41-T4a, T51-T5a, T61-T6a, T71-T7a, and T81-T8a, the gate lines connected to the source and touch driving IC 10, the data lines, and the like.

Referring to FIG. 2, the touch/common electrodes T11-T1a, T21-T2a, T31-T3a, T41-T4a, T51-T5a, T61-T6a, T71-T7a, and T81-T8a respectively have touch sensing nodes S11-S1a, S21-S2a, S31-S3a, S41-S4a, S51-S5a, S61-S6a, S71-S7a, and S81-S8a, which are recognized as the touch location when the touch operation is performed.

The above-described related art touch sensor integrated type display device is configured so that the size of one touch/common electrode corresponds to the size of dozens of pixel electrodes and the touch/common electrodes are respectively connected to the touch/common routing wires. The number of touch/common electrodes is obtained by multiplying the number of touch/common electrodes positioned on one row and the number of touch/common electrodes positioned on one column. With a recent trend toward the large-sized display device, the display device becomes larger and larger and thus the number of touch/common electrodes sharply increases. When the number of touch/common electrodes sharply increases with the recent trend toward the large-sized display device as described above, the number of touch/common routing wires connected to the touch/common electrodes positioned on one column becomes more than the number of pixel electrodes positioned on one row in an area corresponding to each touch/common electrode. Hence, the touch/common routing wire not overlapping the data line results and thus an aperture ratio of the display device is reduced.

Further, when the touch/common routing wire is not connected to some of the touch/common electrodes so as to prevent the reduction of the aperture ratio, a touch location cannot be accurately recognized when the touch operation is performed on the touch/common electrode, to which the touch/common routing wire is not connected. Thus, there is a limit to the size of the display device, to which the related art touch sensor integrated type display device can be applied. Further, the number of channels of the source and touch driving IC 10 connected to the touch/common electrodes increases due to an increase in the number of touch/common routing wires, and thus the size of the readout integrated circuit increases. Hence, the manufacturing cost of the display device increases.

SUMMARY

Embodiments of the invention provide a touch sensor integrated type display device capable of solving the above-described problems.

In one aspect, there is a touch sensor integrated type display device comprising: a display panel including a plurality of data lines and a plurality of gate lines that cross the plurality of data lines, a plurality of touch/common electrodes arranged in a plurality of rows and a plurality of columns, and a plurality of touch/common routing wires that are each connected to a corresponding one of the plurality of touch/common electrodes, the display panel being time-division driven in a display driving period for displaying an image on the display panel and touch driving periods for sensing touch of the display panel; a multiplexing unit configured to supply a common voltage to the plurality of touch/common electrodes during the display driving period of one frame period of the display panel to display the image on the display panel, and the multiplexing unit configured to supply a touch driving voltage to the plurality of touch/common electrodes during the touch driving periods to sense touch of the display panel during the one frame period, and the multiplexing unit sensing the plurality of touch/common electrodes using both a self-capacitive method during a first touch driving period of the one frame period of the display panel and a mutual capacitive method during a second touch driving period of the one frame period of the display panel; and a touch controller configured to calculate a touch location based on sensing voltages from the plurality of touch/common electrodes.

In one aspect, a touch driver circuit that senses touch of a display panel including a plurality of touch/common electrodes positioned in a plurality of rows and columns, the touch driver circuit comprising: a multiplexing unit configured to: supply a common voltage to the plurality of touch/common electrodes via a plurality of touch/common routing wires during a display driving period of one frame period of the display panel, each of the plurality of touch/common routing wires connected to a corresponding one of the plurality of touch/common electrodes; drive the plurality of touch/common electrodes to sense touch using a self-capacitive method during a first touch driving period of the one frame period of the display panel by supplying via the plurality of touch/common routing wires a touch driving voltage to the plurality of touch/common electrodes, and receiving first sensing voltages from the plurality of touch/common electrodes via the plurality of touch/common routing wires to which the touch driving voltage was applied, each first sensing voltage received from a corresponding one of the plurality of touch/common electrodes via one of the plurality of touch/common routing wires that is connected to the corresponding one of the plurality of touch/common electrodes; and drive the plurality of touch/common electrodes to sense touch using a mutual-capacitive method during a second touch driving period of the one frame period of the display panel by supplying via the plurality of touch/common routing wires a touch driving voltage to a first set of touch/common electrodes and receiving second sensing voltages from a second set of touch/common electrodes that are adjacent to the first set of touch/common electrodes, the second sensing voltages received via the plurality of touch/common routing wires that are connected to the second set of touch/common electrodes; and a touch controller configured to calculate a touch location based on the first sensing voltages and the second sensing voltages.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A touch sensor integrated type display device according to an exemplary embodiment of the invention may be implemented as in-cell type touch sensors embedded in a flat panel display, such as a liquid crystal display (LCD), a field emission display (FED), a plasma display panel (PDP), an organic light emitting diode display, and an electrophoresis display (EPD). In the following description, the embodiment of the invention will be described using the liquid crystal display as an example of the flat panel display. Other flat panel displays may be used.

Figure 3:
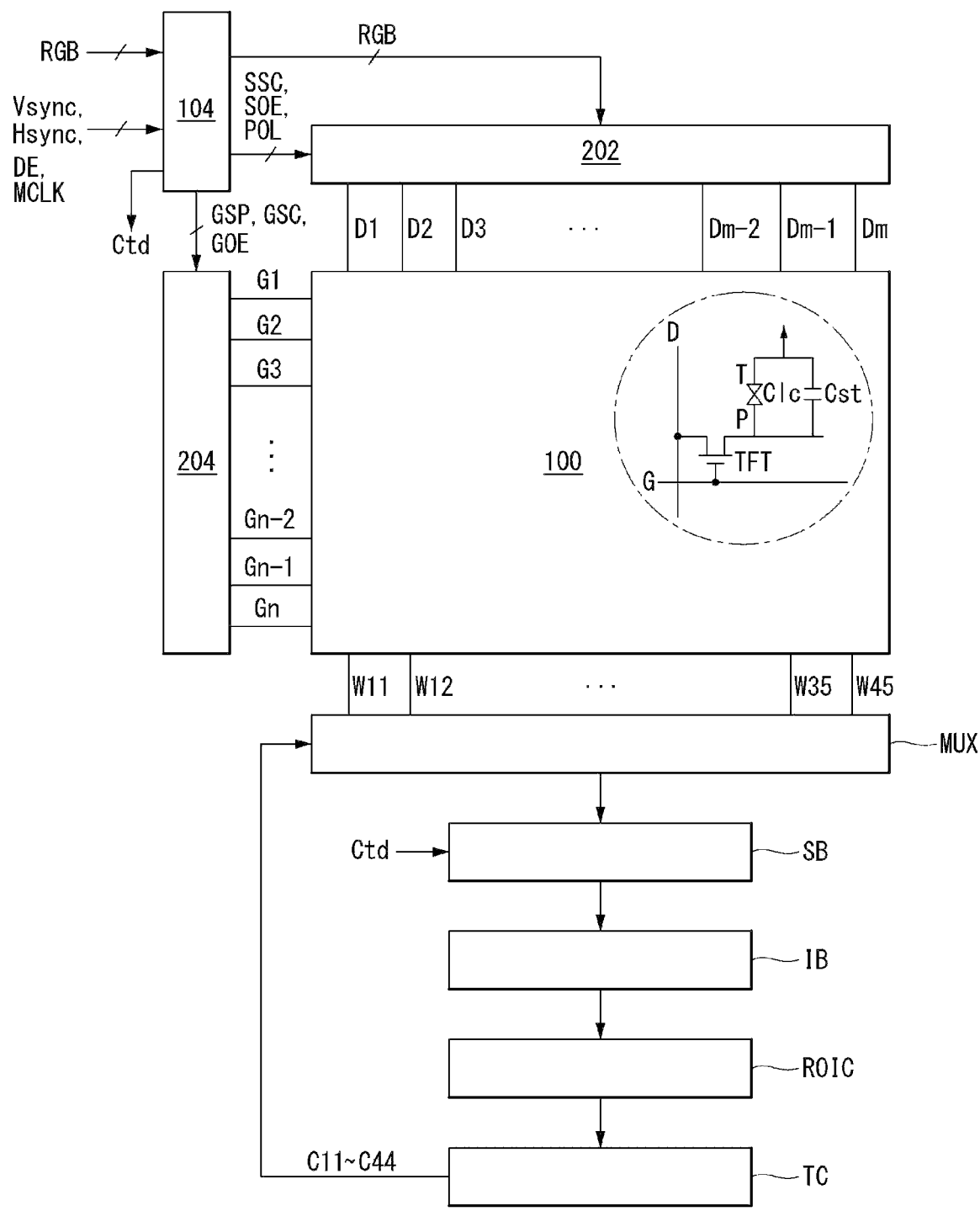
FIG. 3 is a block diagram schematically showing a touch sensor integrated type display device according to an exemplary embodiment of the invention.
Figure 4:
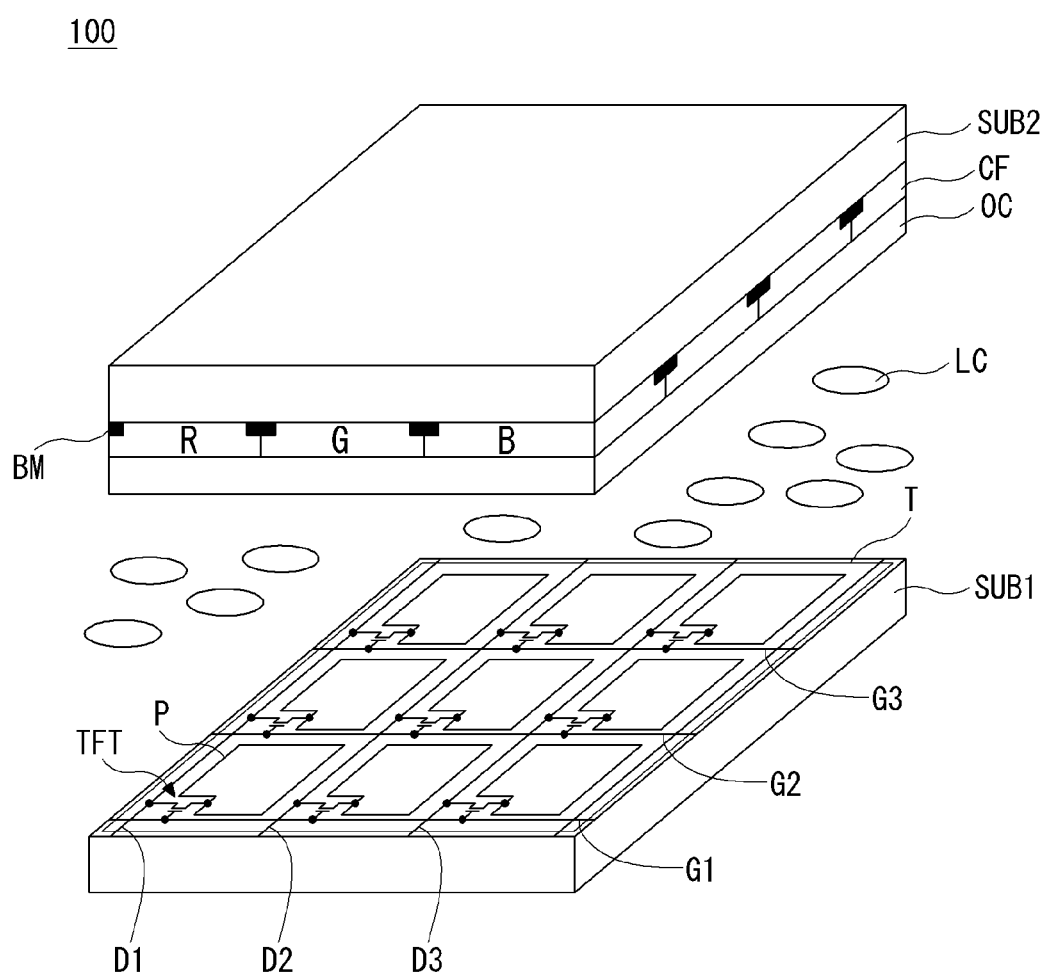
FIG. 4 is a partial exploded perspective view schematically showing a partial area of a touch sensor integrated type display device according to an exemplary embodiment of the invention.

The touch sensor integrated type display device according to the embodiment of the invention is described in detail below with reference to FIGS. 3 and 4. FIG. 3 is a block diagram schematically showing the touch sensor integrated type display device according to the embodiment of the invention. FIG. 4 is a partial exploded perspective view schematically showing a partial area of the touch sensor integrated type display device according to the embodiment of the invention.

The touch sensor integrated type display device according to the embodiment of the invention includes a display panel 100, a data driving circuit 202, a scan driving circuit 204, a timing controller 104, a multiplexer MUX, a switching block SB, an integrating block IB, a readout integrated circuit (IC) ROIC, a touch controller TC, and the like.

The display panel 100 includes a lower glass substrate SUB1, an upper glass substrate SUB2, and a liquid crystal layer disposed between the lower glass substrate SUB1 and the upper glass substrate SUB2. A pixel array is disposed on the lower glass substrate SUB1 of the display panel 100. The pixel array includes a plurality of data lines D1 to Dm, where m is a positive integer, a plurality of gate lines (or scan lines) G1 to Gn crossing the data lines D1 to Dm, where n is a positive integer, a plurality of thin film transistors (TFTs) disposed at crossings of the data lines D1 to Dm and the gate lines G1 to Gn, a plurality of pixel electrodes P for charging liquid crystal cells Clc to a data voltage, a plurality of storage capacitors Cst which are connected to the pixel electrodes P and maintain a voltage of the liquid crystal cells Clc, and touch/common electrodes T.

Pixels of the display panel 100 are respectively disposed in pixel areas defined by the data lines D1 to Dm and the gate lines G1 to Gn to form a matrix structure. The liquid crystal cell Clc of each pixel is driven by an electric field generated depending on a voltage difference between the data voltage supplied to the pixel electrode P and a common voltage Vcom supplied to the touch/common electrode T, thereby adjusting an amount of incident light transmitted by the liquid crystal cell. The TFTs are turned on in response to a gate pulse (or a scan pulse) from the gate lines G1 to Gn and supply the voltage from the data lines D1 to Dm to the pixel electrodes P of the liquid crystal cells Clc.

The upper glass substrate SUB2 of the display panel 100 may include black matrixes BM, red (R), green (G), and blue (B) color filters CF, an overcoat layer OC covering the black matrixes BM and the R, G, and B color filters CF, and the like. The lower glass substrate SUB1 of the display panel 100 may be configured as a color filter on TFT (COT) structure. In this instance, the black matrixes BM and the color filters CF may be disposed on the lower glass substrate SUB1 of the display panel 100.

In one embodiment, the touch/common electrodes T are disposed on the upper glass substrate SUB2 in a vertical electric field driving manner, such as a twisted nematic (TN) mode and a vertical alignment (VA) mode. In another embodiment, the touch/common electrodes T are disposed on the lower glass substrate SUB1 along with the pixel electrodes P in a horizontal electric field driving manner, such as an in-plane switching (IPS) mode and a fringe field switching (FFS) mode. The touch/common electrodes T are connected to touch/common routing wires W11 to W45 and receive the common voltage Vcom.

Polarizing plates are respectively attached to the upper and lower glass substrates SUB2 and SUB1 of the display panel 100. Alignment layers for setting a pre-tilt angle of liquid crystals are respectively disposed on the inner surfaces contacting the liquid crystals in the upper and lower glass substrates SUB2 and SUB1 of the display panel 100. A column spacer may be disposed between the upper and lower glass substrates SUB2 and SUB1 of the display panel 100 to keep cell gaps of the liquid crystal cells Clc constant.

The data driving circuit 202 includes a plurality of source driving integrated circuits (ICs). The source driving ICs output an analog video data voltage during a previously set display driving period. The source driving ICs latch digital video data RGB received from the timing controller 104. The source driving ICs convert the digital video data RGB into positive and negative analog gamma compensation voltages and output the analog video data voltage. The analog video data voltage is supplied to the data lines D1 to Dm.

The scan driving circuit 204 includes at least one scan driving IC. The scan driving IC sequentially supplies the scan pulse synchronized with the analog video data voltage to the gate lines G1 to Gn under the control of the timing controller 104 during the display driving period and selects lines of the display panel 100, to which the analog video data voltage is applied. The scan pulse is generated as a pulse swinging between a gate high voltage and a gate low voltage. The scan driving circuit 204 does not generate the scan pulse during a touch driving period and continuously supplies the gate low voltage to the gate lines G1 to Gn during the touch driving period. Thus, during the display driving period, the scan driving IC supplies the gate pulse to the TFTs of the pixels through the gate lines G1 to Gn and sequentially selects lines of the display panel 100, to which data will be applied. During the touch driving period, the scan driving IC is maintained at the gate low voltage.

The timing controller 104 receives timing signals, such as a vertical sync signal Vsync, a horizontal sync signal Hsync, a data enable signal DE, and a main clock MCLK, from an external host system. The timing controller 104 generates timing control signals for controlling operation timings of the data driving circuit 202 and the scan driving circuit 204 and generates a touch/display control signal Ctd for controlling the switching block SB based on the timing signals. The timing control signal of the scan driving circuit 204 includes a gate start pulse GSP, a gate shift clock GSC, a gate output enable signal GOE, a shift direction control signal DIR, and the like. The timing control signal of the data driving circuit 202 includes a source sampling clock SSC, a source output enable signal SOE, a polarity control signal POL, and the like.

The timing controller 104 controls the timing control signals and time-divides one frame period into at least one display driving period and at least one touch driving period. During one frame period, all the pixels of the display panel 100 are driven once to display images. During the display driving period, the timing controller 104 enables an output of the data driving circuit 202 and an output of the scan driving circuit 204 and displays video data on the pixels. During the touch driving period, the timing controller 104 drives the touch controller TC and detects a touch location of a touch screen. The display driving period and the touch driving period may be properly adjusted depending on kinds of display panels in consideration of their panel characteristics.

The multiplexer MUX supplies a touch driving voltage to the touch/common electrodes T in response to the touch/ display control signal Ctd and senses the touch/common electrodes T using both a self-capacitive method and a mutual capacitive method to output sensing voltages used to sense touch of the display panel 100.

The integrating block IB integrates the sensing voltages received from the multiplexer MUX and outputs the integrated sensing voltages.

The readout IC ROIC converts the integrated sensing voltages received from the integrating block IB into digital data of a human interface device (HID) format and outputs the digital data.

The touch controller TC supplies switching control signals C11 to C44 controlling the multiplexer MUX to the multiplexer MUX. The touch controller TC analyzes the digital data received from the readout IC ROIC using a previously set touch recognition algorithm and calculates coordinate values. Coordinate data of a touch location output from the touch controller TC is transmitted to the external host system (not shown). The host system runs an application program the coordinate data of the touch location indicates.

Figure 5:
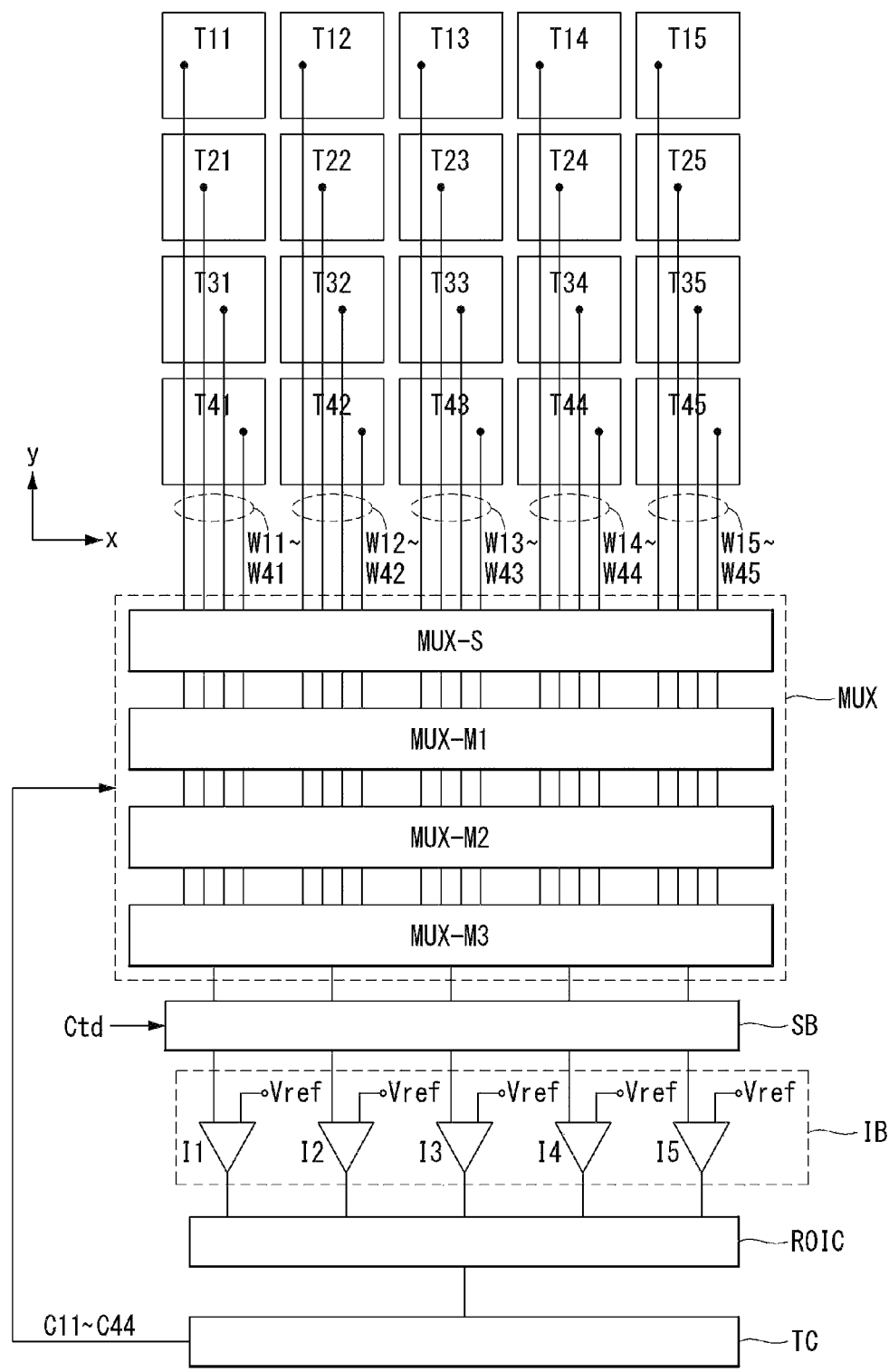
FIG. 5 is a block diagram schematically showing a basic configuration for touch recognition in a touch sensor integrated type display device according to an exemplary embodiment of the invention.

Next, a configuration for touch recognition of the touch sensor integrated type display device according to the embodiment of the invention is described in detail with reference to FIG. 5. FIG. 5 is a block diagram schematically showing a basic configuration for touch recognition in the touch sensor integrated type display device according to the embodiment of the invention.

Referring to FIG. 5, the touch sensor integrated type display device according to the embodiment of the invention includes a plurality of touch/common electrodes T11-T15, T21-T25, T31-T35, and T41-T45 disposed in a display area of the display panel 100, a plurality of touch/common routing wires W11-W41, W12-W42, W13-W43, W14-W44, and W15-W45 respectively connected to the plurality of touch/common electrodes T11-T15, T21-T25, T31-T35, and T41-T45, the multiplexer MUX, the integrating block IB, the readout IC ROIC, and the touch controller TC.

The plurality of touch/common electrodes T11-T15, T21-T25, T31-T35, and T41-T45 are divided and arranged in a first direction (for example, x-axis direction) and a second direction (for example, y-axis direction) crossing the first direction.

The plurality of touch/common routing wires W11-W41, W12-W42, W13-W43, W14-W44, and W15-W45 are respectively connected to the plurality of touch/common electrodes T11-T15, T21-T25, T31-T35, and T41-T45 and are arranged in the second direction.

The multiplexer MUX includes a first multiplexer MUX-S for sensing the plurality of touch/common electrodes T11-T15, T21-T25, T31-T35, and T41-T45 using the self-capacitive method, a second multiplexer MUX-M1 for sensing the plurality of touch/common electrodes T11-T15, T21-T25, T31-T35, and T41-T45 using a first mutual capacitive method of a horizontal direction, a third multiplexer MUX-M2 for sensing the plurality of touch/common electrodes T11-T15, T21-T25, T31-T35, and T41-T45 using a second mutual capacitive method of a vertical direction, and a fourth multiplexer MUX-M3 for sensing the plurality of touch/common electrodes T11-T15, T21-T25, T31-T35, and T41-T45 using a third mutual capacitive method of a diagonal direction. Detailed configurations of the first to fourth multiplexers MUX-S and MUX-M1 to MUX-M3 are described in detail later with reference to FIGS. 6A to 9I.

The integrating block IB includes first to fifth integrators I1 to I5. The integrating block IB integrates the sensing voltages output from the first to fourth multiplexers MUX-S and MUX-M1 to MUX-M3 of the multiplexer MUX and outputs the integrated sensing voltages.

The readout IC ROIC converts the integrated sensing voltages received from the integrating block IB into digital data of the HID format and outputs the digital data.

The touch controller TC analyzes the digital data received from the readout IC ROIC using a previously set touch recognition algorithm and calculates coordinate values of touch locations. The coordinate data of the touch locations output from the touch controller TC are transmitted to the external host system. The host system runs an application program to which the coordinate data of the touch locations indicates.

Next, a touch recognition method of the touch sensor integrated type display device according to the embodiment of the invention is described in detail with reference to FIGS. 6A to 9I.

The touch recognition method of the touch sensor integrated type display device according to the embodiment of the invention includes a self-capacitive sensing step (refer to FIGS. 6A to 6C) of sensing each of the touch/common electrodes using the self-capacitive method, a first mutual capacitive sensing step (refer to FIGS. 7A to 7E) of sensing the touch/common electrodes in a horizontal direction using a mutual capacitive method, a second mutual capacitive sensing step (refer to FIGS. 8A to 8E) of sensing the touch/common electrodes in a vertical direction using the mutual capacitive method, and a third mutual capacitive sensing step (refer to FIGS. 9A to 9I) of sensing the touch/common electrodes in a diagonal direction using the mutual capacitive method. The embodiment of the invention describes that the self-capacitive sensing step and the first to third mutual capacitive sensing steps are sequentially performed. However, order of the above four sensing steps may be variously changed.

1. Self-Capacitive Sensing

Figure 6A:
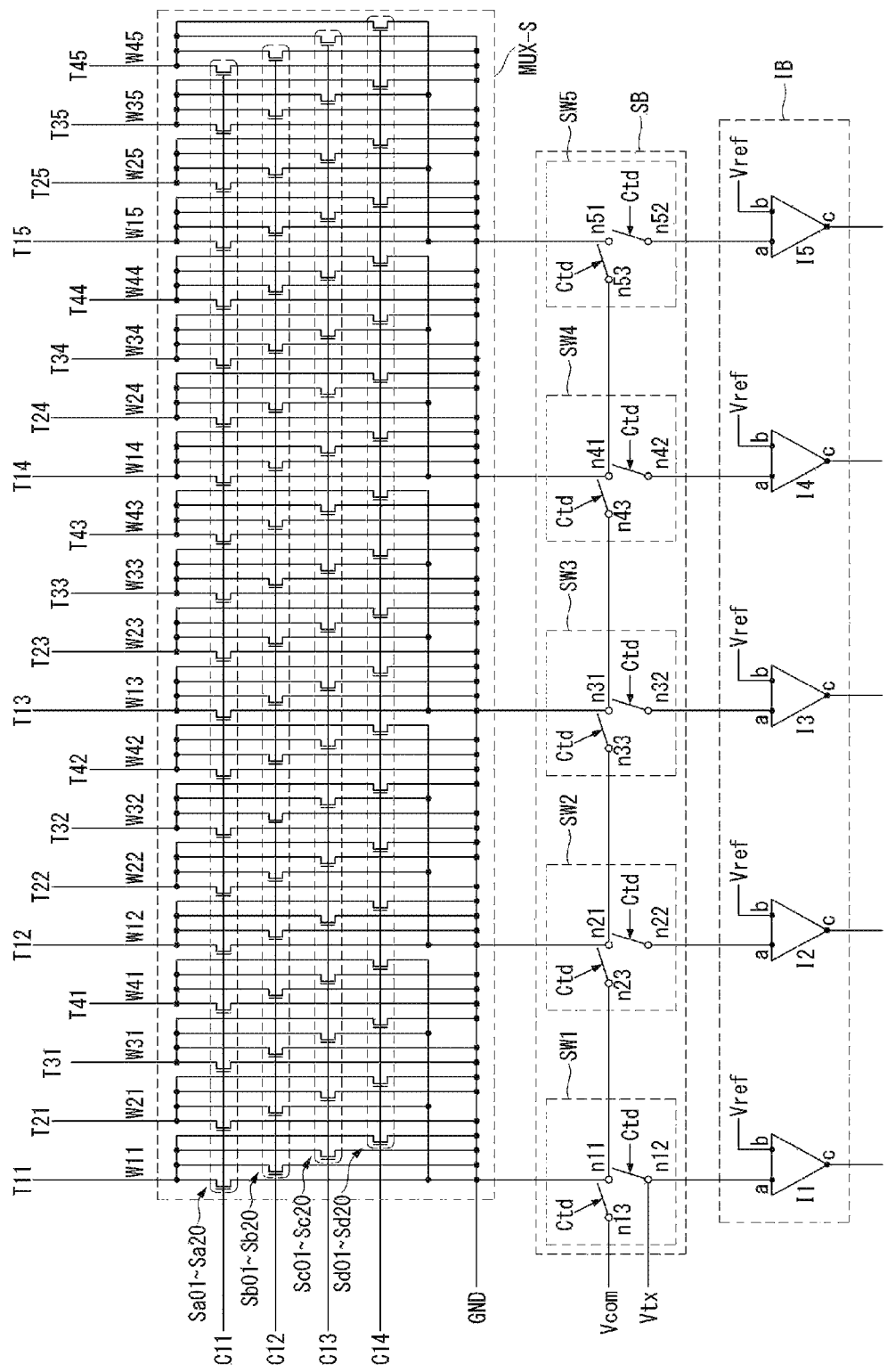
FIG. 6A is a circuit diagram showing a configuration for sensing each touch/common electrode through a self-capacitive method in a touch sensor integrated type display device according to an exemplary embodiment of the invention.
Figure 6B:
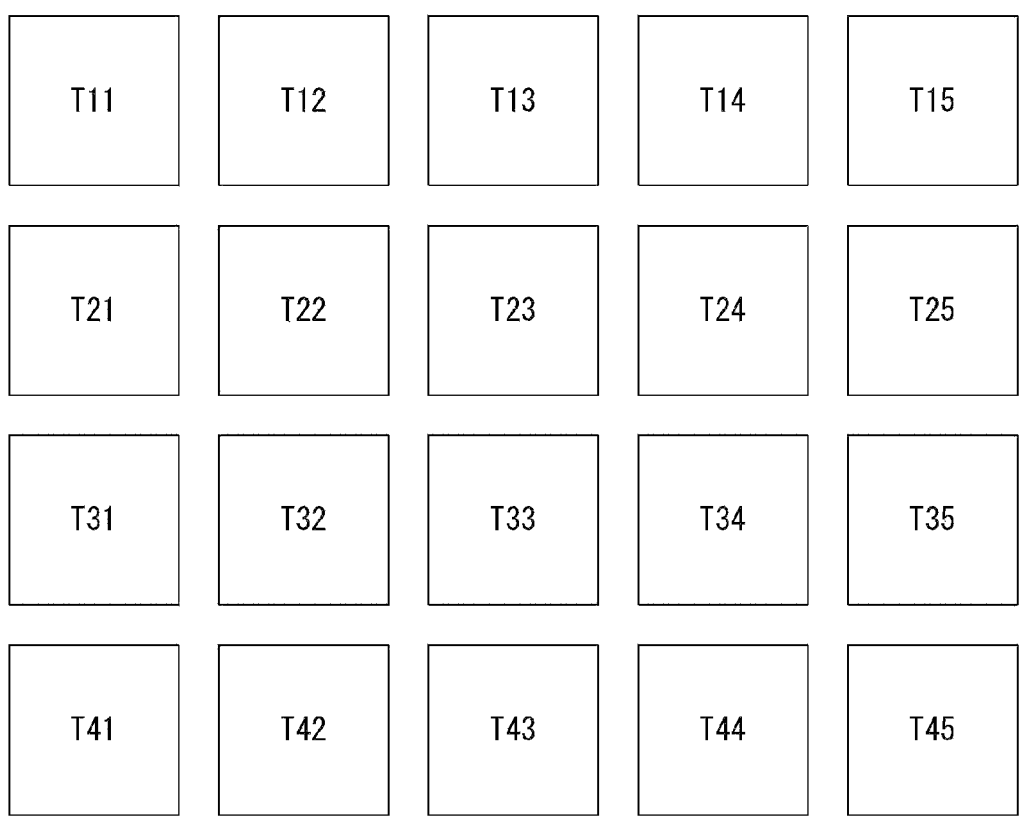
FIG. 6B is a plane view illustrating a step for sensing touch/common electrodes through a self-capacitive method using the circuit diagram shown in FIG. 6A.
Figure 6C:
FIG. 6C is a plane view showing sensing locations of touch/common electrodes capable of being sensed through a self-capacitive method using the circuit diagram shown in FIG. 6A.

The self-capacitive sensing step is described below with reference to FIGS. 6A to 6C according to one embodiment. FIG. 6A is a circuit diagram illustrating a step of sensing each touch/common electrode using a self-capacitive method in the touch sensor integrated type display device according to the embodiment of the invention. FIG. 6B is a plane view showing the touch/common electrodes sensed using the self-capacitive method shown in FIG. 6A. FIG. 6C is a plane view showing sensing locations of the touch/common electrodes sensed using the self-capacitive method shown in FIG. 6A.

Referring to FIG. 6A, the touch sensor integrated type display device for the self-capacitive sensing according to the embodiment of the invention includes the first multiplexer MUX-S of the multiplexer MUX and the switching block SB, which is disposed between the first multiplexer MUX-S and the integrating block IB, supplies the common voltage Vcom during a display driving period, and supplies a touch driving voltage Vtx during a touch driving period.

The first multiplexer MUX-S includes 1-1 to 4-20 switching elements Sa01-Sa20, Sb01-Sb20, Sc01-Sc20, and Sd01-Sd20.

The 1-1 switching element Sa01 includes a first terminal connected to the 1-1 touch/common routing wire W11 connected to the 1-1 touch/common electrode T11, a second terminal connected to a first input terminal 'a' of the first integrator I1, and a control terminal receiving a 1-1 switching control signal C11 supplied from the touch controller TC.

The 1-2 switching element Sa02 includes a first terminal connected to the 2-1 touch/common routing wire W21 connected to the 2-1 touch/common electrode T21, a second terminal connected to a ground terminal GND, and a control terminal receiving the 1-1 switching control signal C11 supplied from the touch controller TC.

The 1-3 switching element Sa03 includes a first terminal connected to the 3-1 touch/common routing wire W31 connected to the 3-1 touch/common electrode T31, a second terminal connected to the ground terminal GND, and a control terminal receiving the 1-1 switching control signal C11 supplied from the touch controller TC.

The 1-4 switching element Sa04 includes a first terminal connected to the 4-1 touch/common routing wire W41 connected to the 4-1 touch/common electrode T41, a second terminal connected to the ground terminal GND, and a control terminal receiving the 1-1 switching control signal C11 supplied from the touch controller TC.

The 1-5 switching element Sa05 includes a first terminal connected to the 1-2 touch/common routing wire W12 connected to the 1-2 touch/common electrode T12, a second terminal connected to a first input terminal 'a' of the second integrator I2, and a control terminal receiving the 1-1 switching control signal C11 supplied from the touch controller TC.

The 1-6 switching element Sa06 includes a first terminal connected to the 2-2 touch/common routing wire W22 connected to the 2-2 touch/common electrode T22, a second terminal connected to the ground terminal GND, and a control terminal receiving the 1-1 switching control signal C11 supplied from the touch controller TC.

The 1-7 switching element Sa07 includes a first terminal connected to the 3-2 touch/common routing wire W32 connected to the 3-2 touch/common electrode T32, a second terminal connected to the ground terminal GND, and a control terminal receiving the 1-1 switching control signal C11 supplied from the touch controller TC.

The 1-8 switching element Sa08 includes a first terminal connected to the 4-2 touch/common routing wire W42 connected to the 4-2 touch/common electrode T42, a second terminal connected to the ground terminal GND, and a control terminal receiving the 1-1 switching control signal C11 supplied from the touch controller TC.

The 1-9 switching element Sa09 includes a first terminal connected to the 1-3 touch/common routing wire W13 connected to the 1-3 touch/common electrode T13, a second terminal connected to a first input terminal 'a' of the third integrator I3, and a control terminal receiving the 1-1 switching control signal C11 supplied from the touch controller TC.

The 1-10 switching element Sa10 includes a first terminal connected to the 2-3 touch/common routing wire W23 connected to the 2-3 touch/common electrode T23, a second terminal connected to the ground terminal GND, and a control terminal receiving the 1-1 switching control signal C11 supplied from the touch controller TC.

The 1-11 switching element Sa11 includes a first terminal connected to the 3-3 touch/common routing wire W33 connected to the 3-3 touch/common electrode T33, a second terminal connected to the ground terminal GND, and a control terminal receiving the 1-1 switching control signal C11 supplied from the touch controller TC.

The 1-12 switching element Sa12 includes a first terminal connected to the 4-3 touch/common routing wire W43 connected to the 4-3 touch/common electrode T43, a second terminal connected to the ground terminal GND, and a control terminal receiving the 1-1 switching control signal C11 supplied from the touch controller TC.

The 1-13 switching element Sa13 includes a first terminal connected to the 1-4 touch/common routing wire W14 connected to the 1-4 touch/common electrode T14, a second terminal connected to a first input terminal 'a' of the fourth integrator I4, and a control terminal receiving the 1-1 switching control signal C11 supplied from the touch controller TC.

The 1-14 switching element Sa14 includes a first terminal connected to the 2-4 touch/common routing wire W24 connected to the 2-4 touch/common electrode T24, a second terminal connected to the ground terminal GND, and a control terminal receiving the 1-1 switching control signal C11 supplied from the touch controller TC.

The 1-15 switching element Sa15 includes a first terminal connected to the 3-4 touch/common routing wire W34 connected to the 3-4 touch/common electrode T34, a second terminal connected to the ground terminal GND, and a control terminal receiving the 1-1 switching control signal C11 supplied from the touch controller TC.

The 1-16 switching element Sa16 includes a first terminal connected to the 4-4 touch/common routing wire W44 connected to the 4-4 touch/common electrode T44, a second terminal connected to the ground terminal GND, and a control terminal receiving the 1-1 switching control signal C11 supplied from the touch controller TC.

The 1-17 switching element Sa17 includes a first terminal connected to the 1-5 touch/common routing wire W15 connected to the 1-5 touch/common electrode T15, a second terminal connected to a first input terminal 'a' of the fifth integrator I5, and a control terminal receiving the 1-1 switching control signal C11 supplied from the touch controller TC.

The 1-18 switching element Sa18 includes a first terminal connected to the 2-5 touch/common routing wire W25 connected to the 2-5 touch/common electrode T25, a second terminal connected to the ground terminal GND, and a control terminal receiving the 1-1 switching control signal C11 supplied from the touch controller TC.

The 1-19 switching element Sa19 includes a first terminal connected to the 3-5 touch/common routing wire W35 connected to the 3-5 touch/common electrode T35, a second terminal connected to the ground terminal GND, and a control terminal receiving the 1-1 switching control signal C11 supplied from the touch controller TC.

The 1-20 switching element Sa20 includes a first terminal connected to the 4-5 touch/common routing wire W45 connected to the 4-5 touch/common electrode T45, a second terminal connected to the ground terminal GND, and a control terminal receiving the 1-1 switching control signal C11 supplied from the touch controller TC.

The 2-1 switching element Sb01 includes a first terminal connected to the 1-1 touch/common routing wire W11 connected to the 1-1 touch/common electrode T11, a second terminal connected to the ground terminal GND, and a control terminal receiving a 1-2 switching control signal C12 supplied from the touch controller TC.

The 2-2 switching element Sb02 includes a first terminal connected to the 2-1 touch/common routing wire W21 connected to the 2-1 touch/common electrode T21, a second terminal connected to the first input terminal 'a' of the first integrator I1, and a control terminal receiving the 1-2 switching control signal C12 supplied from the touch controller TC.

The 2-3 switching element Sb03 includes a first terminal connected to the 3-1 touch/common routing wire W31 connected to the 3-1 touch/common electrode T31, a second terminal connected to the ground terminal GND, and a control terminal receiving the 1-2 switching control signal C12 supplied from the touch controller TC.

The 2-4 switching element Sb04 includes a first terminal connected to the 4-1 touch/common routing wire W41 connected to the 4-1 touch/common electrode T41, a second terminal connected to the ground terminal GND, and a control terminal receiving the 1-2 switching control signal C12 supplied from the touch controller TC.

The 2-5 switching element Sb05 includes a first terminal connected to the 1-2 touch/common routing wire W12 connected to the 1-2 touch/common electrode T12, a second terminal connected to the ground terminal GND, and a control terminal receiving the 1-2 switching control signal C12 supplied from the touch controller TC.

The 2-6 switching element Sb06 includes a first terminal connected to the 2-2 touch/common routing wire W22 connected to the 2-2 touch/common electrode T22, a second terminal connected to the first input terminal 'a' of the second integrator I2, and a control terminal receiving the 1-2 switching control signal C12 supplied from the touch controller TC.

The 2-7 switching element Sb07 includes a first terminal connected to the 3-2 touch/common routing wire W32 connected to the 3-2 touch/common electrode T32, a second terminal connected to the ground terminal GND, and a control terminal receiving the 1-2 switching control signal C12 supplied from the touch controller TC.

The 2-8 switching element Sb08 includes a first terminal connected to the 4-2 touch/common routing wire W42 connected to the 4-2 touch/common electrode T42, a second terminal connected to the ground terminal GND, and a control terminal receiving the 1-2 switching control signal C12 supplied from the touch controller TC.

The 2-9 switching element Sb09 includes a first terminal connected to the 1-3 touch/common routing wire W13 connected to the 1-3 touch/common electrode T13, a second terminal connected to the ground terminal GND, and a control terminal receiving the 1-2 switching control signal C12 supplied from the touch controller TC.

The 2-10 switching element Sb10 includes a first terminal connected to the 2-3 touch/common routing wire W23 connected to the 2-3 touch/common electrode T23, a second terminal connected to the first input terminal 'a' of the third integrator I3, and a control terminal receiving the 1-2 switching control signal C12 supplied from the touch controller TC.

The 2-11 switching element Sb11 includes a first terminal connected to the 3-3 touch/common routing wire W33 connected to the 3-3 touch/common electrode T33, a second terminal connected to the ground terminal GND, and a control terminal receiving the 1-2 switching control signal C12 supplied from the touch controller TC.

The 2-12 switching element Sb12 includes a first terminal connected to the 4-3 touch/common routing wire W43 connected to the 4-3 touch/common electrode T43, a second terminal connected to the ground terminal GND, and a control terminal receiving the 1-2 switching control signal C12 supplied from the touch controller TC.

The 2-13 switching element Sb13 includes a first terminal connected to the 1-4 touch/common routing wire W14 connected to the 1-4 touch/common electrode T14, a second terminal connected to the ground terminal GND, and a control terminal receiving the 1-2 switching control signal C12 supplied from the touch controller TC.

The 2-14 switching element Sb14 includes a first terminal connected to the 2-4 touch/common routing wire W24 connected to the 2-4 touch/common electrode T24, a second terminal connected to the first input terminal 'a' of the fourth integrator I4, and a control terminal receiving the 1-2 switching control signal C12 supplied from the touch controller TC.

The 2-15 switching element Sb15 includes a first terminal connected to the 3-4 touch/common routing wire W34 connected to the 3-4 touch/common electrode T34, a second terminal connected to the ground terminal GND, and a control terminal receiving the 1-2 switching control signal C12 supplied from the touch controller TC.

The 2-16 switching element Sb16 includes a first terminal connected to the 4-4 touch/common routing wire W44 connected to the 4-4 touch/common electrode T44, a second terminal connected to the ground terminal GND, and a control terminal receiving the 1-2 switching control signal C12 supplied from the touch controller TC.

The 2-17 switching element Sb17 includes a first terminal connected to the 1-5 touch/common routing wire W15 connected to the 1-5 touch/common electrode T15, a second terminal connected to the ground terminal GND, and a control terminal receiving the 1-2 switching control signal C12 supplied from the touch controller TC.

The 2-18 switching element Sb18 includes a first terminal connected to the 2-5 touch/common routing wire W25 connected to the 2-5 touch/common electrode T25, a second terminal connected to the first input terminal 'a' of the fifth integrator I5, and a control terminal receiving the 1-2 switching control signal C12 supplied from the touch controller TC.

The 2-19 switching element Sb19 includes a first terminal connected to the 3-5 touch/common routing wire W35 connected to the 3-5 touch/common electrode T35, a second terminal connected to the ground terminal GND, and a control terminal receiving the 1-2 switching control signal C12 supplied from the touch controller TC.

The 2-20 switching element Sb20 includes a first terminal connected to the 4-5 touch/common routing wire W45 connected to the 4-5 touch/common electrode T45, a second terminal connected to the ground terminal GND, and a control terminal receiving the 1-2 switching control signal C12 supplied from the touch controller TC.

The 3-1 switching element Sc01 includes a first terminal connected to the 1-1 touch/common routing wire W11 connected to the 1-1 touch/common electrode T11, a second terminal connected to the ground terminal GND, and a control terminal receiving a 1-3 switching control signal C13 supplied from the touch controller TC.

The 3-2 switching element Sc02 includes a first terminal connected to the 2-1 touch/common routing wire W21 connected to the 2-1 touch/common electrode T21, a second terminal connected to the ground terminal GND, and a control terminal receiving the 1-3 switching control signal C13 supplied from the touch controller TC.

The 3-3 switching element Sc03 includes a first terminal connected to the 3-1 touch/common routing wire W31 connected to the 3-1 touch/common electrode T31, a second terminal connected to the first input terminal 'a' of the first integrator I1, and a control terminal receiving the 1-3 switching control signal C13 supplied from the touch controller TC.

The 3-4 switching element Sc04 includes a first terminal connected to the 4-1 touch/common routing wire W41 connected to the 4-1 touch/common electrode T41, a second terminal connected to the ground terminal GND, and a control terminal receiving the 1-3 switching control signal C13 supplied from the touch controller TC.

The 3-5 switching element Sc05 includes a first terminal connected to the 1-2 touch/common routing wire W12 connected to the 1-2 touch/common electrode T12, a second terminal connected to the ground terminal GND, and a control terminal receiving the 1-3 switching control signal C13 supplied from the touch controller TC.

The 3-6 switching element Sc06 includes a first terminal connected to the 2-2 touch/common routing wire W22 connected to the 2-2 touch/common electrode T22, a second terminal connected to the ground terminal GND, and a control terminal receiving the 1-3 switching control signal C13 supplied from the touch controller TC.

The 3-7 switching element Sc07 includes a first terminal connected to the 3-2 touch/common routing wire W32 connected to the 3-2 touch/common electrode T32, a second terminal connected to the first input terminal 'a' of the second integrator I2, and a control terminal receiving the 1-3 switching control signal C13 supplied from the touch controller TC.

The 3-8 switching element Sc08 includes a first terminal connected to the 4-2 touch/common routing wire W42 connected to the 4-2 touch/common electrode T42, a second terminal connected to the ground terminal GND, and a control terminal receiving the 1-3 switching control signal C13 supplied from the touch controller TC.

The 3-9 switching element Sc09 includes a first terminal connected to the 1-3 touch/common routing wire W13 connected to the 1-3 touch/common electrode T13, a second terminal connected to the ground terminal GND, and a control terminal receiving the 1-3 switching control signal C13 supplied from the touch controller TC.

The 3-10 switching element Sc10 includes a first terminal connected to the 2-3 touch/common routing wire W23 connected to the 2-3 touch/common electrode T23, a second terminal connected to the ground terminal GND, and a control terminal receiving the 1-3 switching control signal C13 supplied from the touch controller TC.

The 3-11 switching element Sc11 includes a first terminal connected to the 3-3 touch/common routing wire W33 connected to the 3-3 touch/common electrode T33, a second terminal connected to the first input terminal 'a' of the third integrator I3, and a control terminal receiving the 1-3 switching control signal C13 supplied from the touch controller TC.

The 3-12 switching element Sc12 includes a first terminal connected to the 4-3 touch/common routing wire W43 connected to the 4-3 touch/common electrode T43, a second terminal connected to the ground terminal GND, and a control terminal receiving the 1-3 switching control signal C13 supplied from the touch controller TC.

The 3-13 switching element Sc13 includes a first terminal connected to the 1-4 touch/common routing wire W14 connected to the 1-4 touch/common electrode T14, a second terminal connected to the ground terminal GND, and a control terminal receiving the 1-3 switching control signal C13 supplied from the touch controller TC.

The 3-14 switching element Sc14 includes a first terminal connected to the 2-4 touch/common routing wire W24 connected to the 2-4 touch/common electrode T24, a second terminal connected to the ground terminal GND, and a control terminal receiving the 1-3 switching control signal C13 supplied from the touch controller TC.

The 3-15 switching element Sc15 includes a first terminal connected to the 3-4 touch/common routing wire W34 connected to the 3-4 touch/common electrode T34, a second terminal connected to the first input terminal 'a' of the fourth integrator I4, and a control terminal receiving the 1-3 switching control signal C13 supplied from the touch controller TC.

The 3-16 switching element Sc16 includes a first terminal connected to the 4-4 touch/common routing wire W44 connected to the 4-4 touch/common electrode T44, a second terminal connected to the ground terminal GND, and a control terminal receiving the 1-3 switching control signal C13 supplied from the touch controller TC.

The 3-17 switching element Sc17 includes a first terminal connected to the 1-5 touch/common routing wire W15 connected to the 1-5 touch/common electrode T15, a second terminal connected to the ground terminal GND, and a control terminal receiving the 1-3 switching control signal C13 supplied from the touch controller TC.

The 3-18 switching element Sc18 includes a first terminal connected to the 2-5 touch/common routing wire W25 connected to the 2-5 touch/common electrode T25, a second terminal connected to the ground terminal GND, and a control terminal receiving the 1-3 switching control signal C13 supplied from the touch controller TC.

The 3-19 switching element Sc19 includes a first terminal connected to the 3-5 touch/common routing wire W35 connected to the 3-5 touch/common electrode T35, a second terminal connected to the first input terminal 'a' of the fifth integrator I5, and a control terminal receiving the 1-3 switching control signal C13 supplied from the touch controller TC.

The 3-20 switching element Sc20 includes a first terminal connected to the 4-5 touch/common routing wire W45 connected to the 4-5 touch/common electrode T45, a second terminal connected to the ground terminal GND, and a control terminal receiving the 1-3 switching control signal C13 supplied from the touch controller TC.

The 4-1 switching element Sd01 includes a first terminal connected to the 1-1 touch/common routing wire W11 connected to the 1-1 touch/common electrode T11, a second terminal connected to the ground terminal GND, and a control terminal receiving a 1-4 switching control signal C14 supplied from the touch controller TC.

The 4-2 switching element Sd02 includes a first terminal connected to the 2-1 touch/common routing wire W21 connected to the 2-1 touch/common electrode T21, a second terminal connected to the ground terminal GND, and a control terminal receiving the 1-4 switching control signal C14 supplied from the touch controller TC.

The 4-3 switching element Sd03 includes a first terminal connected to the 3-1 touch/common routing wire W31 connected to the 3-1 touch/common electrode T31, a second terminal connected to the ground terminal GND, and a control terminal receiving the 1-4 switching control signal C14 supplied from the touch controller TC.

The 4-4 switching element Sd04 includes a first terminal connected to the 4-1 touch/common routing wire W41 connected to the 4-1 touch/common electrode T41, a second terminal connected to the first input terminal 'a' of the first integrator I1, and a control terminal receiving the 1-4 switching control signal C14 supplied from the touch controller TC.

The 4-5 switching element Sd05 includes a first terminal connected to the 1-2 touch/common routing wire W12 connected to the 1-2 touch/common electrode T12, a second terminal connected to the ground terminal GND, and a control terminal receiving the 1-4 switching control signal C14 supplied from the touch controller TC.

The 4-6 switching element Sd06 includes a first terminal connected to the 2-2 touch/common routing wire W22 connected to the 2-2 touch/common electrode T22, a second terminal connected to the ground terminal GND, and a control terminal receiving the 1-4 switching control signal C14 supplied from the touch controller TC.

The 4-7 switching element Sd07 includes a first terminal connected to the 3-2 touch/common routing wire W32 connected to the 3-2 touch/common electrode T32, a second terminal connected to the ground terminal GND, and a control terminal receiving the 1-4 switching control signal C14 supplied from the touch controller TC.

The 4-8 switching element Sd08 includes a first terminal connected to the 4-2 touch/common routing wire W42 connected to the 4-2 touch/common electrode T42, a second terminal connected to the first input terminal 'a' of the second integrator I2, and a control terminal receiving the 1-4 switching control signal C14 supplied from the touch controller TC.

The 4-9 switching element Sd09 includes a first terminal connected to the 1-3 touch/common routing wire W13 connected to the 1-3 touch/common electrode T13, a second terminal connected to the ground terminal GND, and a control terminal receiving the 1-4 switching control signal C14 supplied from the touch controller TC.

The 4-10 switching element Sd10 includes a first terminal connected to the 2-3 touch/common routing wire W23 connected to the 2-3 touch/common electrode T23, a second terminal connected to the ground terminal GND, and a control terminal receiving the 1-4 switching control signal C14 supplied from the touch controller TC.

The 4-11 switching element Sd11 includes a first terminal connected to the 3-3 touch/common routing wire W33 connected to the 3-3 touch/common electrode T33, a second terminal connected to the ground terminal GND, and a control terminal receiving the 1-4 switching control signal C14 supplied from the touch controller TC.

The 4-12 switching element Sd12 includes a first terminal connected to the 4-3 touch/common routing wire W43 connected to the 4-3 touch/common electrode T43, a second terminal connected to the first input terminal 'a' of the third integrator I3, and a control terminal receiving the 1-4 switching control signal C14 supplied from the touch controller TC.

The 4-13 switching element Sd13 includes a first terminal connected to the 1-4 touch/common routing wire W14 connected to the 1-4 touch/common electrode T14, a second terminal connected to the ground terminal GND, and a control terminal receiving the 1-4 switching control signal C14 supplied from the touch controller TC.

The 4-14 switching element Sd14 includes a first terminal connected to the 2-4 touch/common routing wire W24 connected to the 2-4 touch/common electrode T24, a second terminal connected to the ground terminal GND, and a control terminal receiving the 1-4 switching control signal C14 supplied from the touch controller TC.

The 4-15 switching element Sd15 includes a first terminal connected to the 3-4 touch/common routing wire W34 connected to the 3-4 touch/common electrode T34, a second terminal connected to the ground terminal GND, and a control terminal receiving the 1-4 switching control signal C14 supplied from the touch controller TC.

The 4-16 switching element Sd16 includes a first terminal connected to the 4-4 touch/common routing wire W44 connected to the 4-4 touch/common electrode T44, a second terminal connected to the first input terminal 'a' of the fourth integrator I4, and a control terminal receiving the 1-4 switching control signal C14 supplied from the touch controller TC.

The 4-17 switching element Sd17 includes a first terminal connected to the 1-5 touch/common routing wire W15 connected to the 1-5 touch/common electrode T15, a second terminal connected to the ground terminal GND, and a control terminal receiving the 1-4 switching control signal C14 supplied from the touch controller TC.

The 4-18 switching element Sd18 includes a first terminal connected to the 2-5 touch/common routing wire W25 connected to the 2-5 touch/common electrode T25, a second terminal connected to the ground terminal GND, and a control terminal receiving the 1-4 switching control signal C14 supplied from the touch controller TC.

The 4-19 switching element Sd19 includes a first terminal connected to the 3-5 touch/common routing wire W35 connected to the 3-5 touch/common electrode T35, a second terminal connected to the ground terminal GND, and a control terminal receiving the 1-4 switching control signal C14 supplied from the touch controller TC.

The 4-20 switching element Sd20 includes a first terminal connected to the 4-5 touch/common routing wire W45 connected to the 4-5 touch/common electrode T45, a second terminal connected to the first input terminal 'a' of the fifth integrator I5, and a control terminal receiving the 1-4 switching control signal C14 supplied from the touch controller TC.

The 1-1 to 4-20 switching elements Sa01-Sa20, Sb01-Sb20, Sc01-Sc20, and Sd01-Sd20 may be implemented as switching thin film transistors.

The switching block SB is disposed between the first multiplexer MUX-S and the integrating block IB and includes first to fifth switching units SW1 to SW5.

The first switching unit SW1 includes a 1-1 terminal n11 connected to the second terminals of the 1-1, 2-2, 3-3, and 4-4 switching elements Sa01, Sb02, Sc03, and Sd04, a 1-2 terminal n12 connected to the first input terminal 'a' of the first integrator I1, and a 1-3 terminal n13 to which the common voltage Vcom is applied. The first switching unit SW1 supplies the common voltage Vcom to the first multiplexer MUX-S in response to the touch/display control signal Ctd supplied from the timing controller 104 in a display driving mode and supplies the touch driving voltage Vtx to the first multiplexer MUX-S in response to the touch/display control signal Ctd in a touch sensor drive.

The second switching unit SW2 includes a 2-1 terminal n21 connected to the second terminals of the 1-5, 2-6, 3-7, and 4-8 switching elements Sa05, Sb06, Sc07, and Sd08, a 2-2 terminal n22 connected to the first input terminal 'a' of the second integrator I2, and a 2-3 terminal n23 to which the common voltage Vcom is applied. The second switching unit SW2 supplies the common voltage Vcom to the first multiplexer MUX-S in response to the touch/display control signal Ctd supplied from the timing controller 104 in the display driving mode and supplies the touch driving voltage Vtx to the first multiplexer MUX-S in response to the touch/display control signal Ctd in the touch sensor drive.

The third switching unit SW3 includes a 3-1 terminal n31 connected to the second terminals of the 1-9, 2-10, 3-11, and 4-12 switching elements Sa09, Sb10, Sc11, and Sd12, a 3-2 terminal n32 connected to the first input terminal 'a' of the third integrator I3, and a 3-3 terminal n33 to which the common voltage Vcom is applied. The third switching unit SW3 supplies the common voltage Vcom to the first multiplexer MUX-S in response to the touch/display control signal Ctd supplied from the timing controller 104 in the display driving mode and supplies the touch driving voltage Vtx to the first multiplexer MUX-S in response to the touch/display control signal Ctd in the touch sensor drive.

The fourth switching unit SW4 includes a 4-1 terminal n41 connected to the second terminals of the 1-13, 2-14, 3-15, and 4-16 switching elements Sa13, Sb14, Sc15, and Sd16, a 4-2 terminal n42 connected to the first input terminal 'a' of the fourth integrator I4, and a 4-3 terminal n43 to which the common voltage Vcom is applied. The fourth switching unit SW4 supplies the common voltage Vcom to the first multiplexer MUX-S in response to the touch/display control signal Ctd supplied from the timing controller 104 in the display driving mode and supplies the touch driving voltage Vtx to the first multiplexer MUX-S in response to the touch/display control signal Ctd in the touch sensor drive.

The fifth switching unit SW5 includes a 5-1 terminal n51 connected to the second terminals of the 1-17, 2-18, 3-19, and 4-20 switching elements Sa17, Sb18, Sc19, and Sd20, a 5-2 terminal n52 connected to the first input terminal 'a' of the fifth integrator I5, and a 5-3 terminal n53 to which the common voltage Vcom is applied. The fifth switching unit SW5 supplies the common voltage Vcom to the first multiplexer MUX-S in response to the touch/display control signal Ctd supplied from the timing controller 104 in the display driving mode and supplies the touch driving voltage Vtx to the first multiplexer MUX-S in response to the touch/display control signal Ctd in the touch sensor drive.

Each of the first to fifth switching units SW1 to SW5 may be configured as an n-metal-oxide-semiconductor (MOS) transistor and a p-MOS transistor. When the switching units SW1 to SW5 are configured as described above, the two transistors may reversely operate in response to one control signal. Each of the first to fifth switching units SW1 to SW5 may be configured using two of the same type of transistors. In this instance, signals supplied to the two transistors have to be reversed.

Referring to FIG. 6A, in the display driving mode of the touch sensor integrated type display device according to the embodiment of the invention, the first to fifth switching units SW1 to SW5 connect a common voltage supply source and the first multiplexer MUX-S in response to the touch/display control signal Ctd. The 1-1 to 4-20 switching elements Sa01-Sa20, Sb01-Sb20, Sc01-Sc20, and Sd01-Sd20 of the first multiplexer MUX-S are turned on in response to the 1-1 to 1-4 switching control signals C11 to C14 supplied from the touch controller TC. Hence, the common voltage Vcom is supplied to all of the touch/common electrodes T11-T15, T21-T25, T31-T35, and T41-T45 through the touch/common routing wires W11-W41, W12-W42, W13-W43, W14-W44, and W15-W45, and data is displayed on the display screen.

In the touch sensor driving mode of the touch sensor integrated type display device according to the embodiment of the invention, the first to fifth switching units SW1 to SW5 connect the integrating block IB and the first multiplexer MUX-S in response to the touch/display control signal Ctd. The touch controller TC sequentially supplies the 1-1 to 1-4 switching control signals C11 to C14 to the first multiplexer MUX-S.

When the touch controller TC supplies the 1-1 switching control signal C11 to the first multiplexer MUX-S of the multiplexer MUX, the 1-1 switching control signal C11 is supplied to the control terminals of the 1-1 to 1-20 switching elements Sa01 to Sa20 of the first multiplexer MUX-S and turns on the 1-1 to 1-20 switching elements Sa01 to Sa20.

Hence, the touch driving voltage Vtx is supplied to the 1-1 to 1-5 touch/common electrodes T11 to T15 of a first row through the first to fifth switching units SW1 to SW5 and the 1-1 to 1-20 switching elements Sa01 to Sa20, and at the same time the 1-1 to 1-5 touch/common electrodes T11 to T15 are sensed. The 1-1 to 1-5 sensing voltages are supplied to the first input terminals 'a' of the first to fifth integrators I1 to I5 through the 1-1 to 1-20 switching elements Sa01 to Sa20 and the first to fifth switching units SW1 to SW5.

The first to fifth integrators I1 to I5 perform the supply and the sensing of the touch driving voltage Vtx several times and integrate the 1-1 to 1-5 sensing voltages. The integrated 1-1 to 1-5 sensing voltages are output to the readout IC ROIC.

The readout IC ROIC converts the integrated 1-1 to 1-5 sensing voltages into digital data of the HID format and outputs the digital data.

The touch controller TC analyzes the digital data received from the readout IC ROIC using a previously set touch recognition algorithm and calculates coordinate values. Hence, the embodiment of the invention can distinguish where a touch operation is performed at sensing locations SW11 to SW15 of the 1-1 to 1-5 touch/common electrodes T11 to T15 of the first row shown in FIGS. 6B and 6C.

Next, when the touch controller TC supplies the 1-2 switching control signal C12 to the first multiplexer MUX-S of the multiplexer MUX, the 1-2 switching control signal C12 is supplied to the control terminals of the 2-1 to 2-20 switching elements Sb01 to Sb20 of the first multiplexer MUX-S and turns on the 2-1 to 2-20 switching elements Sb01 to Sb20.

Hence, the touch driving voltage Vtx is supplied to the 2-1 to 2-5 touch/common electrodes T21 to T25 of a second row through the first to fifth switching units SW1 to SW5 and the 2-1 to 2-20 switching elements Sb01 to Sb20, and at the same time the 2-1 to 2-5 touch/common electrodes T21 to T25 are sensed. The 2-1 to 2-5 sensing voltages are supplied to the first input terminals 'a' of the first to fifth integrators I1 to I5 through the 2-1 to 2-20 switching elements Sb01 to Sb20 and the first to fifth switching units SW1 to SW5.

The first to fifth integrators I1 to I5 perform the supply and the sensing of the touch driving voltage Vtx several times and integrate the 2-1 to 2-5 sensing voltages. The integrated 2-1 to 2-5 sensing voltages are output to the readout IC ROIC.

The readout IC ROIC converts the integrated 2-1 to 2-5 sensing voltages into digital data of the HID format and outputs the digital data.

The touch controller TC analyzes the digital data received from the readout IC ROIC using the previously set touch recognition algorithm and calculates coordinate values. Hence, the embodiment of the invention can distinguish where a touch operation is performed at sensing locations SW21 to SW25 of the 2-1 to 2-5 touch/common electrodes T21 to T25 of the second row shown in FIGS. 6B and 6C.

Next, when the touch controller TC supplies the 1-3 switching control signal C13 to the first multiplexer MUX-S of the multiplexer MUX, the 1-3 switching control signal C13 is supplied to the control terminals of the 3-1 to 3-20 switching elements Sc01 to Sc20 of the first multiplexer MUX-S and turns on the 3-1 to 3-20 switching elements Sc01 to Sc20.

Hence, the touch driving voltage Vtx is supplied to the 3-1 to 3-5 touch/common electrodes T31 to T35 of a third row through the first to fifth switching units SW1 to SW5 and the 3-1 to 3-20 switching elements Sc01 to Sc20, and at the same time the 3-1 to 3-5 touch/common electrodes T31 to T35 are sensed. The 3-1 to 3-5 sensing voltages are supplied to the first input terminals 'a' of the first to fifth integrators I1 to I5 through the 3-1 to 3-20 switching elements Sc01 to Sc20 and the first to fifth switching units SW1 to SW5.

The first to fifth integrators I1 to I5 perform the supply and the sensing of the touch driving voltage Vtx several times and integrate the 3-1 to 3-5 sensing voltages. The integrated 3-1 to 3-5 sensing voltages are output to the readout IC ROIC.

The readout IC ROIC converts the integrated 3-1 to 3-5 sensing voltages into digital data of the HID format and outputs the digital data.

The touch controller TC analyzes the digital data received from the readout IC ROIC using the previously set touch recognition algorithm and calculates coordinate values. Hence, the embodiment of the invention can distinguish where a touch operation is performed at sensing locations SW31 to SW35 of the 3-1 to 3-5 touch/common electrodes T31 to T35 of the third row shown in FIGS. 6B and 6C.

Next, when the touch controller TC supplies the 1-4 switching control signal C14 to the first multiplexer MUX-S of the multiplexer MUX, the 1-4 switching control signal C14 is supplied to the control terminals of the 4-1 to 4-20 switching elements Sd01 to Sd20 of the first multiplexer MUX-S and turns on the 4-1 to 4-20 switching elements Sd01 to Sd20.

Hence, the touch driving voltage Vtx is supplied to the 4-1 to 4-5 touch/common electrodes T41 to T45 of a fourth row through the first to fifth switching units SW1 to SW5 and the 4-1 to 4-20 switching elements Sd01 to Sd20, and at the same time the 4-1 to 4-5 touch/common electrodes T41 to T45 are sensed. The 4-1 to 4-5 sensing voltages are supplied to the first input terminals 'a' of the first to fifth integrators I1 to I5 through the 4-1 to 4-20 switching elements Sd01 to Sd20 and the first to fifth switching units SW1 to SW5.

The first to fifth integrators I1 to I5 perform the supply and the sensing of the touch driving voltage Vtx several times and integrate the 4-1 to 4-5 sensing voltages. The integrated 4-1 to 4-5 sensing voltages are output to the readout IC ROIC.

The readout IC ROIC converts the integrated 4-1 to 4-5 sensing voltages into digital data of the HID format and outputs the digital data.

The touch controller TC analyzes the digital data received from the readout IC ROIC using the previously set touch recognition algorithm and calculates coordinate values. Hence, the embodiment of the invention can distinguish where a touch operation is performed at sensing locations SW41 to SW45 of the 4-1 to 4-5 touch/common electrodes T41 to T45 of the fourth row shown in FIGS. 6B and 6C.

The embodiment of the invention can distinguish where the touch operation is performed at the sensing locations SW11-SW15, SW21-SW25, SW31-SW35, and SW41-SW45 of the touch/common electrodes T11-T15, T21-T25, T31-T35, and T41-T45 through the above-described touch sensing step. The sensing locations capable of being obtained through the self-capacitive sensing step are shown in FIG. 6C.

2. First Mutual Capacitive Sensing

After the self-capacitive sensing is completed, the first mutual capacitive sensing is performed.

Figure 7A:
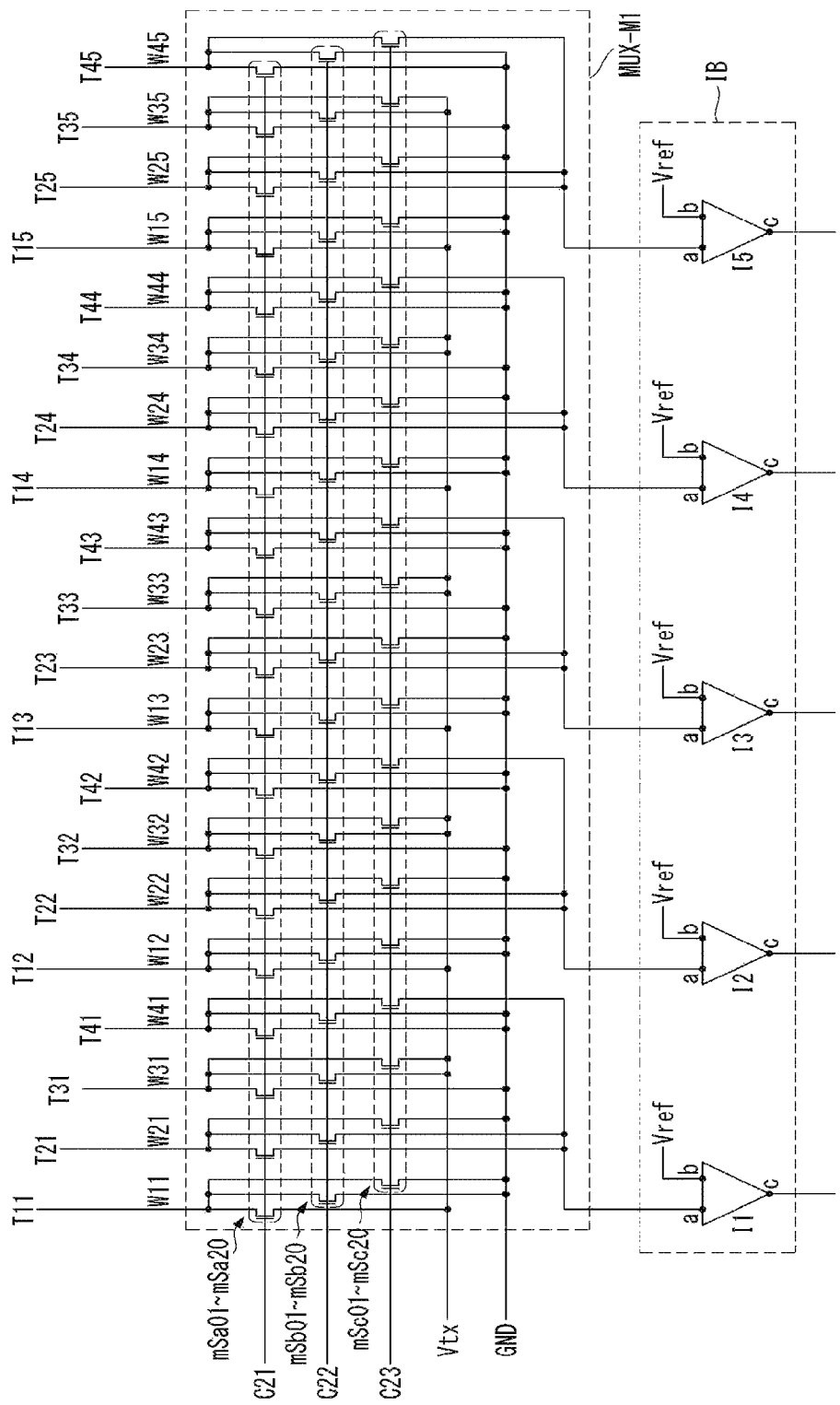
FIG. 7A is a circuit diagram showing a configuration for sensing touch/common electrodes through a first mutual capacitive method after a self-capacitive sensing in a touch sensor integrated type display device according to an exemplary embodiment of the invention.
Figure 7B:
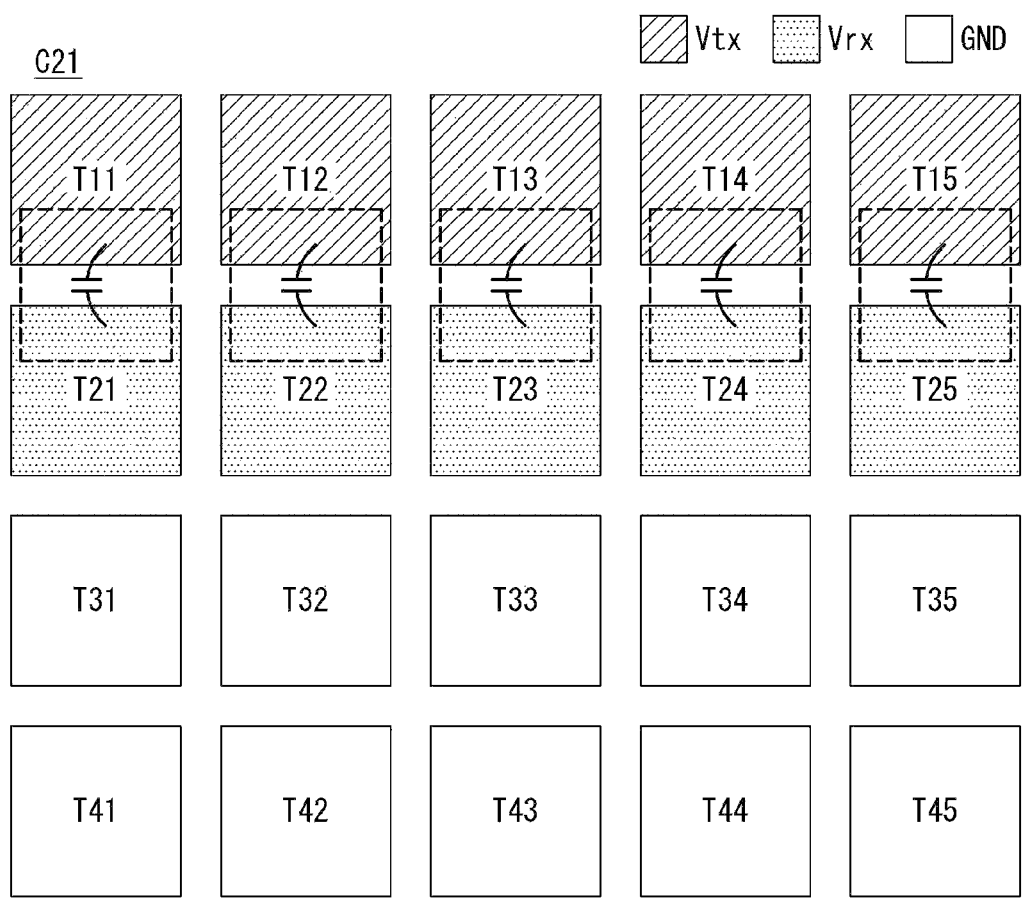
FIG. 7B is a plane view illustrating a step for sensing touch/common electrodes through a 1-1 mutual capacitive method using the circuit diagram shown in FIG. 7A.
Figure 7C:
FIG. 7C is a plane view additionally showing sensing locations capable of being sensed through the 1-1 mutual capacitive method shown in FIG. 7B.
Figure 7D:
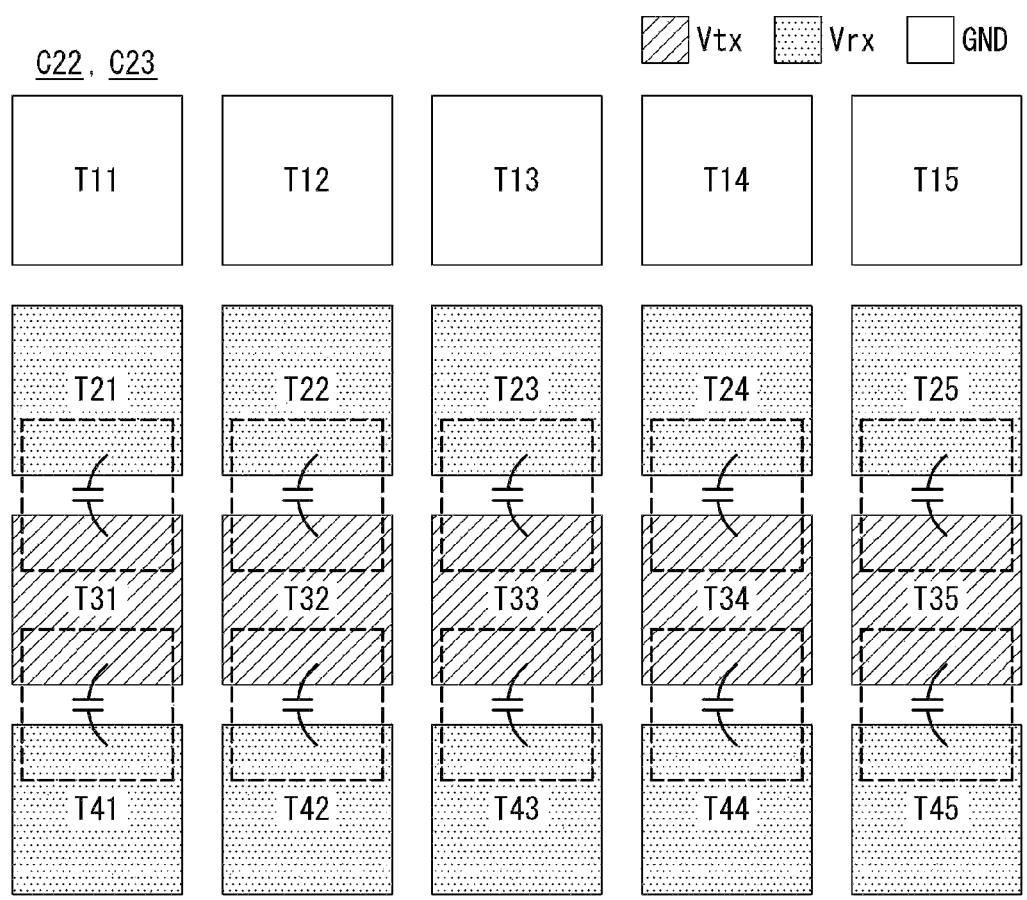
FIG. 7D is a plane view illustrating a step for sensing touch/common electrodes through a 1-2 mutual capacitive method using the circuit diagram shown in FIG. 7A.
Figure 7E:
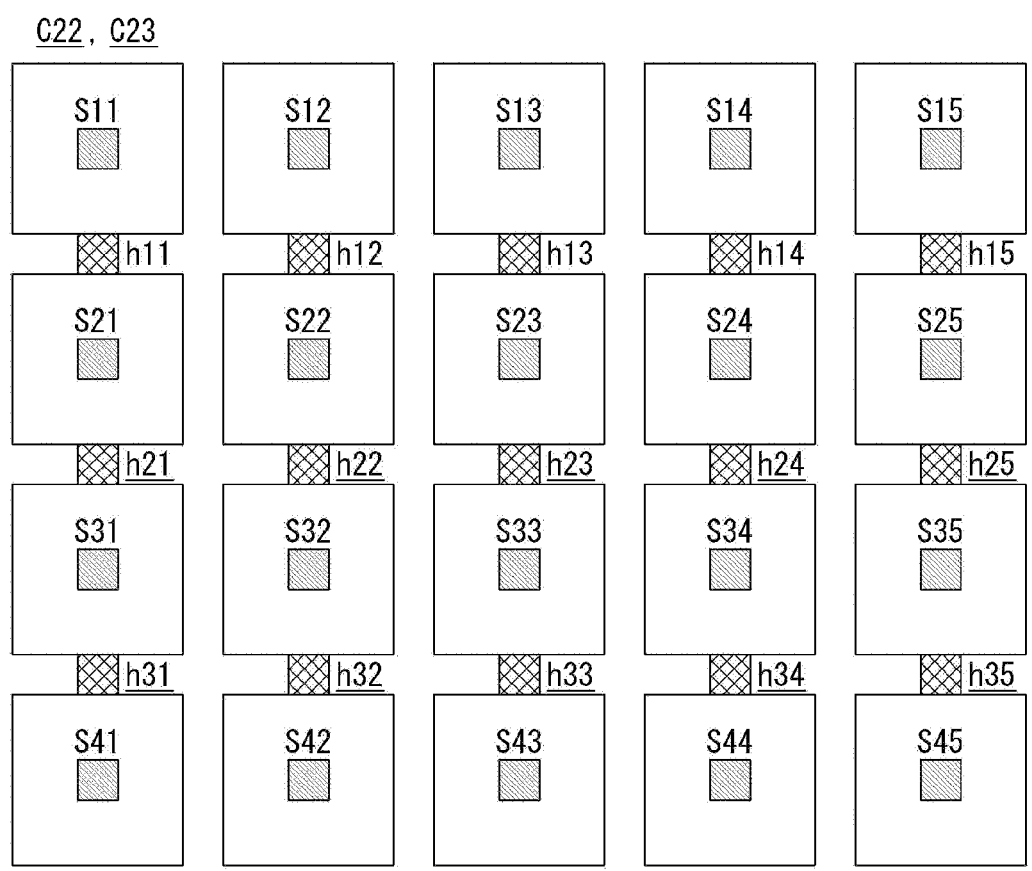
FIG. 7E is a plane view additionally showing sensing locations capable of being sensed through the 1-2 mutual capacitive method shown in FIG. 7D.

The first mutual capacitive sensing step is described below with reference to FIGS. 7A to 7E. FIG. 7A is a circuit diagram showing a configuration for sensing the touch/common electrodes through a first mutual capacitive method after the self-capacitive sensing in the touch sensor integrated type display device according to the embodiment of the invention. FIG. 7B is a plane view illustrating a step for sensing the touch/common electrodes through a 1-1 mutual capacitive method using the circuit diagram shown in FIG. 7A. FIG. 7C is a plane view additionally showing sensing locations capable of being sensed through the 1-1 mutual capacitive method shown in FIG. 7B. FIG. 7D is a plane view illustrating a step for sensing the touch/common electrodes through a 1-2 mutual capacitive method using the circuit diagram shown in FIG. 7A. FIG. 7E is a plane view additionally showing sensing locations capable of being sensed through the 1-2 mutual capacitive method shown in FIG. 7D.

Referring to FIG. 7A, the touch sensor integrated type display device for the first mutual capacitive sensing according to the embodiment of the invention includes the second multiplexer MUX-M1 of the multiplexer MUX. The second multiplexer MUX-M1 includes m1-1 to m3-20 switching elements mSa01-mSa20, mSb01-mSb20, and mSc1-mSc20.

The m1-1 switching element mSa01 includes a first terminal connected to the 1-1 touch/common routing wire W11 connected to the 1-1 touch/common electrode T11, a second terminal connected to a touch driving voltage source Vtx, and a control terminal receiving a 2-1 switching control signal C21 supplied from the touch controller TC.

The m1-2 switching element mSa02 includes a first terminal connected to the 2-1 touch/common routing wire W21 connected to the 2-1 touch/common electrode T21, a second terminal connected to the first input terminal 'a' of the first integrator I1, and a control terminal receiving the 2-1 switching control signal C21 supplied from the touch controller TC.

The m1-3 switching element mSa03 includes a first terminal connected to the 3-1 touch/common routing wire W31 connected to the 3-1 touch/common electrode T31, a second terminal connected to the ground terminal GND, and a control terminal receiving the 2-1 switching control signal C21 supplied from the touch controller TC.

The m1-4 switching element mSa04 includes a first terminal connected to the 4-1 touch/common routing wire W41 connected to the 4-1 touch/common electrode T41, a second terminal connected to the ground terminal GND, and a control terminal receiving the 2-1 switching control signal C21 supplied from the touch controller TC.

The m1-5 switching element mSa05 includes a first terminal connected to the 1-2 touch/common routing wire W12 connected to the 1-2 touch/common electrode T12, a second terminal connected to the touch driving voltage source Vtx, and a control terminal receiving the 2-1 switching control signal C21 supplied from the touch controller TC.

The m1-6 switching element mSa06 includes a first terminal connected to the 2-2 touch/common routing wire W22 connected to the 2-2 touch/common electrode T22, a second terminal connected to the first input terminal 'a' of the second integrator I2, and a control terminal receiving the 2-1 switching control signal C21 supplied from the touch controller TC.

The m1-7 switching element mSa07 includes a first terminal connected to the 3-2 touch/common routing wire W32 connected to the 3-2 touch/common electrode T32, a second terminal connected to the ground terminal GND, and a control terminal receiving the 2-1 switching control signal C21 supplied from the touch controller TC.

The m1-8 switching element mSa08 includes a first terminal connected to the 4-2 touch/common routing wire W42 connected to the 4-2 touch/common electrode T42, a second terminal connected to the ground terminal GND, and a control terminal receiving the 2-1 switching control signal C21 supplied from the touch controller TC.

The m1-9 switching element mSa09 includes a first terminal connected to the 1-3 touch/common routing wire W13 connected to the 1-3 touch/common electrode T13, a second terminal connected to the touch driving voltage source Vtx, and a control terminal receiving the 2-1 switching control signal C21 supplied from the touch controller TC.

The m1-10 switching element mSa10 includes a first terminal connected to the 2-3 touch/common routing wire W23 connected to the 2-3 touch/common electrode T23, a second terminal connected to the first input terminal 'a' of the third integrator I3, and a control terminal receiving the 2-1 switching control signal C21 supplied from the touch controller TC.

The m1-11 switching element mSa11 includes a first terminal connected to the 3-3 touch/common routing wire W33 connected to the 3-3 touch/common electrode T33, a second terminal connected to the ground terminal GND, and a control terminal receiving the 2-1 switching control signal C21 supplied from the touch controller TC.

The m1-12 switching element mSa12 includes a first terminal connected to the 4-3 touch/common routing wire W43 connected to the 4-3 touch/common electrode T43, a second terminal connected to the ground terminal GND, and a control terminal receiving the 2-1 switching control signal C21 supplied from the touch controller TC.

The m1-13 switching element mSa13 includes a first terminal connected to the 1-4 touch/common routing wire W14 connected to the 1-4 touch/common electrode T14, a second terminal connected to the touch driving voltage source Vtx, and a control terminal receiving the 2-1 switching control signal C21 supplied from the touch controller TC.

The m1-14 switching element mSa14 includes a first terminal connected to the 2-4 touch/common routing wire W24 connected to the 2-4 touch/common electrode T24, a second terminal connected to the first input terminal 'a' of the fourth integrator I4, and a control terminal receiving the 2-1 switching control signal C21 supplied from the touch controller TC.

The m1-15 switching element mSa15 includes a first terminal connected to the 3-4 touch/common routing wire W34 connected to the 3-4 touch/common electrode T34, a second terminal connected to the ground terminal GND, and a control terminal receiving the 2-1 switching control signal C21 supplied from the touch controller TC.

The m1-16 switching element mSa16 includes a first terminal connected to the 4-4 touch/common routing wire W44 connected to the 4-4 touch/common electrode T44, a second terminal connected to the ground terminal GND, and a control terminal receiving the 2-1 switching control signal C21 supplied from the touch controller TC.

The m1-17 switching element mSa17 includes a first terminal connected to the 1-5 touch/common routing wire W15 connected to the 1-5 touch/common electrode T15, a second terminal connected to the touch driving voltage source Vtx, and a control terminal receiving the 2-1 switching control signal C21 supplied from the touch controller TC.

The m1-18 switching element mSa18 includes a first terminal connected to the 2-5 touch/common routing wire W25 connected to the 2-5 touch/common electrode T25, a second terminal connected to the first input terminal 'a' of the fifth integrator I5, and a control terminal receiving the 2-1 switching control signal C21 supplied from the touch controller TC.

The m1-19 switching element mSa19 includes a first terminal connected to the 3-5 touch/common routing wire W35 connected to the 3-5 touch/common electrode T35, a second terminal connected to the ground terminal GND, and a control terminal receiving the 2-1 switching control signal C21 supplied from the touch controller TC.

The m1-20 switching element mSa20 includes a first terminal connected to the 4-5 touch/common routing wire W45 connected to the 4-5 touch/common electrode T45, a second terminal connected to the ground terminal GND, and a control terminal receiving the 2-1 switching control signal C21 supplied from the touch controller TC.

The m2-1 switching element mSb01 includes a first terminal connected to the 1-1 touch/common routing wire W11 connected to the 1-1 touch/common electrode T11, a second terminal connected to the ground terminal GND, and a control terminal receiving a 2-2 switching control signal C22 supplied from the touch controller TC.

The m2-2 switching element mSb02 includes a first terminal connected to the 2-1 touch/common routing wire W21 connected to the 2-1 touch/common electrode T21, a second terminal connected to the first input terminal 'a' of the first integrator I1, and a control terminal receiving the 2-2 switching control signal C22 supplied from the touch controller TC.

The m2-3 switching element mSb03 includes a first terminal connected to the 3-1 touch/common routing wire W31 connected to the 3-1 touch/common electrode T31, a second terminal connected to the touch driving voltage source Vtx, and a control terminal receiving the 2-2 switching control signal C22 supplied from the touch controller TC.

The m2-4 switching element mSb04 includes a first terminal connected to the 4-1 touch/common routing wire W41 connected to the 4-1 touch/common electrode T41, a second terminal connected to the ground terminal GND, and a control terminal receiving the 2-2 switching control signal C22 supplied from the touch controller TC.

The m2-5 switching element mSb05 includes a first terminal connected to the 1-2 touch/common routing wire W12 connected to the 1-2 touch/common electrode T12, a second terminal connected to the ground terminal GND, and a control terminal receiving the 2-2 switching control signal C22 supplied from the touch controller TC.

The m2-6 switching element mSb06 includes a first terminal connected to the 2-2 touch/common routing wire W22 connected to the 2-2 touch/common electrode T22, a second terminal connected to the first input terminal 'a' of the second integrator I2, and a control terminal receiving the 2-2 switching control signal C22 supplied from the touch controller TC.

The m2-7 switching element mSb07 includes a first terminal connected to the 3-2 touch/common routing wire W32 connected to the 3-2 touch/common electrode T32, a second terminal connected to the touch driving voltage source Vtx, and a control terminal receiving the 2-2 switching control signal C22 supplied from the touch controller TC.

The m2-8 switching element mSb08 includes a first terminal connected to the 4-2 touch/common routing wire W42 connected to the 4-2 touch/common electrode T42, a second terminal connected to the ground terminal GND, and a control terminal receiving the 2-2 switching control signal C22 supplied from the touch controller TC.

The m2-9 switching element mSb09 includes a first terminal connected to the 1-3 touch/common routing wire W13 connected to the 1-3 touch/common electrode T13, a second terminal connected to the ground terminal GND, and a control terminal receiving the 2-2 switching control signal C22 supplied from the touch controller TC.

The m2-10 switching element mSb10 includes a first terminal connected to the 2-3 touch/common routing wire W23 connected to the 2-3 touch/common electrode T23, a second terminal connected to the first input terminal 'a' of the third integrator I3, and a control terminal receiving the 2-2 switching control signal C22 supplied from the touch controller TC.

The m2-11 switching element mSb11 includes a first terminal connected to the 3-3 touch/common routing wire W33 connected to the 3-3 touch/common electrode T33, a second terminal connected to the touch driving voltage source Vtx, and a control terminal receiving the 2-2 switching control signal C22 supplied from the touch controller TC.

The m2-12 switching element mSb12 includes a first terminal connected to the 4-3 touch/common routing wire W43 connected to the 4-3 touch/common electrode T43, a second terminal connected to the ground terminal GND, and a control terminal receiving the 2-2 switching control signal C22 supplied from the touch controller TC.

The m2-13 switching element mSb13 includes a first terminal connected to the 1-4 touch/common routing wire W14 connected to the 1-4 touch/common electrode T14, a second terminal connected to the ground terminal GND, and a control terminal receiving the 2-2 switching control signal C22 supplied from the touch controller TC.

The m2-14 switching element mSb14 includes a first terminal connected to the 2-4 touch/common routing wire W24 connected to the 2-4 touch/common electrode T24, a second terminal connected to the first input terminal 'a' of the fourth integrator I4, and a control terminal receiving the 2-2 switching control signal C22 supplied from the touch controller TC.

The m2-15 switching element mSb15 includes a first terminal connected to the 3-4 touch/common routing wire W34 connected to the 3-4 touch/common electrode T34, a second terminal connected to the touch driving voltage source Vtx, and a control terminal receiving the 2-2 switching control signal C22 supplied from the touch controller TC.

The m2-16 switching element mSb16 includes a first terminal connected to the 4-4 touch/common routing wire W44 connected to the 4-4 touch/common electrode T44, a second terminal connected to the ground terminal GND, and a control terminal receiving the 2-2 switching control signal C22 supplied from the touch controller TC.

The m2-17 switching element mSb17 includes a first terminal connected to the 1-5 touch/common routing wire W15 connected to the 1-5 touch/common electrode T15, a second terminal connected to the ground terminal GND, and a control terminal receiving the 2-2 switching control signal C22 supplied from the touch controller TC.

The m2-18 switching element mSb18 includes a first terminal connected to the 2-5 touch/common routing wire W25 connected to the 2-5 touch/common electrode T25, a second terminal connected to the first input terminal 'a' of the fifth integrator I5, and a control terminal receiving the 2-2 switching control signal C22 supplied from the touch controller TC.

The m2-19 switching element mSb19 includes a first terminal connected to the 3-5 touch/common routing wire W35 connected to the 3-5 touch/common electrode T35, a second terminal connected to the touch driving voltage source Vtx, and a control terminal receiving the 2-2 switching control signal C22 supplied from the touch controller TC.

The m2-20 switching element mSb20 includes a first terminal connected to the 4-5 touch/common routing wire W45 connected to the 4-5 touch/common electrode T45, a second terminal connected to the ground terminal GND, and a control terminal receiving the 2-2 switching control signal C22 supplied from the touch controller TC.

The m3-1 switching element mSc01 includes a first terminal connected to the 1-1 touch/common routing wire W11 connected to the 1-1 touch/common electrode T11, a second terminal connected to the ground terminal GND, and a control terminal receiving a 2-3 switching control signal C23 supplied from the touch controller TC.

The m3-2 switching element mSc2 includes a first terminal connected to the 2-1 touch/common routing wire W21 connected to the 2-1 touch/common electrode T21, a second terminal connected to the ground terminal GND, and a control terminal receiving the 2-3 switching control signal C23 supplied from the touch controller TC.

The m3-3 switching element mSc03 includes a first terminal connected to the 3-1 touch/common routing wire W31 connected to the 3-1 touch/common electrode T31, a second terminal connected to the touch driving voltage source Vtx, and a control terminal receiving the 2-3 switching control signal C23 supplied from the touch controller TC.

The m3-4 switching element mSc04 includes a first terminal connected to the 4-1 touch/common routing wire W41 connected to the 4-1 touch/common electrode T41, a second terminal connected to the first input terminal 'a' of the first integrator I1, and a control terminal receiving the 2-3 switching control signal C23 supplied from the touch controller TC.

The m3-5 switching element mSc05 includes a first terminal connected to the 1-2 touch/common routing wire W12 connected to the 1-2 touch/common electrode T12, a second terminal connected to the ground terminal GND, and a control terminal receiving the 2-3 switching control signal C23 supplied from the touch controller TC.

The m3-6 switching element mSc06 includes a first terminal connected to the 2-2 touch/common routing wire W22 connected to the 2-2 touch/common electrode T22, a second terminal connected to the ground terminal GND, and a control terminal receiving the 2-3 switching control signal C23 supplied from the touch controller TC.

The m3-7 switching element mSc07 includes a first terminal connected to the 3-2 touch/common routing wire W32 connected to the 3-2 touch/common electrode T32, a second terminal connected to the touch driving voltage source Vtx, and a control terminal receiving the 2-3 switching control signal C23 supplied from the touch controller TC.

The m3-8 switching element mSc08 includes a first terminal connected to the 4-2 touch/common routing wire W42 connected to the 4-2 touch/common electrode T42, a second terminal connected to the first input terminal 'a' of the second integrator I2, and a control terminal receiving the 2-3 switching control signal C23 supplied from the touch controller TC.

The m3-9 switching element mSc09 includes a first terminal connected to the 1-3 touch/common routing wire W13 connected to the 1-3 touch/common electrode T13, a second terminal connected to the ground terminal GND, and a control terminal receiving the 2-3 switching control signal C23 supplied from the touch controller TC.

The m3-10 switching element mSc10 includes a first terminal connected to the 2-3 touch/common routing wire W23 connected to the 2-3 touch/common electrode T23, a second terminal connected to the ground terminal GND, and a control terminal receiving the 2-3 switching control signal C23 supplied from the touch controller TC.

The m3-11 switching element mSc11 includes a first terminal connected to the 3-3 touch/common routing wire W33 connected to the 3-3 touch/common electrode T33, a second terminal connected to the touch driving voltage source Vtx, and a control terminal receiving the 2-3 switching control signal C23 supplied from the touch controller TC.

The m3-12 switching element mSc12 includes a first terminal connected to the 4-3 touch/common routing wire W43 connected to the 4-3 touch/common electrode T43, a second terminal connected to the first input terminal 'a' of the third integrator I3, and a control terminal receiving the 2-3 switching control signal C23 supplied from the touch controller TC.

The m3-13 switching element mSc13 includes a first terminal connected to the 1-4 touch/common routing wire W14 connected to the 1-4 touch/common electrode T14, a second terminal connected to the ground terminal GND, and a control terminal receiving the 2-3 switching control signal C23 supplied from the touch controller TC.

The m3-14 switching element mSc14 includes a first terminal connected to the 2-4 touch/common routing wire W24 connected to the 2-4 touch/common electrode T24, a second terminal connected to the ground terminal GND, and a control terminal receiving the 2-3 switching control signal C23 supplied from the touch controller TC.

The m3-15 switching element mSc15 includes a first terminal connected to the 3-4 touch/common routing wire W34 connected to the 3-4 touch/common electrode T34, a second terminal connected to the touch driving voltage source Vtx, and a control terminal receiving the 2-3 switching control signal C23 supplied from the touch controller TC.

The m3-16 switching element mSc16 includes a first terminal connected to the 4-4 touch/common routing wire W44 connected to the 4-4 touch/common electrode T44, a second terminal connected to the first input terminal 'a' of the fourth integrator I4, and a control terminal receiving the 2-3 switching control signal C23 supplied from the touch controller TC.

The m3-17 switching element mSc17 includes a first terminal connected to the 1-5 touch/common routing wire W15 connected to the 1-5 touch/common electrode T15, a second terminal connected to the ground terminal GND, and a control terminal receiving the 2-3 switching control signal C23 supplied from the touch controller TC.

The m3-18 switching element mSc18 includes a first terminal connected to the 2-5 touch/common routing wire W25 connected to the 2-5 touch/common electrode T25, a second terminal connected to the ground terminal GND, and a control terminal receiving the 2-3 switching control signal C23 supplied from the touch controller TC.

The m3-19 switching element mSc19 includes a first terminal connected to the 3-5 touch/common routing wire W35 connected to the 3-5 touch/common electrode T35, a second terminal connected to the touch driving voltage source Vtx, and a control terminal receiving the 2-3 switching control signal C23 supplied from the touch controller TC.

The m3-20 switching element mSc20 includes a first terminal connected to the 4-5 touch/common routing wire W45 connected to the 4-5 touch/common electrode T45, a second terminal connected to the first input terminal 'a' of the fifth integrator I5, and a control terminal receiving the 2-3 switching control signal C23 supplied from the touch controller TC.

The m1-1 to m3-20 switching elements mSa01-mSa20, mSb01-mSb20, and mSc1-mSc20 may be implemented as switching thin film transistors.

Next, the first mutual capacitive sensing step of the horizontal direction is described with reference to FIGS. 7A to 7E.

When the touch controller TC supplies the 2-1 switching control signal C21 to the second multiplexer MUX-M1 of the multiplexer MUX, the 2-1 switching control signal C21 is supplied to the control terminals of the m1-1 to m1-20 switching elements mSa01 to mSa20 of the second multiplexer MUX-M1 and turns on the m1-1 to m1-20 switching elements mSa01 to mSa20.

Hence, the touch driving voltage Vtx is supplied to the 1-1 to 1-5 touch/common electrodes T11 to T15 of a first row. The 2-1 to 2-5 touch/common electrodes T21 to T25 of a second row are respectively connected to the first input terminals 'a' of the first to fifth integrators I1 to I5.

Accordingly, as shown in FIG. 7B, mutual capacitances generated between the 1-1 to 1-5 touch/common electrodes T11 to T15 and the 2-1 to 2-5 touch/common electrodes T21 to T25 are sensed through the 2-1 to 2-5 touch/common electrodes T21 to T25 and may obtain sensing voltages Vrx. Therefore, as shown in FIG. 7C, sensing locations h11 to h15 of a first horizontal location may be obtained.

Next, when the touch controller TC stops supplying the 2-1 switching control signal C21 and supplies the 2-2 switching control signal C22 to the second multiplexer MUX-M1 of the multiplexer MUX, the 2-2 switching control signal C22 is supplied to the control terminals of the m2-1 to m2-20 switching elements mSb01 to mSb20 of the second multiplexer MUX-M1 and turns on the m2-1 to m2-20 switching elements mSb01 to mSb20.

Hence, the touch driving voltage Vtx is supplied to the 3-1 to 3-5 touch/common electrodes T31 to T35 of a third row. The 2-1 to 2-5 touch/common electrodes T21 to T25 of the second row are respectively connected to the first input terminals 'a' of the first to fifth integrators I1 to I5.

Accordingly, as shown in FIG. 7D, mutual capacitances generated between the 2-1 to 2-5 touch/common electrodes T21 to T25 and the 3-1 to 3-5 touch/common electrodes T31 to T35 are sensed through the 2-1 to 2-5 touch/common electrodes T21 to T25 and may obtain the sensing voltages Vrx. Therefore, as shown in FIG. 7E, sensing locations h21 to h25 of a second horizontal location may be obtained.

Next, when the touch controller TC stops supplying the 2-2 switching control signal C22 and supplies the 2-3 switching control signal C23 to the second multiplexer MUX-M1 of the multiplexer MUX, the 2-3 switching control signal C23 is supplied to the control terminals of the m3-1 to m3-20 switching elements mSc01 to mSc20 of the second multiplexer MUX-M1 and turns on the m3-1 to m3-20 switching elements mSc01 to mSc20.

Hence, the touch driving voltage Vtx is supplied to the 3-1 to 3-5 touch/common electrodes T31 to T35 of the third row. The 4-1 to 4-5 touch/common electrodes T41 to T45 of a fourth row are respectively connected to the first input terminals 'a' of the first to fifth integrators I1 to I5.

Accordingly, as shown in FIG. 7D, mutual capacitances generated between the 3-1 to 3-5 touch/common electrodes T31 to T35 and the 4-1 to 4-5 touch/common electrodes T41 to T45 are sensed through the 4-1 to 4-5 touch/common electrodes T41 to T45 and may obtain the sensing voltages Vrx. Therefore, as shown in FIG. 7E, sensing locations h31 to h35 of a third horizontal location may be obtained.

3. Second Mutual Capacitive Sensing

After the first mutual capacitive sensing is completed, the second mutual capacitive sensing is performed.

Figure 8A:
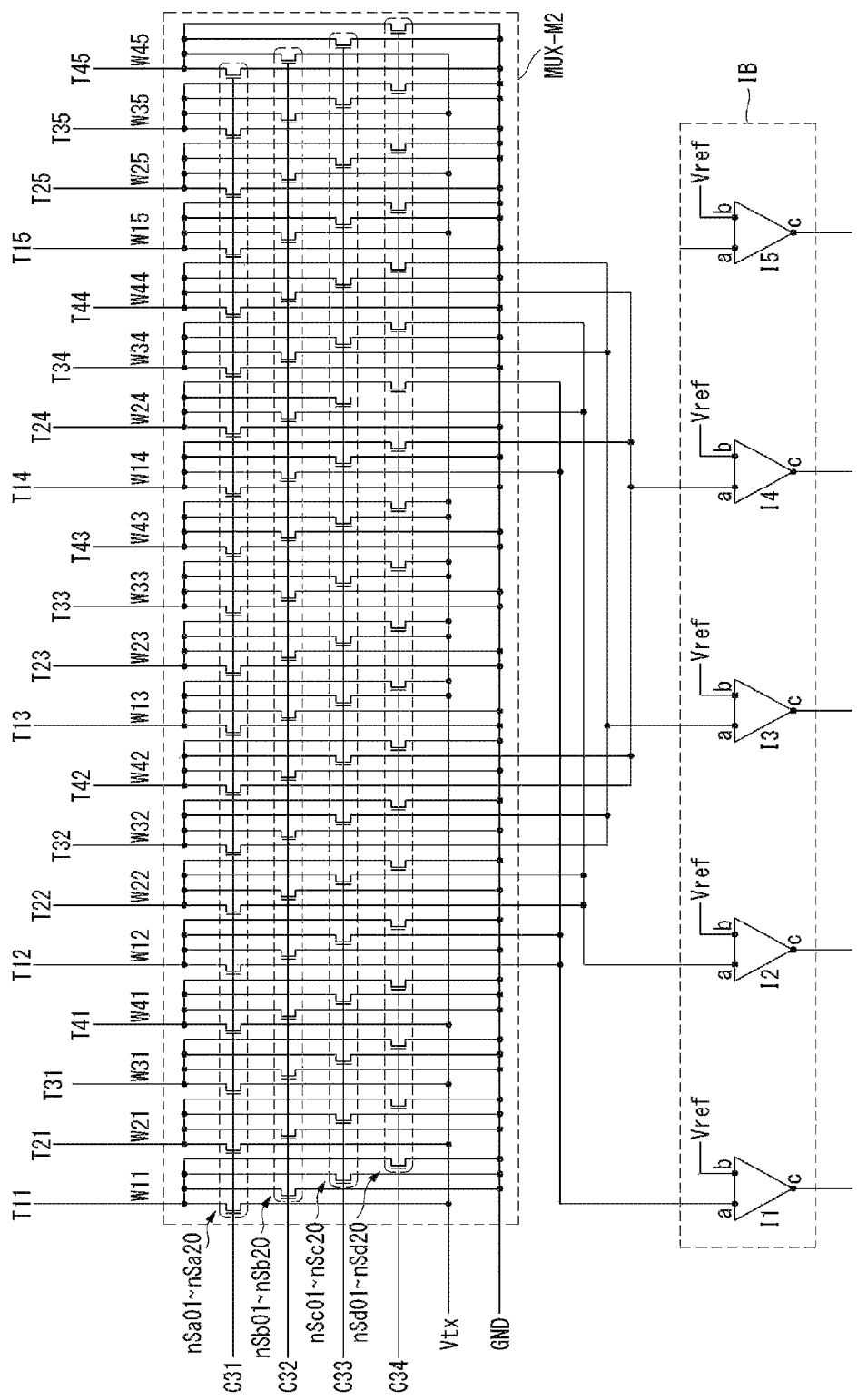
FIG. 8A is a circuit diagram showing a configuration for sensing touch/common electrodes through a second mutual capacitive method after a first mutual capacitive sensing in a touch sensor integrated type display device according to an exemplary embodiment of the invention.
Figure 8B:
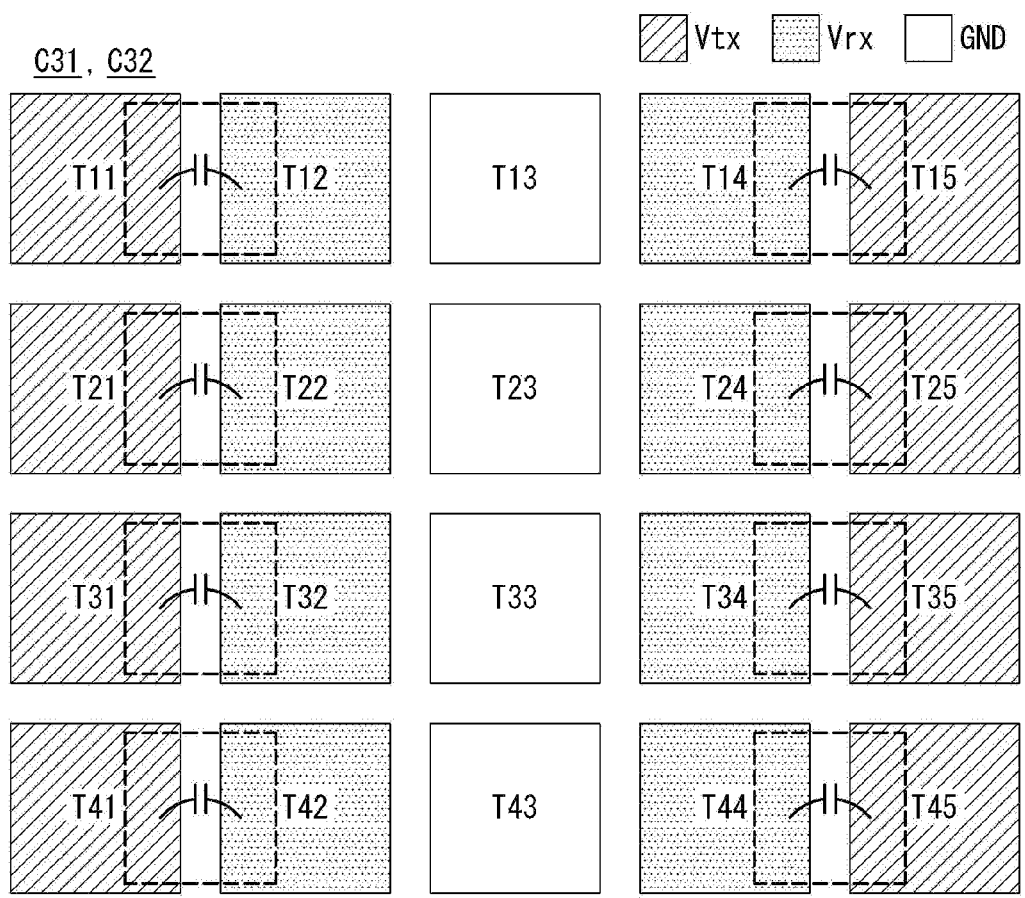
FIG. 8B is a plane view illustrating a step for sensing touch/common electrodes through a 2-1 mutual capacitive method using the circuit diagram shown in FIG. 8A.
Figure 8C:
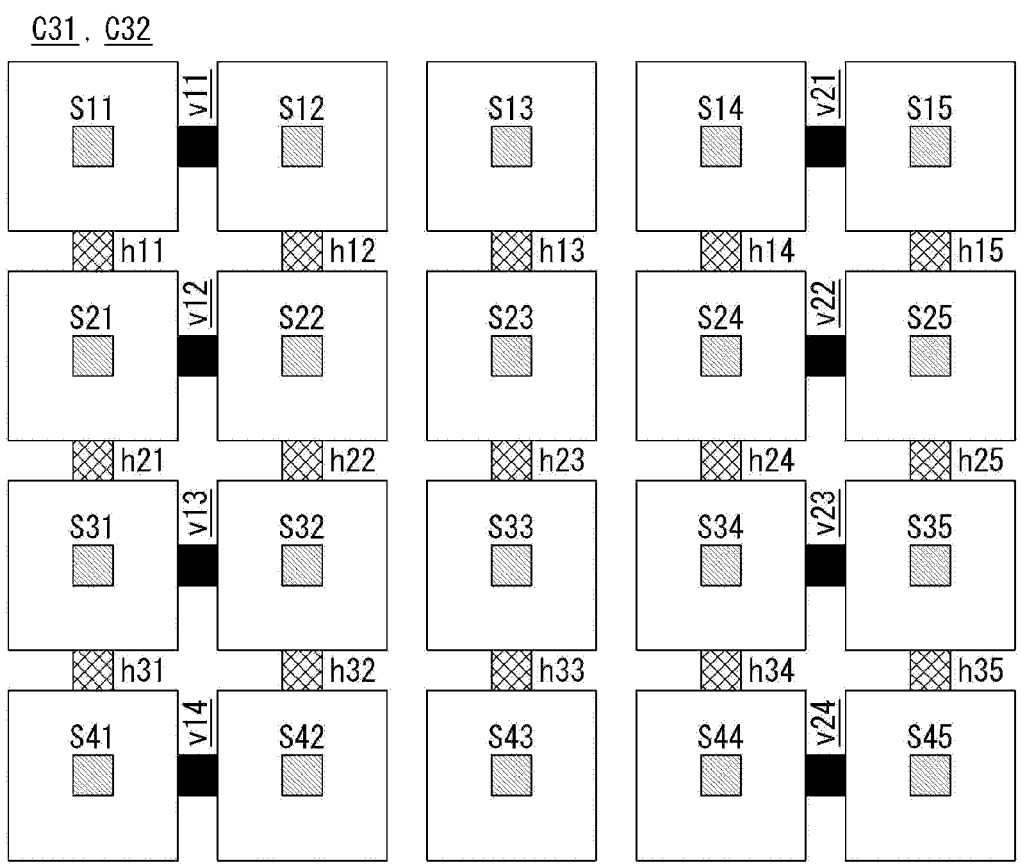
FIG. 8C is a plane view additionally showing sensing locations capable of being sensed through the 2-1 mutual capacitive method shown in FIG. 8B.
Figure 8D:
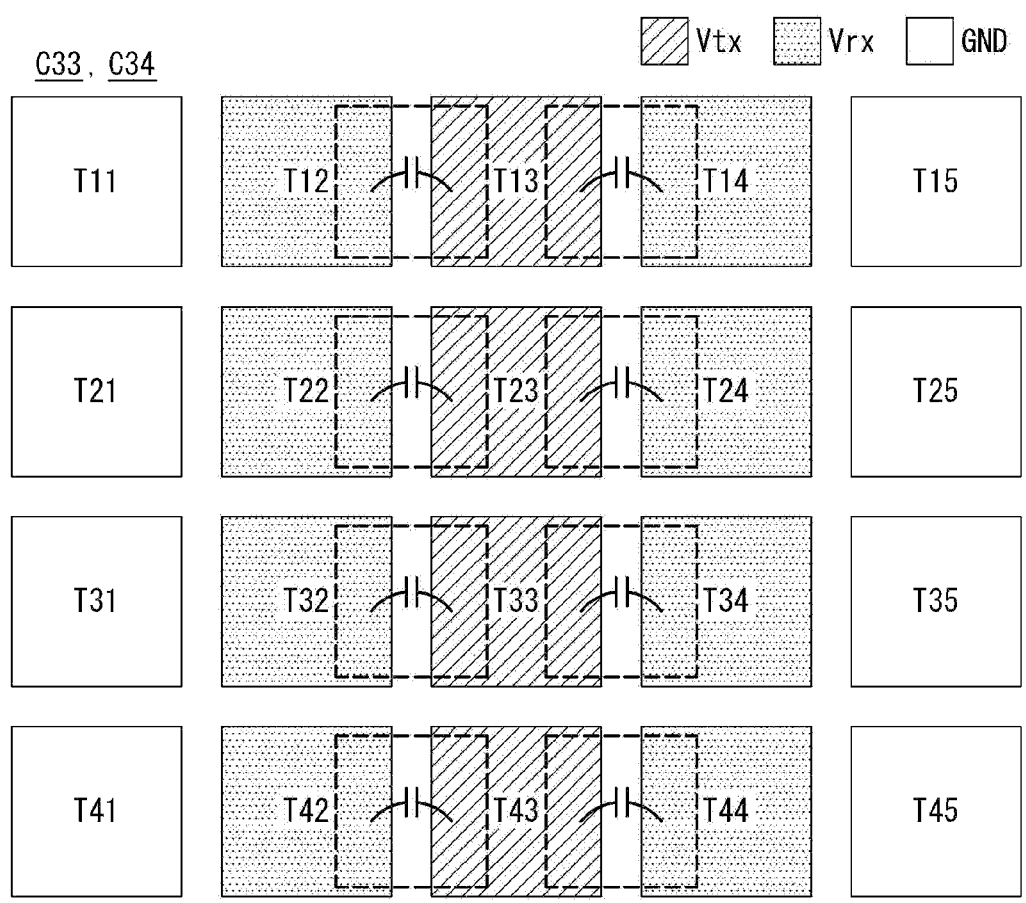
FIG. 8D is a plane view illustrating a step for sensing touch/common electrodes through a 2-2 mutual capacitive method using the circuit diagram shown in FIG. 8A.
Figure 8E:
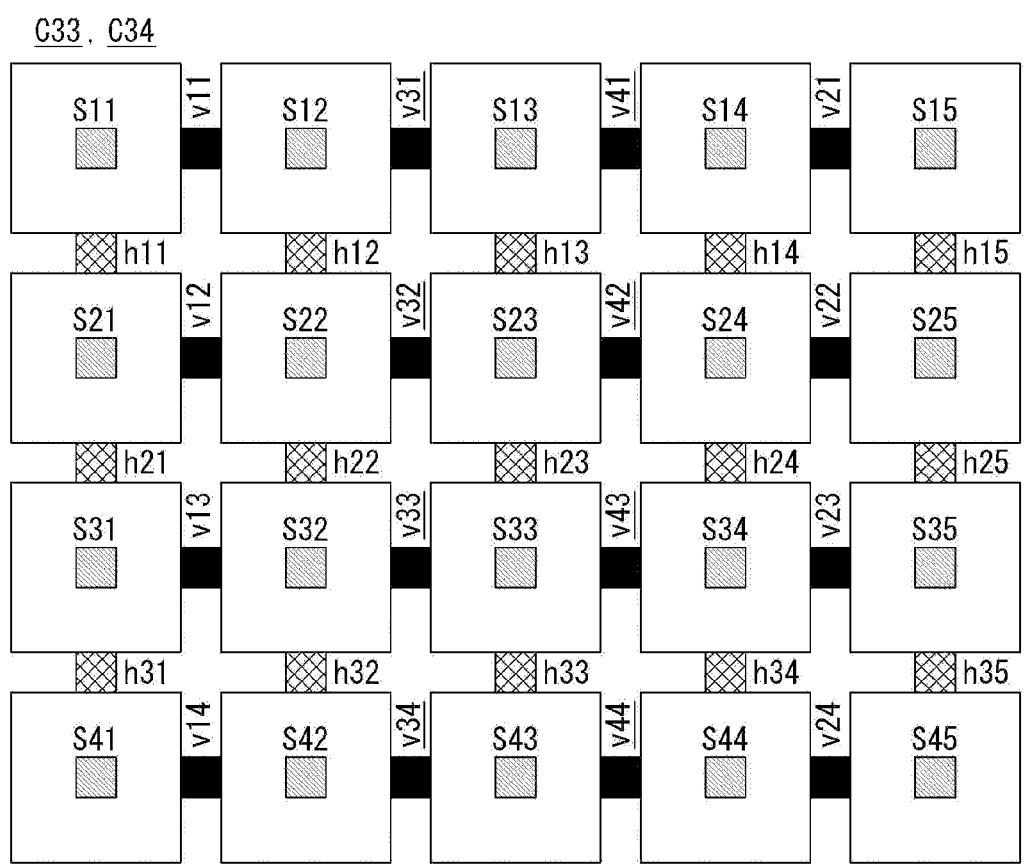
FIG. 8E is a plane view additionally showing sensing locations capable of being sensed through the 2-2 mutual capacitive method shown in FIG. 8D.

The second mutual capacitive sensing step is described below with reference to FIGS. 8A to 8E. FIG. 8A is a circuit diagram showing a configuration for sensing the touch/common electrodes through a second mutual capacitive method after the first mutual capacitive sensing in the touch sensor integrated type display device according to the embodiment of the invention. FIG. 8B is a plane view illustrating a step for sensing the touch/common electrodes through a 2-1 mutual capacitive method using the circuit diagram shown in FIG. 8A. FIG. 8C is a plane view additionally showing sensing locations capable of being sensed through the 2-1 mutual capacitive method shown in FIG. 8B. FIG. 8D is a plane view illustrating a step for sensing the touch/common electrodes through a 2-2 mutual capacitive method using the circuit diagram shown in FIG. 8A. FIG. 8E is a plane view additionally showing sensing locations capable of being sensed through the 2-2 mutual capacitive method shown in FIG. 8D.

Referring to FIG. 8A, the touch sensor integrated type display device for the second mutual capacitive sensing according to the embodiment of the invention includes the third multiplexer MUX-M2 of the multiplexer MUX. The third multiplexer MUX-M2 includes n1-1 to n4-20 switching elements nSa01-nSa20, nSb01-nSb20, nSc01-nSc20, and nSd01-nSd20.

The n1-1 switching element nSa01 includes a first terminal connected to the 1-1 touch/common routing wire W11 connected to the 1-1 touch/common electrode T11, a second terminal connected to the touch driving voltage source Vtx, and a control terminal receiving a 3-1 switching control signal C31 supplied from the touch controller TC.

The n1-2 switching element nSa02 includes a first terminal connected to the 2-1 touch/common routing wire W21 connected to the 2-1 touch/common electrode T21, a second terminal connected to the touch driving voltage source Vtx, and a control terminal receiving the 3-1 switching control signal C31 supplied from the touch controller TC.

The n1-3 switching element nSa03 includes a first terminal connected to the 3-1 touch/common routing wire W31 connected to the 3-1 touch/common electrode T31, a second terminal connected to the touch driving voltage source Vtx, and a control terminal receiving the 3-1 switching control signal C31 supplied from the touch controller TC.

The n1-4 switching element nSa04 includes a first terminal connected to the 4-1 touch/common routing wire W41 connected to the 4-1 touch/common electrode T41, a second terminal connected to the touch driving voltage source Vtx, and a control terminal receiving the 3-1 switching control signal C31 supplied from the touch controller TC.

The n1-5 switching element nSa05 includes a first terminal connected to the 1-2 touch/common routing wire W12 connected to the 1-2 touch/common electrode T12, a second terminal connected to the first input terminal 'a' of the first integrator I1, and a control terminal receiving the 3-1 switching control signal C31 supplied from the touch controller TC.

The n1-6 switching element nSa06 includes a first terminal connected to the 2-2 touch/common routing wire W22 connected to the 2-2 touch/common electrode T22, a second terminal connected to the first input terminal 'a' of the second integrator I2, and a control terminal receiving the 3-1 switching control signal C31 supplied from the touch controller TC.

The n1-7 switching element nSa07 includes a first terminal connected to the 3-2 touch/common routing wire W32 connected to the 3-2 touch/common electrode T32, a second terminal connected to the first input terminal 'a' of the third integrator I3, and a control terminal receiving the 3-1 switching control signal C31 supplied from the touch controller TC.

The n1-8 switching element nSa08 includes a first terminal connected to the 4-2 touch/common routing wire W42 connected to the 4-2 touch/common electrode T42, a second terminal connected to the first input terminal 'a' of the fourth integrator I4, and a control terminal receiving the 3-1 switching control signal C31 supplied from the touch controller TC.

The n1-9 switching element nSa09 includes a first terminal connected to the 1-3 touch/common routing wire W13 connected to the 1-3 touch/common electrode T13, a second terminal connected to the ground terminal GND, and a control terminal receiving the 3-1 switching control signal C31 supplied from the touch controller TC.

The n1-10 switching element nSa10 includes a first terminal connected to the 2-3 touch/common routing wire W23 connected to the 2-3 touch/common electrode T23, a second terminal connected to the ground terminal GND, and a control terminal receiving the 3-1 switching control signal C31 supplied from the touch controller TC.

The n1-11 switching element nSa11 includes a first terminal connected to the 3-3 touch/common routing wire W33 connected to the 3-3 touch/common electrode T33, a second terminal connected to the ground terminal GND, and a control terminal receiving the 3-1 switching control signal C31 supplied from the touch controller TC.

The n1-12 switching element nSa12 includes a first terminal connected to the 4-3 touch/common routing wire W43 connected to the 4-3 touch/common electrode T43, a second terminal connected to the ground terminal GND, and a control terminal receiving the 3-1 switching control signal C31 supplied from the touch controller TC.

The n1-13 switching element nSa13 includes a first terminal connected to the 1-4 touch/common routing wire W14 connected to the 1-4 touch/common electrode T14, a second terminal connected to the ground terminal GND, and a control terminal receiving the 3-1 switching control signal C31 supplied from the touch controller TC.

The n1-14 switching element nSa14 includes a first terminal connected to the 2-4 touch/common routing wire W24 connected to the 2-4 touch/common electrode T24, a second terminal connected to the ground terminal GND, and a control terminal receiving the 3-1 switching control signal C31 supplied from the touch controller TC.

The n1-15 switching element nSa15 includes a first terminal connected to the 3-4 touch/common routing wire W34 connected to the 3-4 touch/common electrode T34, a second terminal connected to the ground terminal GND, and a control terminal receiving the 3-1 switching control signal C31 supplied from the touch controller TC.

The n1-16 switching element nSa16 includes a first terminal connected to the 4-4 touch/common routing wire W44 connected to the 4-4 touch/common electrode T44, a second terminal connected to the ground terminal GND, and a control terminal receiving the 3-1 switching control signal C31 supplied from the touch controller TC.

The n1-17 switching element nSa17 includes a first terminal connected to the 1-5 touch/common routing wire W15 connected to the 1-5 touch/common electrode T15, a second terminal connected to the ground terminal GND, and a control terminal receiving the 3-1 switching control signal C31 supplied from the touch controller TC.

The n1-18 switching element nSa18 includes a first terminal connected to the 2-5 touch/common routing wire W25 connected to the 2-5 touch/common electrode T25, a second terminal connected to the ground terminal GND, and a control terminal receiving the 3-1 switching control signal C31 supplied from the touch controller TC.

The n1-19 switching element nSa19 includes a first terminal connected to the 3-5 touch/common routing wire W35 connected to the 3-5 touch/common electrode T35, a second terminal connected to the ground terminal GND, and a control terminal receiving the 3-1 switching control signal C31 supplied from the touch controller TC.

The n1-20 switching element nSa20 includes a first terminal connected to the 4-5 touch/common routing wire W45 connected to the 4-5 touch/common electrode T45, a second terminal connected to the ground terminal GND, and a control terminal receiving the 3-1 switching control signal C31 supplied from the touch controller TC.

The n2-1 switching element nSb01 includes a first terminal connected to the 1-1 touch/common routing wire W11 connected to the 1-1 touch/common electrode T11, a second terminal connected to the ground terminal GND, and a control terminal receiving a 3-2 switching control signal C32 supplied from the touch controller TC.

The n2-2 switching element nSb02 includes a first terminal connected to the 2-1 touch/common routing wire W21 connected to the 2-1 touch/common electrode T21, a second terminal connected to the ground terminal GND, and a control terminal receiving the 3-2 switching control signal C32 supplied from the touch controller TC.

The n2-3 switching element nSb03 includes a first terminal connected to the 3-1 touch/common routing wire W31 connected to the 3-1 touch/common electrode T31, a second terminal connected to the ground terminal GND, and a control terminal receiving the 3-2 switching control signal C32 supplied from the touch controller TC.

The n2-4 switching element nSb04 includes a first terminal connected to the 4-1 touch/common routing wire W41 connected to the 4-1 touch/common electrode T41, a second terminal connected to the ground terminal GND, and a control terminal receiving the 3-2 switching control signal C32 supplied from the touch controller TC.

The n2-5 switching element nSb05 includes a first terminal connected to the 1-2 touch/common routing wire W12 connected to the 1-2 touch/common electrode T12, a second terminal connected to the ground terminal GND, and a control terminal receiving the 3-2 switching control signal C32 supplied from the touch controller TC.

The n2-6 switching element nSb06 includes a first terminal connected to the 2-2 touch/common routing wire W22 connected to the 2-2 touch/common electrode T22, a second terminal connected to the ground terminal GND, and a control terminal receiving the 3-2 switching control signal C32 supplied from the touch controller TC.

The n2-7 switching element nSb07 includes a first terminal connected to the 3-2 touch/common routing wire W32 connected to the 3-2 touch/common electrode T32, a second terminal connected to the ground terminal GND, and a control terminal receiving the 3-2 switching control signal C32 supplied from the touch controller TC.

The n2-8 switching element nSb08 includes a first terminal connected to the 4-2 touch/common routing wire W42 connected to the 4-2 touch/common electrode T42, a second terminal connected to the ground terminal GND, and a control terminal receiving the 3-2 switching control signal C32 supplied from the touch controller TC.

The n2-9 switching element nSb09 includes a first terminal connected to the 1-3 touch/common routing wire W13 connected to the 1-3 touch/common electrode T13, a second terminal connected to the ground terminal GND, and a control terminal receiving the 3-2 switching control signal C32 supplied from the touch controller TC.

The n2-10 switching element nSb10 includes a first terminal connected to the 2-3 touch/common routing wire W23 connected to the 2-3 touch/common electrode T23, a second terminal connected to the ground terminal GND, and a control terminal receiving the 3-2 switching control signal C32 supplied from the touch controller TC.

The n2-11 switching element nSb11 includes a first terminal connected to the 3-3 touch/common routing wire W33 connected to the 3-3 touch/common electrode T33, a second terminal connected to the ground terminal GND, and a control terminal receiving the 3-2 switching control signal C32 supplied from the touch controller TC.

The n2-12 switching element nSb12 includes a first terminal connected to the 4-3 touch/common routing wire W43 connected to the 4-3 touch/common electrode T43, a second terminal connected to the ground terminal GND, and a control terminal receiving the 3-2 switching control signal C32 supplied from the touch controller TC.

The n2-13 switching element nSb13 includes a first terminal connected to the 1-4 touch/common routing wire W14 connected to the 1-4 touch/common electrode T14, a second terminal connected to the first input terminal 'a' of the first integrator I1, and a control terminal receiving the 3-2 switching control signal C32 supplied from the touch controller TC.

The n2-14 switching element nSb14 includes a first terminal connected to the 2-4 touch/common routing wire W24 connected to the 2-4 touch/common electrode T24, a second terminal connected to the first input terminal 'a' of the second integrator I2, and a control terminal receiving the 3-2 switching control signal C32 supplied from the touch controller TC.

The n2-15 switching element nSb15 includes a first terminal connected to the 3-4 touch/common routing wire W34 connected to the 3-4 touch/common electrode T34, a second terminal connected to the first input terminal 'a' of the third integrator I3, and a control terminal receiving the 3-2 switching control signal C32 supplied from the touch controller TC.

The n2-16 switching element nSb16 includes a first terminal connected to the 4-4 touch/common routing wire W44 connected to the 4-4 touch/common electrode T44, a second terminal connected to the first input terminal 'a' of the fourth integrator I4, and a control terminal receiving the 3-2 switching control signal C32 supplied from the touch controller TC.

The n2-17 switching element nSb17 includes a first terminal connected to the 1-5 touch/common routing wire W15 connected to the 1-5 touch/common electrode T15, a second terminal connected to the touch driving voltage source Vtx, and a control terminal receiving the 3-2 switching control signal C32 supplied from the touch controller TC.

The n2-18 switching element nSb18 includes a first terminal connected to the 2-5 touch/common routing wire W25 connected to the 2-5 touch/common electrode T25, a second terminal connected to the touch driving voltage source Vtx, and a control terminal receiving the 3-2 switching control signal C32 supplied from the touch controller TC.

The n2-19 switching element nSb19 includes a first terminal connected to the 3-5 touch/common routing wire W35 connected to the 3-5 touch/common electrode T35, a second terminal connected to the touch driving voltage source Vtx, and a control terminal receiving the 3-2 switching control signal C32 supplied from the touch controller TC.

The n2-20 switching element nSb20 includes a first terminal connected to the 4-5 touch/common routing wire W45 connected to the 4-5 touch/common electrode T45, a second terminal connected to the touch driving voltage source Vtx, and a control terminal receiving the 3-2 switching control signal C32 supplied from the touch controller TC.

The n3-1 switching element nSc01 includes a first terminal connected to the 1-1 touch/common routing wire W11 connected to the 1-1 touch/common electrode T11, a second terminal connected to the ground terminal GND, and a control terminal receiving a 3-3 switching control signal C33 supplied from the touch controller TC.

The n3-2 switching element nSc02 includes a first terminal connected to the 2-1 touch/common routing wire W21 connected to the 2-1 touch/common electrode T21, a second terminal connected to the ground terminal GND, and a control terminal receiving the 3-3 switching control signal C33 supplied from the touch controller TC.

The n3-3 switching element nSc03 includes a first terminal connected to the 3-1 touch/common routing wire W31 connected to the 3-1 touch/common electrode T31, a second terminal connected to the ground terminal GND, and a control terminal receiving the 3-3 switching control signal C33 supplied from the touch controller TC.

The n3-4 switching element nSc04 includes a first terminal connected to the 4-1 touch/common routing wire W41 connected to the 4-1 touch/common electrode T41, a second terminal connected to the ground terminal GND, and a control terminal receiving the 3-3 switching control signal C33 supplied from the touch controller TC.

The n3-5 switching element nSc05 includes a first terminal connected to the 1-2 touch/common routing wire W12 connected to the 1-2 touch/common electrode T12, a second terminal connected to the first input terminal 'a' of the first integrator I1, and a control terminal receiving the 3-3 switching control signal C33 supplied from the touch controller TC.

The n3-6 switching element nSc06 includes a first terminal connected to the 2-2 touch/common routing wire W22 connected to the 2-2 touch/common electrode T22, a second terminal connected to the first input terminal 'a' of the second integrator I2, and a control terminal receiving the 3-3 switching control signal C33 supplied from the touch controller TC.

The n3-7 switching element nSc07 includes a first terminal connected to the 3-2 touch/common routing wire W32 connected to the 3-2 touch/common electrode T32, a second terminal connected to the first input terminal 'a' of the third integrator I3, and a control terminal receiving the 3-3 switching control signal C33 supplied from the touch controller TC.

The n3-8 switching element nSc08 includes a first terminal connected to the 4-2 touch/common routing wire W42 connected to the 4-2 touch/common electrode T42, a second terminal connected to the first input terminal 'a' of the fourth integrator I4, and a control terminal receiving the 3-3 switching control signal C33 supplied from the touch controller TC.

The n3-9 switching element nSc09 includes a first terminal connected to the 1-3 touch/common routing wire W13 connected to the 1-3 touch/common electrode T13, a second terminal connected to the touch driving voltage source Vtx, and a control terminal receiving the 3-3 switching control signal C33 supplied from the touch controller TC.

The n3-10 switching element nSc10 includes a first terminal connected to the 2-3 touch/common routing wire W23 connected to the 2-3 touch/common electrode T23, a second terminal connected to the touch driving voltage source Vtx, and a control terminal receiving the 3-3 switching control signal C33 supplied from the touch controller TC.

The n3-11 switching element nSc11 includes a first terminal connected to the 3-3 touch/common routing wire W33 connected to the 3-3 touch/common electrode T33, a second terminal connected to the touch driving voltage source Vtx, and a control terminal receiving the 3-3 switching control signal C33 supplied from the touch controller TC.

The n3-12 switching element nSc12 includes a first terminal connected to the 4-3 touch/common routing wire W43 connected to the 4-3 touch/common electrode T43, a second terminal connected to the touch driving voltage source Vtx, and a control terminal receiving the 3-3 switching control signal C33 supplied from the touch controller TC.

The n3-13 switching element nSc13 includes a first terminal connected to the 1-4 touch/common routing wire W14 connected to the 1-4 touch/common electrode T14, a second terminal connected to the ground terminal GND, and a control terminal receiving the 3-3 switching control signal C33 supplied from the touch controller TC.

The n3-14 switching element nSc14 includes a first terminal connected to the 2-4 touch/common routing wire W24 connected to the 2-4 touch/common electrode T24, a second terminal connected to the ground terminal GND, and a control terminal receiving the 3-3 switching control signal C33 supplied from the touch controller TC.

The n3-15 switching element nSc15 includes a first terminal connected to the 3-4 touch/common routing wire W34 connected to the 3-4 touch/common electrode T34, a second terminal connected to the ground terminal GND, and a control terminal receiving the 3-3 switching control signal C33 supplied from the touch controller TC.

The n3-16 switching element nSc16 includes a first terminal connected to the 4-4 touch/common routing wire W44 connected to the 4-4 touch/common electrode T44, a second terminal connected to the ground terminal GND, and a control terminal receiving the 3-3 switching control signal C33 supplied from the touch controller TC.

The n3-17 switching element nSc17 includes a first terminal connected to the 1-5 touch/common routing wire W15 connected to the 1-5 touch/common electrode T15, a second terminal connected to the ground terminal GND, and a control terminal receiving the 3-3 switching control signal C33 supplied from the touch controller TC.

The n3-18 switching element nSc18 includes a first terminal connected to the 2-5 touch/common routing wire W25 connected to the 2-5 touch/common electrode T25, a second terminal connected to the ground terminal GND, and a control terminal receiving the 3-3 switching control signal C33 supplied from the touch controller TC.

The n3-19 switching element nSc19 includes a first terminal connected to the 3-5 touch/common routing wire W35 connected to the 3-5 touch/common electrode T35, a second terminal connected to the ground terminal GND, and a control terminal receiving the 3-3 switching control signal C33 supplied from the touch controller TC.

The n3-20 switching element nSc20 includes a first terminal connected to the 4-5 touch/common routing wire W45 connected to the 4-5 touch/common electrode T45, a second terminal connected to the ground terminal GND, and a control terminal receiving the 3-3 switching control signal C33 supplied from the touch controller TC.

The n4-1 switching element nSd01 includes a first terminal connected to the 1-1 touch/common routing wire W11 connected to the 1-1 touch/common electrode T11, a second terminal connected to the ground terminal GND, and a control terminal receiving a 3-4 switching control signal C34 supplied from the touch controller TC.

The n4-2 switching element nSd02 includes a first terminal connected to the 2-1 touch/common routing wire W21 connected to the 2-1 touch/common electrode T21, a second terminal connected to the ground terminal GND, and a control terminal receiving the 3-4 switching control signal C34 supplied from the touch controller TC.

The n4-3 switching element nSd03 includes a first terminal connected to the 3-1 touch/common routing wire W31 connected to the 3-1 touch/common electrode T31, a second terminal connected to the ground terminal GND, and a control terminal receiving the 3-4 switching control signal C34 supplied from the touch controller TC.

The n4-4 switching element nSd04 includes a first terminal connected to the 4-1 touch/common routing wire W41 connected to the 4-1 touch/common electrode T41, a second terminal connected to the ground terminal GND, and a control terminal receiving the 3-4 switching control signal C34 supplied from the touch controller TC.

The n4-5 switching element nSd05 includes a first terminal connected to the 1-2 touch/common routing wire W12 connected to the 1-2 touch/common electrode T12, a second terminal connected to the ground terminal GND, and a control terminal receiving the 3-4 switching control signal C34 supplied from the touch controller TC.

The n4-6 switching element nSd06 includes a first terminal connected to the 2-2 touch/common routing wire W22 connected to the 2-2 touch/common electrode T22, a second terminal connected to the ground terminal GND, and a control terminal receiving the 3-4 switching control signal C34 supplied from the touch controller TC.

The n4-7 switching element nSd07 includes a first terminal connected to the 3-2 touch/common routing wire W32 connected to the 3-2 touch/common electrode T32, a second terminal connected to the ground terminal GND, and a control terminal receiving the 3-4 switching control signal C34 supplied from the touch controller TC.

The n4-8 switching element nSd08 includes a first terminal connected to the 4-2 touch/common routing wire W42 connected to the 4-2 touch/common electrode T42, a second terminal connected to the ground terminal GND, and a control terminal receiving the 3-4 switching control signal C34 supplied from the touch controller TC.

The n4-9 switching element nSd09 includes a first terminal connected to the 1-3 touch/common routing wire W13 connected to the 1-3 touch/common electrode T13, a second terminal connected to the touch driving voltage source Vtx, and a control terminal receiving the 3-4 switching control signal C34 supplied from the touch controller TC.

The n4-10 switching element nSd10 includes a first terminal connected to the 2-3 touch/common routing wire W23 connected to the 2-3 touch/common electrode T23, a second terminal connected to the touch driving voltage source Vtx, and a control terminal receiving the 3-4 switching control signal C34 supplied from the touch controller TC.

The n4-11 switching element nSd11 includes a first terminal connected to the 3-3 touch/common routing wire W33 connected to the 3-3 touch/common electrode T33, a second terminal connected to the touch driving voltage source Vtx, and a control terminal receiving the 3-4 switching control signal C34 supplied from the touch controller TC.

The n4-12 switching element nSd12 includes a first terminal connected to the 4-3 touch/common routing wire W43 connected to the 4-3 touch/common electrode T43, a second terminal connected to the touch driving voltage source Vtx, and a control terminal receiving the 3-4 switching control signal C34 supplied from the touch controller TC.

The n4-13 switching element nSd13 includes a first terminal connected to the 1-4 touch/common routing wire W14 connected to the 1-4 touch/common electrode T14, a second terminal connected to the first input terminal 'a' of the fourth integrator I4, and a control terminal receiving the 3-4 switching control signal C34 supplied from the touch controller TC.

The n4-14 switching element nSd14 includes a first terminal connected to the 2-4 touch/common routing wire W24 connected to the 2-4 touch/common electrode T24, a second terminal connected to the first input terminal 'a' of the first integrator I1, and a control terminal receiving the 3-4 switching control signal C34 supplied from the touch controller TC.

The n4-15 switching element nSd15 includes a first terminal connected to the 3-4 touch/common routing wire W34 connected to the 3-4 touch/common electrode T34, a second terminal connected to the first input terminal 'a' of the second integrator I2, and a control terminal receiving the 3-4 switching control signal C34 supplied from the touch controller TC.

The n4-16 switching element nSd16 includes a first terminal connected to the 4-4 touch/common routing wire W44 connected to the 4-4 touch/common electrode T44, a second terminal connected to the first input terminal 'a' of the third integrator I3, and a control terminal receiving the 3-4 switching control signal C34 supplied from the touch controller TC.

The n4-17 switching element nSd17 includes a first terminal connected to the 1-5 touch/common routing wire W15 connected to the 1-5 touch/common electrode T15, a second terminal connected to the ground terminal GND, and a control terminal receiving the 3-4 switching control signal C34 supplied from the touch controller TC.

The n4-18 switching element nSd18 includes a first terminal connected to the 2-5 touch/common routing wire W25 connected to the 2-5 touch/common electrode T25, a second terminal connected to the ground terminal GND, and a control terminal receiving the 3-4 switching control signal C34 supplied from the touch controller TC.

The n4-19 switching element nSd19 includes a first terminal connected to the 3-5 touch/common routing wire W35 connected to the 3-5 touch/common electrode T35, a second terminal connected to the ground terminal GND, and a control terminal receiving the 3-4 switching control signal C34 supplied from the touch controller TC.

The n4-20 switching element nSd20 includes a first terminal connected to the 4-5 touch/common routing wire W45 connected to the 4-5 touch/common electrode T45, a second terminal connected to the ground terminal GND, and a control terminal receiving the 3-4 switching control signal C34 supplied from the touch controller TC.

Next, the second mutual capacitive sensing step of the vertical direction is described with reference to FIGS. 8A to 8E.

When the touch controller TC supplies the 3-1 switching control signal C31 to the third multiplexer MUX-M2 of the multiplexer MUX, the 3-1 switching control signal C31 is supplied to the control terminals of the n1-1 to n1-20 switching elements nSa01 to nSa20 of the third multiplexer MUX-M2 and turns on the n1-1 to n1-20 switching elements nSa01 to nSa20.

Hence, the touch driving voltage Vtx is supplied to the 1-1 to 4-1 touch/common electrodes T11 to T41 of a first column. The 1-2 to 4-2 touch/common electrodes T12 to T42 of a second column are respectively connected to the first input terminals 'a' of the first to fourth integrators I1 to I4.

Accordingly, as shown on the left side of FIG. 8B, mutual capacitances generated between the 1-1 to 4-1 touch/common electrodes T11 to T41 and the 1-2 to 4-2 touch/common electrodes T12 to T42 are sensed through the 1-2 to 4-2 touch/common electrodes T12 to T42 and may obtain sensing voltages Vrx. Therefore, as shown on the left side of FIG. 8E, sensing locations v11 to v14 of a first vertical location may be obtained.

Next, when the touch controller TC stops supplying the 3-1 switching control signal C31 and supplies the 3-2 switching control signal C32 to the third multiplexer MUX-M2 of the multiplexer MUX, the 3-2 switching control signal C32 is supplied to the control terminals of the n2-1 to n2-20 switching elements nSb01 to nSb20 of the third multiplexer MUX-M2 and turns on the n2-1 to n2-20 switching elements nSb01 to nSb20.

Hence, the touch driving voltage Vtx is supplied to the 1-5 to 4-5 touch/common electrodes T15 to T45 of a fifth column. The 1-4 to 4-4 touch/common electrodes T14 to T44 of a fourth column are respectively connected to the first input terminals 'a' of the first to fourth integrators I1 to I4.

Accordingly, as shown on the right side of FIG. 8B, mutual capacitances generated between the 1-4 to 4-4 touch/common electrodes T14 to T44 and the 1-5 to 4-5 touch/common electrodes T15 to T45 are sensed through the 1-4 to 4-4 touch/common electrodes T14 to T44 and may obtain the sensing voltages Vrx. Therefore, as shown on the right side of FIG. 8E, sensing locations v21 to v24 of a second vertical location may be obtained.

Next, when the touch controller TC stops supplying the 3-2 switching control signal C32 and supplies the 3-3 switching control signal C33 to the third multiplexer MUX-M2 of the multiplexer MUX, the 3-3 switching control signal C33 is supplied to the control terminals of the n3-1 to n3-20 switching elements nSc01 to nSc20 of the third multiplexer MUX-M2 and turns on the n3-1 to n3-20 switching elements nSc01 to nSc20.

Hence, the touch driving voltage Vtx is supplied to the 1-3 to 4-3 touch/common electrodes T13 to T43 of a third column. The 1-2 to 4-2 touch/common electrodes T12 to T42 of the second column are respectively connected to the first input terminals 'a' of the first to fourth integrators I1 to I4.

Accordingly, as shown on the left side of FIG. 8D, mutual capacitances generated between the 1-2 to 4-2 touch/common electrodes T12 to T42 and the 1-3 to 4-3 touch/common electrodes T13 to T43 are sensed through the 1-2 to 4-2 touch/common electrodes T12 to T42 and may obtain the sensing voltages Vrx. Therefore, as shown on the left side of FIG. 8E, sensing locations v31 to v34 of a third vertical location may be obtained.

Next, when the touch controller TC stops supplying the 3-3 switching control signal C33 and supplies the 3-4 switching control signal C34 to the third multiplexer MUX-M2 of the multiplexer MUX, the 3-4 switching control signal C34 is supplied to the control terminals of the n4-1 to n4-20 switching elements nSd01 to nSd20 of the third multiplexer MUX-M2 and turns on the n4-1 to n4-20 switching elements nSd01 to nSd20.

Hence, the touch driving voltage Vtx is supplied to the 1-3 to 4-3 touch/common electrodes T13 to T43 of a third column. The 1-4 to 4-4 touch/common electrodes T14 to T44 of the fourth column are respectively connected to the first input terminals 'a' of the fourth and first to third integrators I4 and I1 to I3.

Accordingly, as shown on the right side of FIG. 8D, mutual capacitances generated between the 1-3 to 4-3 touch/common electrodes T13 to T43 and the 1-4 to 4-4 touch/common electrodes T14 to T44 are sensed through the 1-4 to 4-4 touch/common electrodes T14 to T44 and may obtain the sensing voltages Vrx. Therefore, as shown on the right side of FIG. 8E, sensing locations v41 to v44 of a fourth vertical location may be obtained.

4. Third Mutual Capacitive Sensing

After the second mutual capacitive sensing is completed, the third mutual capacitive sensing is performed.

Figure 1:
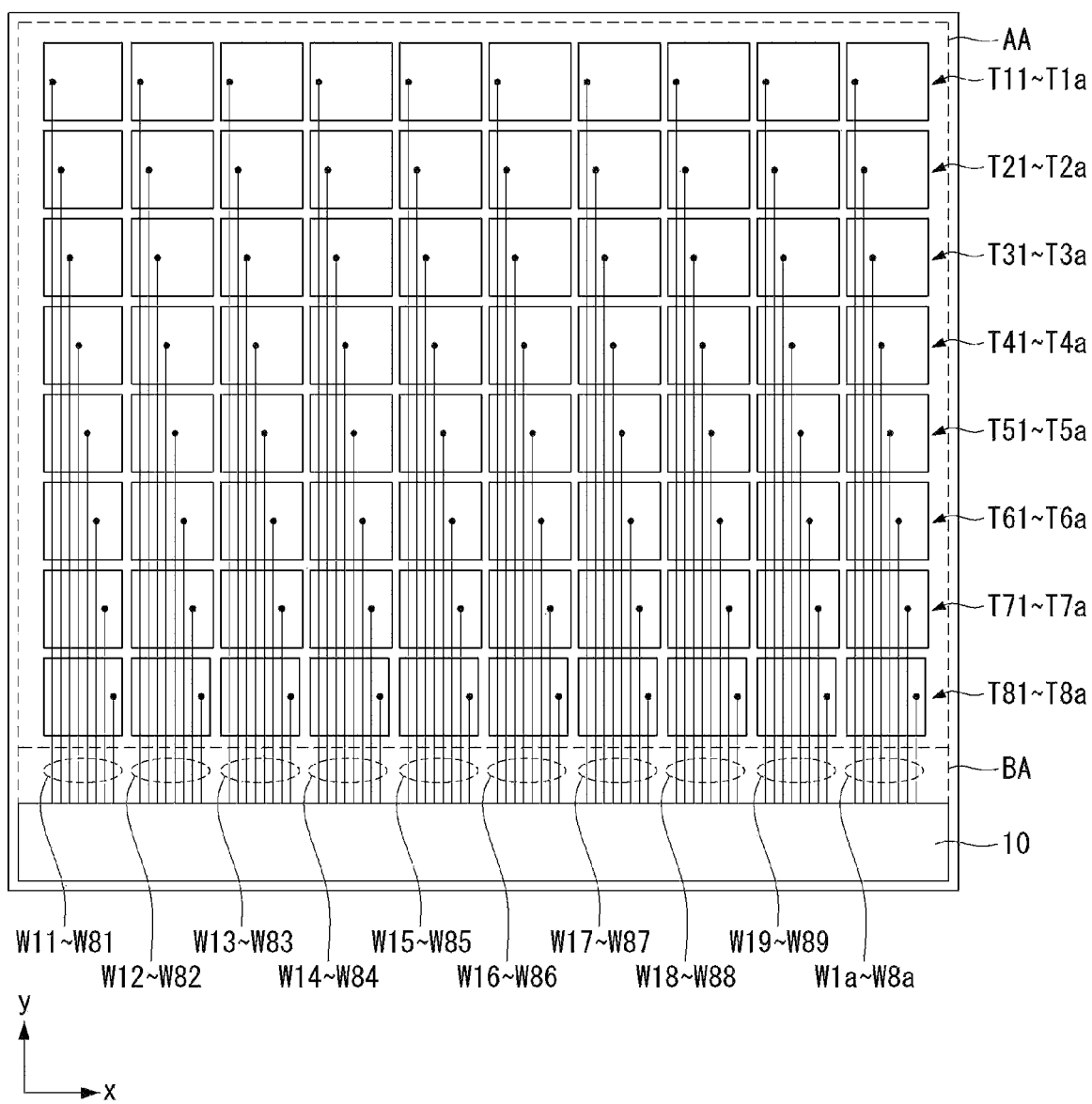
FIG. 1 is a plane view of a related art touch sensor integrated type display device.
Figure 2:
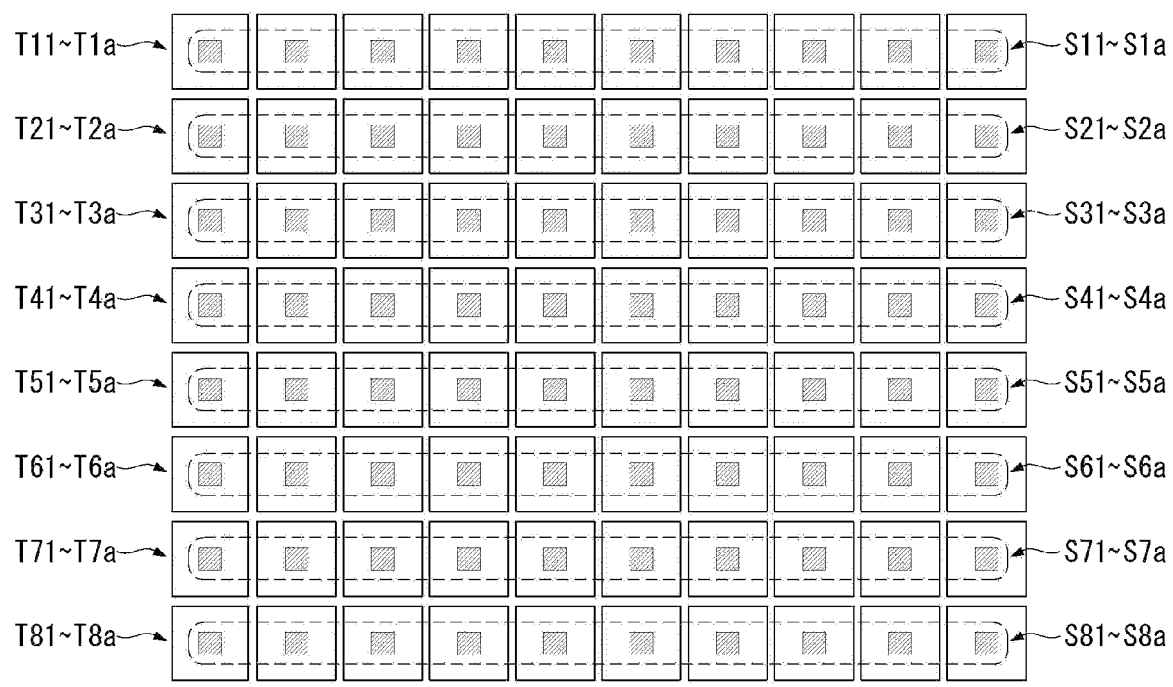
FIG. 2 is a plane view showing a touch sensing location obtained by the touch sensor integrated type display device shown in FIG. 1.
Figure 9A:
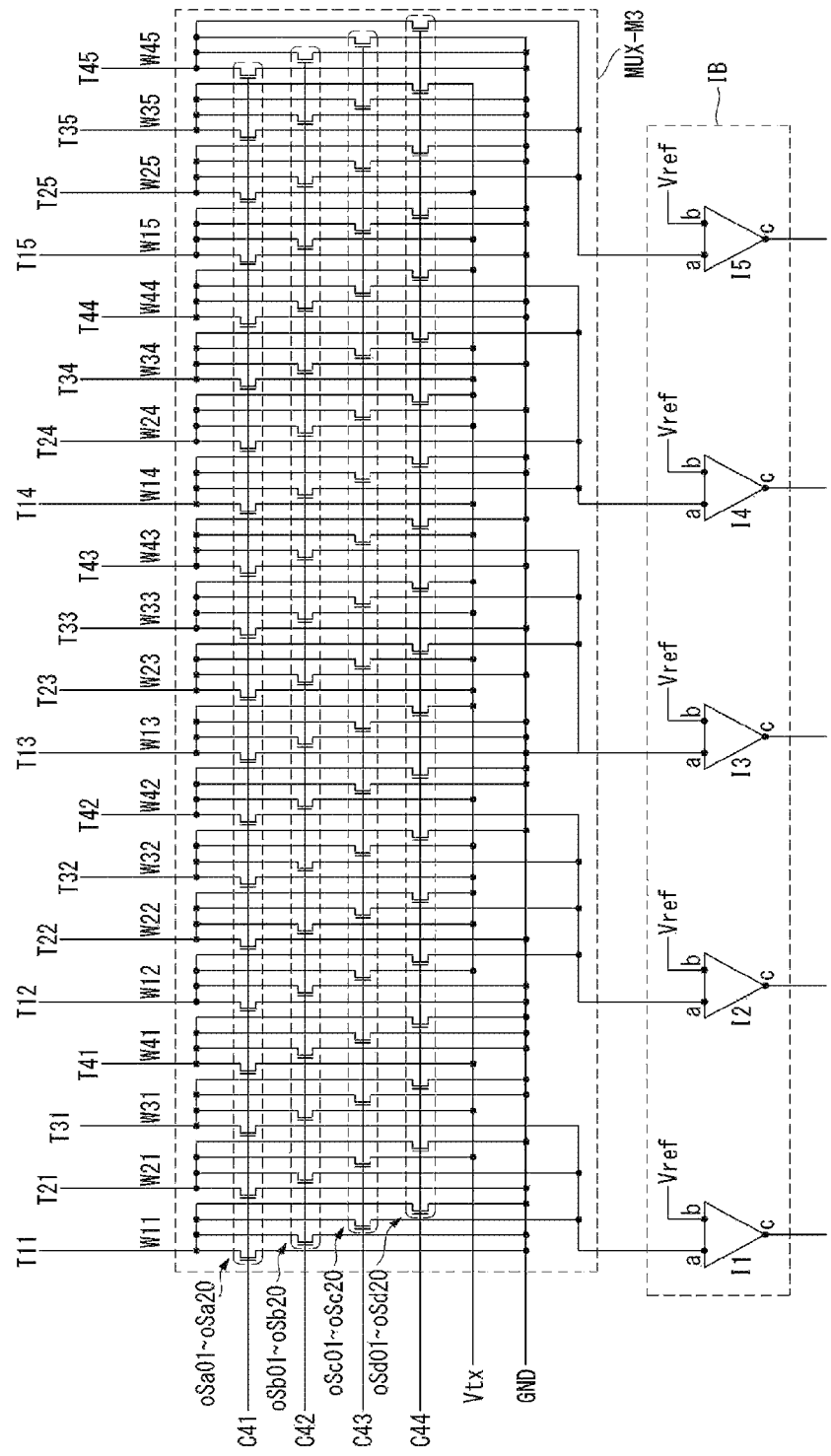
FIG. 9A is a circuit diagram showing a configuration for sensing touch/common electrodes through a third mutual capacitive method after a second mutual capacitive sensing in a touch sensor integrated type display device according to an exemplary embodiment of the invention.
Figure 9B:
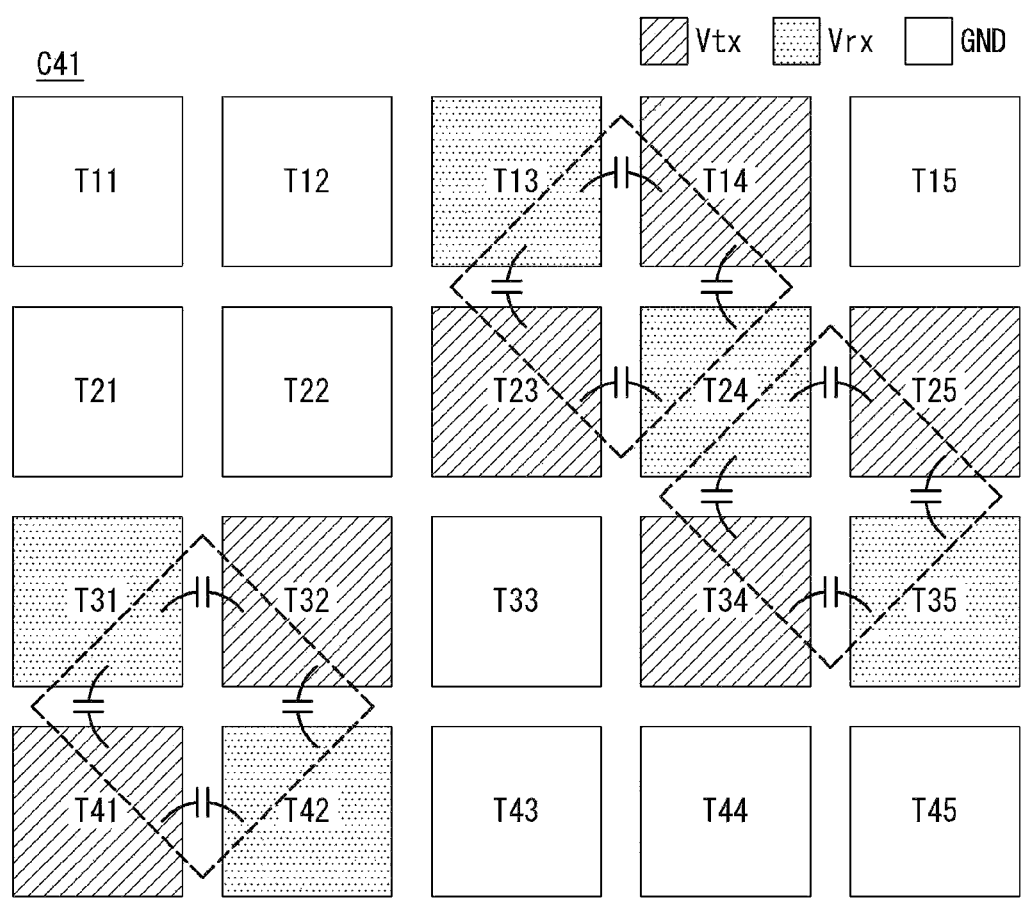
FIG. 9B is a plane view illustrating a step for sensing touch/common electrodes shown in FIG. 9A through a 3-1 mutual capacitive method.
Figure 9C:
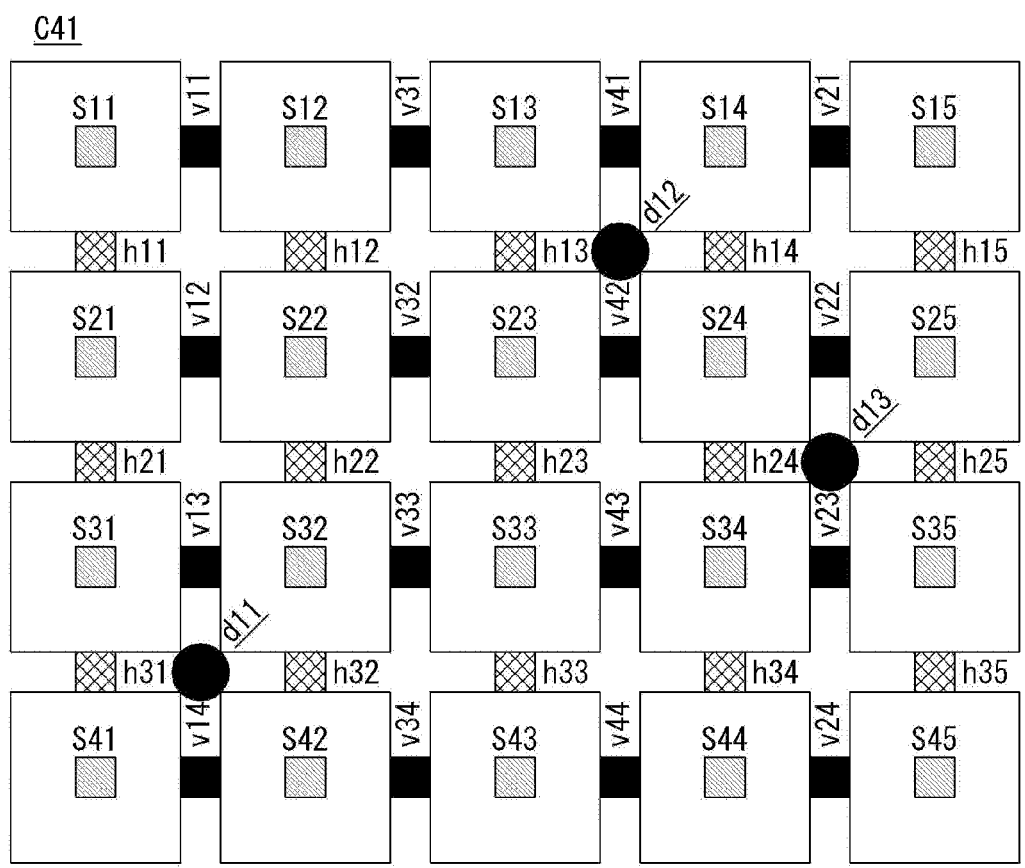
FIG. 9C is a plane view showing sensing locations sensed through the 3-1 mutual capacitive method shown in FIG. 9B.
Figure 9D:
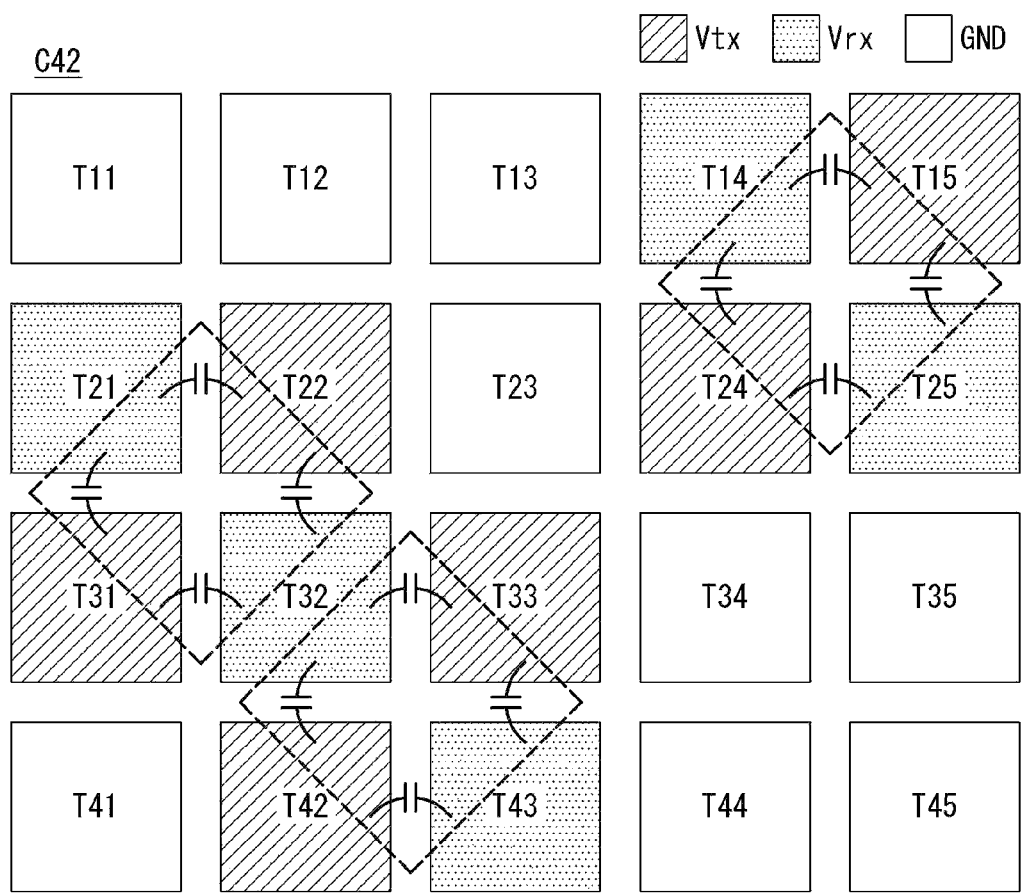
FIG. 9D is a plane view illustrating a step for sensing touch/common electrodes shown in FIG. 9A through a 3-2 mutual capacitive method.
Figure 9E:
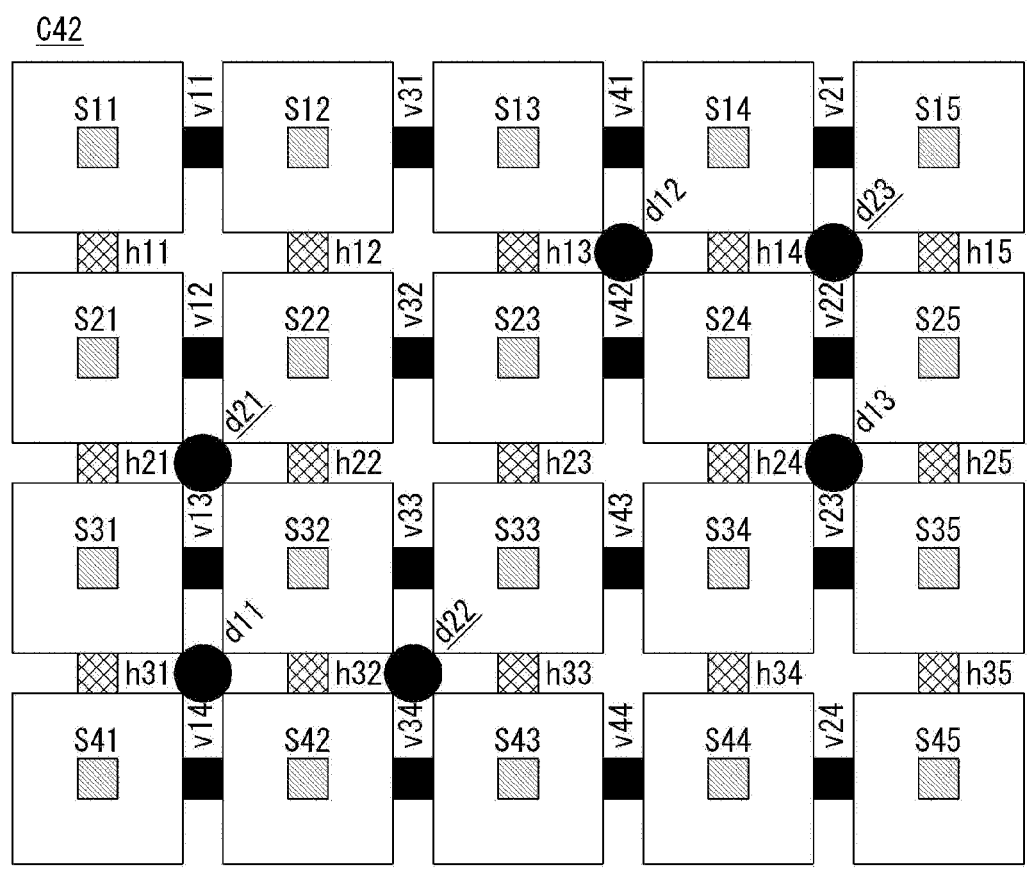
FIG. 9E is a plane view showing sensing locations sensed through the 3-2 mutual capacitive method shown in FIG. 9D.
Figure 9F:
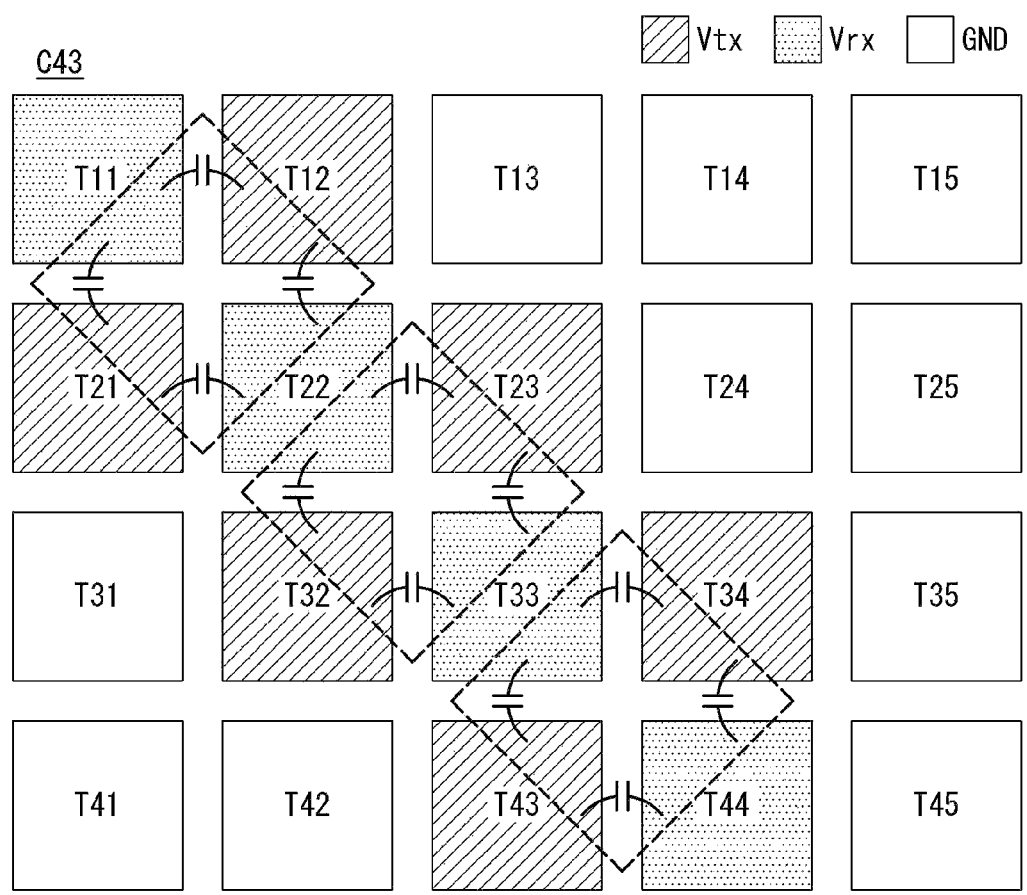
FIG. 9F is a plane view illustrating a step for sensing touch/common electrodes shown in FIG. 9A through a 3-3 mutual capacitive method.
Figure 9G:
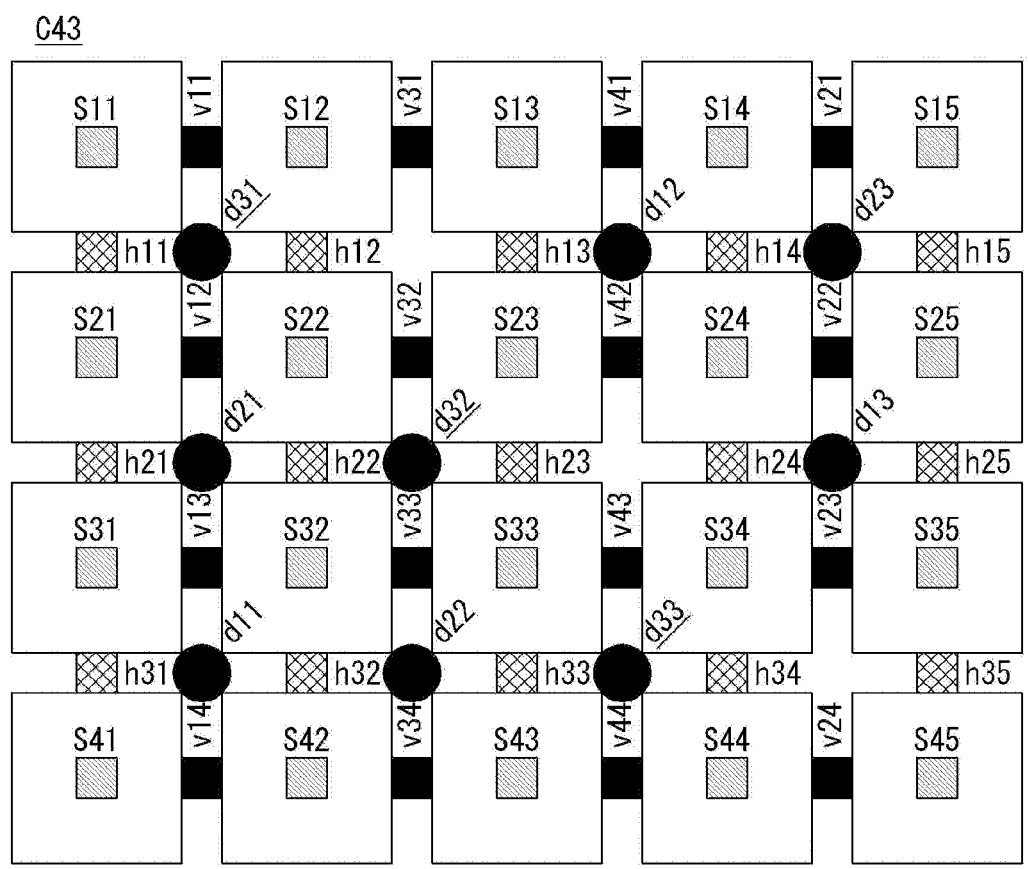
FIG. 9G is a plane view showing sensing locations sensed through the 3-3 mutual capacitive method shown in FIG. 9F.
Figure 9H:
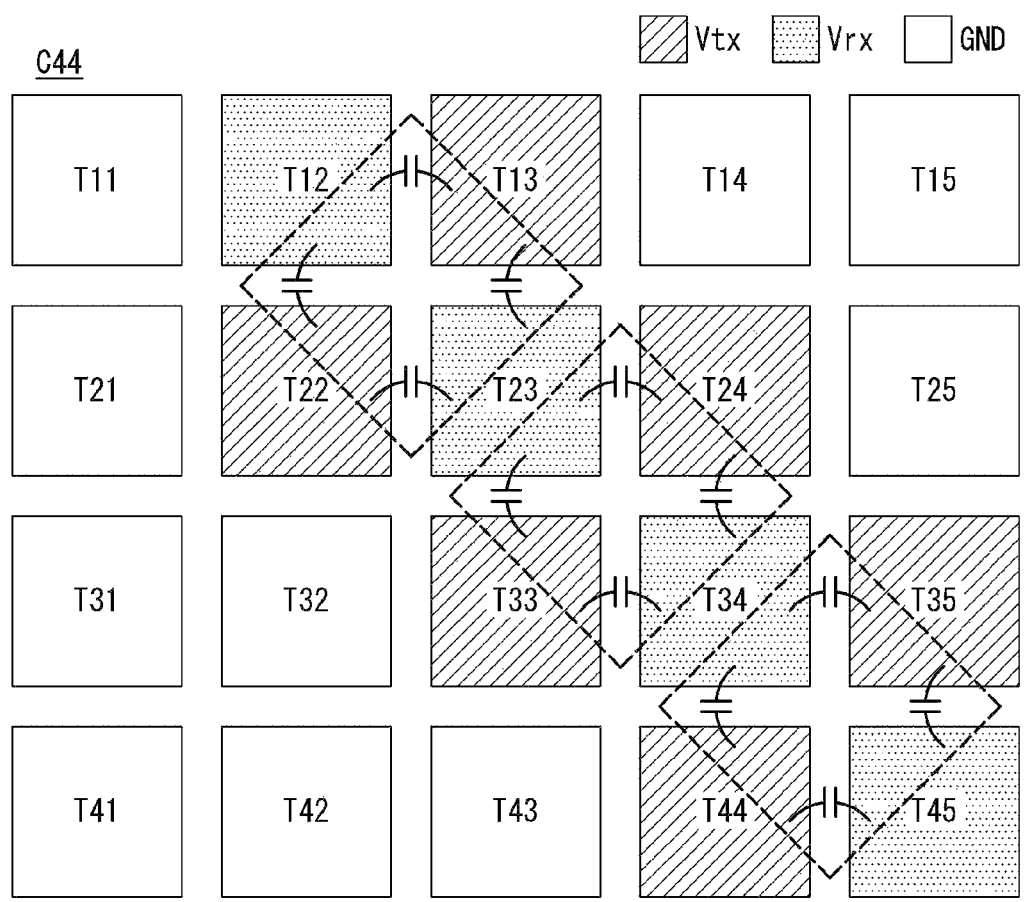
FIG. 9H is a plane view illustrating a step for sensing touch/common electrodes shown in FIG. 9A through a 3-4 mutual capacitive method.
Figure 9I:
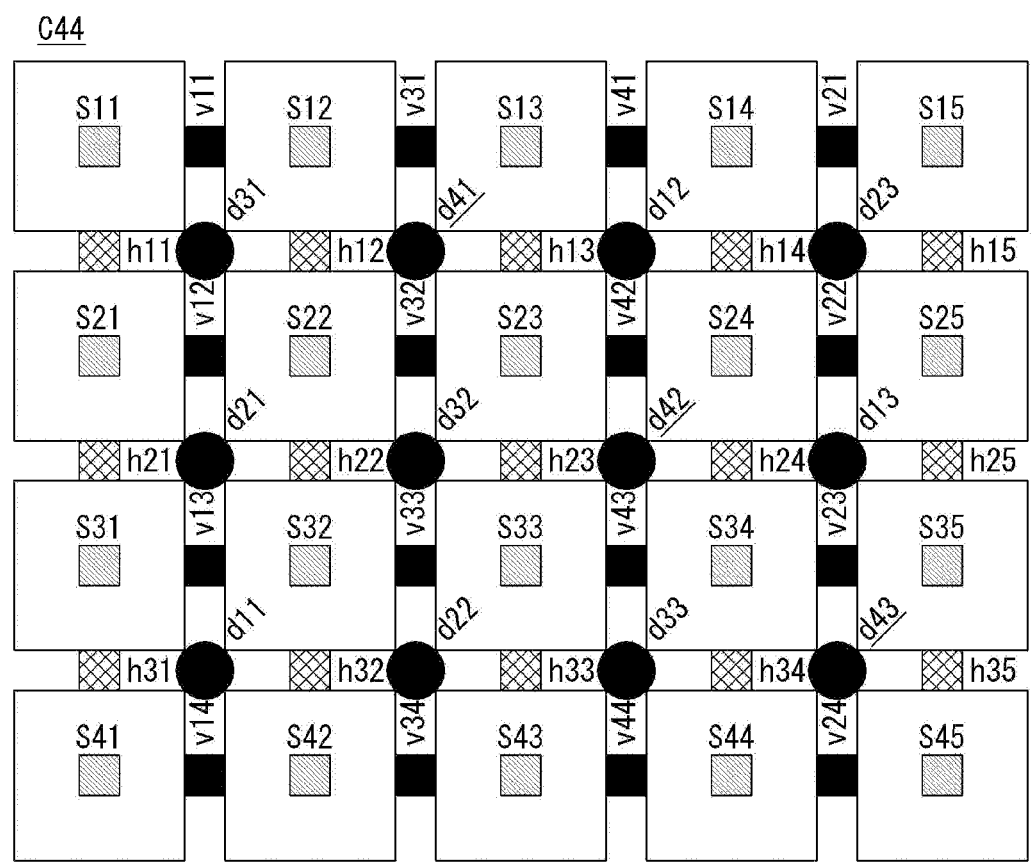
FIG. 9I is a plane view showing sensing locations sensed through the 3-4 mutual capacitive method shown in FIG. 9H.

The third mutual capacitive sensing step is described below with reference to FIGS. 9A to 9I. FIG. 9A is a circuit diagram showing a configuration for sensing the touch/common electrodes through a third mutual capacitive method after the second mutual capacitive sensing in the touch sensor integrated type display device according to the embodiment of the invention. FIG. 9B is a plane view illustrating a step for sensing the touch/common electrodes shown in FIG. 9A through a 3-1 mutual capacitive method. FIG. 9C is a plane view showing sensing locations sensed through the 3-1 mutual capacitive method shown in FIG. 9B. FIG. 9D is a plane view illustrating a step for sensing the touch/common electrodes shown in FIG. 9A through a 3-2 mutual capacitive method. FIG. 9E is a plane view showing sensing locations sensed through the 3-2 mutual capacitive method shown in FIG. 9D. FIG. 9F is a plane view illustrating a step for sensing the touch/common electrodes shown in FIG. 9A through a 3-3 mutual capacitive method. FIG. 9G is a plane view showing sensing locations sensed through the 3-3 mutual capacitive method shown in FIG. 9F. FIG. 9H is a plane view illustrating a step for sensing the touch/common electrodes shown in FIG. 9A through a 3-4 mutual capacitive method. FIG. 9I is a plane view showing sensing locations sensed through the 3-4 mutual capacitive method shown in FIG. 9H.

Referring to FIG. 9A, the touch sensor integrated type display device for the third mutual capacitive sensing according to the embodiment of the invention includes the fourth multiplexer MUX-M3 of the multiplexer MUX. The fourth multiplexer MUX-M3 includes o1-1 to o4-20 switching elements oSa01-oSa20, oSb01-oSb20, oSc01-oSc20, and oSd01-oSd20.

The o1-1 switching element oSa01 includes a first terminal connected to the 1-1 touch/common routing wire W11 connected to the 1-1 touch/common electrode T11, a second terminal connected to the ground terminal GND, and a control terminal receiving a 4-1 switching control signal C41 supplied from the touch controller TC.

The o1-2 switching element oSa02 includes a first terminal connected to the 2-1 touch/common routing wire W21 connected to the 2-1 touch/common electrode T21, a second terminal connected to the ground terminal GND, and a control terminal receiving the 4-1 switching control signal C41 supplied from the touch controller TC.

The o1-3 switching element oSa03 includes a first terminal connected to the 3-1 touch/common routing wire W31 connected to the 3-1 touch/common electrode T31, a second terminal connected to the first input terminal 'a' of the first integrator I1, and a control terminal receiving the 4-1 switching control signal C41 supplied from the touch controller TC.

The o1-4 switching element oSa04 includes a first terminal connected to the 4-1 touch/common routing wire W41 connected to the 4-1 touch/common electrode T41, a second terminal connected to the touch driving voltage source Vtx, and a control terminal receiving the 4-1 switching control signal C41 supplied from the touch controller TC.

The o1-5 switching element oSa05 includes a first terminal connected to the 1-2 touch/common routing wire W12 connected to the 1-2 touch/common electrode T12, a second terminal connected to the ground terminal GND, and a control terminal receiving the 4-1 switching control signal C41 supplied from the touch controller TC.

The o1-6 switching element oSa06 includes a first terminal connected to the 2-2 touch/common routing wire W22 connected to the 2-2 touch/common electrode T22, a second terminal connected to the ground terminal GND, and a control terminal receiving the 4-1 switching control signal C41 supplied from the touch controller TC.

The o1-7 switching element oSa07 includes a first terminal connected to the 3-2 touch/common routing wire W32 connected to the 3-2 touch/common electrode T32, a second terminal connected to the touch driving voltage source Vtx, and a control terminal receiving the 4-1 switching control signal C41 supplied from the touch controller TC.

The o1-8 switching element oSa08 includes a first terminal connected to the 4-2 touch/common routing wire W42 connected to the 4-2 touch/common electrode T42, a second terminal connected to the first input terminal 'a' of the second integrator I2, and a control terminal receiving the 4-1 switching control signal C41 supplied from the touch controller TC.

The o1-9 switching element oSa09 includes a first terminal connected to the 1-3 touch/common routing wire W13 connected to the 1-3 touch/common electrode T13, a second terminal connected to the first input terminal 'a' of the third integrator I3, and a control terminal receiving the 4-1 switching control signal C41 supplied from the touch controller TC.

The o1-10 switching element oSa10 includes a first terminal connected to the 2-3 touch/common routing wire W23 connected to the 2-3 touch/common electrode T23, a second terminal connected to the touch driving voltage source Vtx, and a control terminal receiving the 4-1 switching control signal C41 supplied from the touch controller TC.

The o1-11 switching element oSa11 includes a first terminal connected to the 3-3 touch/common routing wire W33 connected to the 3-3 touch/common electrode T33, a second terminal connected to the ground terminal GND, and a control terminal receiving the 4-1 switching control signal C41 supplied from the touch controller TC.

The o1-12 switching element oSa12 includes a first terminal connected to the 4-3 touch/common routing wire W43 connected to the 4-3 touch/common electrode T43, a second terminal connected to the ground terminal GND, and a control terminal receiving the 4-1 switching control signal C41 supplied from the touch controller TC.

The o1-13 switching element oSa13 includes a first terminal connected to the 1-4 touch/common routing wire W14 connected to the 1-4 touch/common electrode T14, a second terminal connected to the touch driving voltage source Vtx, and a control terminal receiving the 4-1 switching control signal C41 supplied from the touch controller TC.

The o1-14 switching element oSa14 includes a first terminal connected to the 2-4 touch/common routing wire W24 connected to the 2-4 touch/common electrode T24, a second terminal connected to the first input terminal 'a' of the fourth integrator I4, and a control terminal receiving the 4-1 switching control signal C41 supplied from the touch controller TC.

The o1-15 switching element oSa15 includes a first terminal connected to the 3-4 touch/common routing wire W34 connected to the 3-4 touch/common electrode T34, a second terminal connected to the touch driving voltage source Vtx, and a control terminal receiving the 4-1 switching control signal C41 supplied from the touch controller TC.

The o1-16 switching element oSa16 includes a first terminal connected to the 4-4 touch/common routing wire W44 connected to the 4-4 touch/common electrode T44, a second terminal connected to the ground terminal GND, and a control terminal receiving the 4-1 switching control signal C41 supplied from the touch controller TC.

The o1-17 switching element oSa17 includes a first terminal connected to the 1-5 touch/common routing wire W15 connected to the 1-5 touch/common electrode T15, a second terminal connected to the ground terminal GND, and a control terminal receiving the 4-1 switching control signal C41 supplied from the touch controller TC.

The o1-18 switching element oSa18 includes a first terminal connected to the 2-5 touch/common routing wire W25 connected to the 2-5 touch/common electrode T25, a second terminal connected to the touch driving voltage source Vtx, and a control terminal receiving the 4-1 switching control signal C41 supplied from the touch controller TC.

The o1-19 switching element oSa19 includes a first terminal connected to the 3-5 touch/common routing wire W35 connected to the 3-5 touch/common electrode T35, a second terminal connected to the first input terminal 'a' of the fifth integrator I5, and a control terminal receiving the 4-1 switching control signal C41 supplied from the touch controller TC.

The o1-20 switching element oSa20 includes a first terminal connected to the 4-5 touch/common routing wire W45 connected to the 4-5 touch/common electrode T45, a second terminal connected to the ground terminal GND, and a control terminal receiving the 4-1 switching control signal C41 supplied from the touch controller TC.

The o2-1 switching element oSb01 includes a first terminal connected to the 1-1 touch/common routing wire W11 connected to the 1-1 touch/common electrode T11, a second terminal connected to the ground terminal GND, and a control terminal receiving a 4-2 switching control signal C42 supplied from the touch controller TC.

The o2-2 switching element oSb02 includes a first terminal connected to the 2-1 touch/common routing wire W21 connected to the 2-1 touch/common electrode T21, a second terminal connected to the first input terminal 'a' of the first integrator I1, and a control terminal receiving the 4-2 switching control signal C42 supplied from the touch controller TC.

The o2-3 switching element oSb03 includes a first terminal connected to the 3-1 touch/common routing wire W31 connected to the 3-1 touch/common electrode T31, a second terminal connected to the touch driving voltage source Vtx, and a control terminal receiving the 4-2 switching control signal C42 supplied from the touch controller TC.

The o2-4 switching element oSb04 includes a first terminal connected to the 4-1 touch/common routing wire W41 connected to the 4-1 touch/common electrode T41, a second terminal connected to the ground terminal GND, and a control terminal receiving the 4-2 switching control signal C42 supplied from the touch controller TC.

The o2-5 switching element oSb05 includes a first terminal connected to the 1-2 touch/common routing wire W12 connected to the 1-2 touch/common electrode T12, a second terminal connected to the ground terminal GND, and a control terminal receiving the 4-2 switching control signal C42 supplied from the touch controller TC.

The o2-6 switching element oSb06 includes a first terminal connected to the 2-2 touch/common routing wire W22 connected to the 2-2 touch/common electrode T22, a second terminal connected to the touch driving voltage source Vtx, and a control terminal receiving the 4-2 switching control signal C42 supplied from the touch controller TC.

The o2-7 switching element oSb07 includes a first terminal connected to the 3-2 touch/common routing wire W32 connected to the 3-2 touch/common electrode T32, a second terminal connected to the first input terminal 'a' of the second integrator I2, and a control terminal receiving the 4-2 switching control signal C42 supplied from the touch controller TC.

The o2-8 switching element oSb08 includes a first terminal connected to the 4-2 touch/common routing wire W42 connected to the 4-2 touch/common electrode T42, a second terminal connected to the ground terminal GND, and a control terminal receiving the 4-2 switching control signal C42 supplied from the touch controller TC.

The o2-9 switching element oSb09 includes a first terminal connected to the 1-3 touch/common routing wire W13 connected to the 1-3 touch/common electrode T13, a second terminal connected to the ground terminal GND, and a control terminal receiving the 4-2 switching control signal C42 supplied from the touch controller TC.

The o2-10 switching element oSb10 includes a first terminal connected to the 2-3 touch/common routing wire W23 connected to the 2-3 touch/common electrode T23, a second terminal connected to the ground terminal GND, and a control terminal receiving the 4-2 switching control signal C42 supplied from the touch controller TC.

The o2-11 switching element oSb11 includes a first terminal connected to the 3-3 touch/common routing wire W33 connected to the 3-3 touch/common electrode T33, a second terminal connected to the touch driving voltage source Vtx, and a control terminal receiving the 4-2 switching control signal C42 supplied from the touch controller TC.

The o2-12 switching element oSb12 includes a first terminal connected to the 4-3 touch/common routing wire W43 connected to the 4-3 touch/common electrode T43, a second terminal connected to the first input terminal 'a' of the third integrator I3, and a control terminal receiving the 4-2 switching control signal C42 supplied from the touch controller TC.

The o2-13 switching element oSb13 includes a first terminal connected to the 1-4 touch/common routing wire W14 connected to the 1-4 touch/common electrode T14, a second terminal connected to the first input terminal 'a' of the fourth integrator I4, and a control terminal receiving the 4-2 switching control signal C42 supplied from the touch controller TC.

The o2-14 switching element oSb14 includes a first terminal connected to the 2-4 touch/common routing wire W24 connected to the 2-4 touch/common electrode T24, a second terminal connected to the touch driving voltage source Vtx, and a control terminal receiving the 4-2 switching control signal C42 supplied from the touch controller TC.

The o2-15 switching element oSb15 includes a first terminal connected to the 3-4 touch/common routing wire W34 connected to the 3-4 touch/common electrode T34, a second terminal connected to the ground terminal GND, and a control terminal receiving the 4-2 switching control signal C42 supplied from the touch controller TC.

The o2-16 switching element oSb16 includes a first terminal connected to the 4-4 touch/common routing wire W44 connected to the 4-4 touch/common electrode T44, a second terminal connected to the ground terminal GND, and a control terminal receiving the 4-2 switching control signal C42 supplied from the touch controller TC.

The o2-17 switching element oSb17 includes a first terminal connected to the 1-5 touch/common routing wire W15 connected to the 1-5 touch/common electrode T15, a second terminal connected to the touch driving voltage source Vtx, and a control terminal receiving the 4-2 switching control signal C42 supplied from the touch controller TC.

The o2-18 switching element oSb18 includes a first terminal connected to the 2-5 touch/common routing wire W25 connected to the 2-5 touch/common electrode T25, a second terminal connected to the first input terminal 'a' of the fifth integrator I5, and a control terminal receiving the 4-2 switching control signal C42 supplied from the touch controller TC.

The o2-19 switching element oSb19 includes a first terminal connected to the 3-5 touch/common routing wire W35 connected to the 3-5 touch/common electrode T35, a second terminal connected to the ground terminal GND, and a control terminal receiving the 4-2 switching control signal C42 supplied from the touch controller TC.

The o2-20 switching element oSb20 includes a first terminal connected to the 4-5 touch/common routing wire W45 connected to the 4-5 touch/common electrode T45, a second terminal connected to the ground terminal GND, and a control terminal receiving the 4-2 switching control signal C42 supplied from the touch controller TC.

The o3-1 switching element oSc01 includes a first terminal connected to the 1-1 touch/common routing wire W11 connected to the 1-1 touch/common electrode T11, a second terminal connected to the first input terminal 'a' of the first integrator I1, and a control terminal receiving a 4-3 switching control signal C43 supplied from the touch controller TC.

The o3-2 switching element oSc02 includes a first terminal connected to the 2-1 touch/common routing wire W21 connected to the 2-1 touch/common electrode T21, a second terminal connected to the touch driving voltage source Vtx, and a control terminal receiving the 4-3 switching control signal C43 supplied from the touch controller TC.

The o3-3 switching element oSc03 includes a first terminal connected to the 3-1 touch/common routing wire W31 connected to the 3-1 touch/common electrode T31, a second terminal connected to the ground terminal GND, and a control terminal receiving the 4-3 switching control signal C43 supplied from the touch controller TC.

The o3-4 switching element oSc04 includes a first terminal connected to the 4-1 touch/common routing wire W41 connected to the 4-1 touch/common electrode T41, a second terminal connected to the ground terminal GND, and a control terminal receiving the 4-3 switching control signal C43 supplied from the touch controller TC.

The o3-5 switching element oSc05 includes a first terminal connected to the 1-2 touch/common routing wire W12 connected to the 1-2 touch/common electrode T12, a second terminal connected to the touch driving voltage source Vtx, and a control terminal receiving the 4-3 switching control signal C43 supplied from the touch controller TC.

The o3-6 switching element oSc06 includes a first terminal connected to the 2-2 touch/common routing wire W22 connected to the 2-2 touch/common electrode T22, a second terminal connected to the first input terminal 'a' of the second integrator I2, and a control terminal receiving the 4-3 switching control signal C43 supplied from the touch controller TC.

The o3-7 switching element oSc07 includes a first terminal connected to the 3-2 touch/common routing wire W32 connected to the 3-2 touch/common electrode T32, a second terminal connected to the touch driving voltage source Vtx, and a control terminal receiving the 4-3 switching control signal C43 supplied from the touch controller TC.

The o3-8 switching element oSc08 includes a first terminal connected to the 4-2 touch/common routing wire W42 connected to the 4-2 touch/common electrode T42, a second terminal connected to the ground terminal GND, and a control terminal receiving the 4-3 switching control signal C43 supplied from the touch controller TC.

The o3-9 switching element oSc09 includes a first terminal connected to the 1-3 touch/common routing wire W13 connected to the 1-3 touch/common electrode T13, a second terminal connected to the ground terminal GND, and a control terminal receiving the 4-3 switching control signal C43 supplied from the touch controller TC.

The o3-10 switching element oSc10 includes a first terminal connected to the 2-3 touch/common routing wire W23 connected to the 2-3 touch/common electrode T23, a second terminal connected to the touch driving voltage source Vtx, and a control terminal receiving the 4-3 switching control signal C43 supplied from the touch controller TC.

The o3-11 switching element oSc11 includes a first terminal connected to the 3-3 touch/common routing wire W33 connected to the 3-3 touch/common electrode T33, a second terminal connected to the first input terminal 'a' of the third integrator I3, and a control terminal receiving the 4-3 switching control signal C43 supplied from the touch controller TC.

The o3-12 switching element oSc12 includes a first terminal connected to the 4-3 touch/common routing wire W43 connected to the 4-3 touch/common electrode T43, a second terminal connected to the touch driving voltage source Vtx, and a control terminal receiving the 4-3 switching control signal C43 supplied from the touch controller TC.

The o3-13 switching element oSc13 includes a first terminal connected to the 1-4 touch/common routing wire W14 connected to the 1-4 touch/common electrode T14, a second terminal connected to the ground terminal GND, and a control terminal receiving the 4-3 switching control signal C43 supplied from the touch controller TC.

The o3-14 switching element oSc14 includes a first terminal connected to the 2-4 touch/common routing wire W24 connected to the 2-4 touch/common electrode T24, a second terminal connected to the ground terminal GND, and a control terminal receiving the 4-3 switching control signal C43 supplied from the touch controller TC.

The o3-15 switching element oSc15 includes a first terminal connected to the 3-4 touch/common routing wire W34 connected to the 3-4 touch/common electrode T34, a second terminal connected to the touch driving voltage source Vtx, and a control terminal receiving the 4-3 switching control signal C43 supplied from the touch controller TC.

The o3-16 switching element oSc16 includes a first terminal connected to the 4-4 touch/common routing wire W44 connected to the 4-4 touch/common electrode T44, a second terminal connected to the first input terminal 'a' of the fourth integrator I4, and a control terminal receiving the 4-3 switching control signal C43 supplied from the touch controller TC.

The o3-17 switching element oSc17 includes a first terminal connected to the 1-5 touch/common routing wire W15 connected to the 1-5 touch/common electrode T15, a second terminal connected to the ground terminal GND, and a control terminal receiving the 4-3 switching control signal C43 supplied from the touch controller TC.

The o3-18 switching element oSc18 includes a first terminal connected to the 2-5 touch/common routing wire W25 connected to the 2-5 touch/common electrode T25, a second terminal connected to the ground terminal GND, and a control terminal receiving the 4-3 switching control signal C43 supplied from the touch controller TC.

The o3-19 switching element oSc19 includes a first terminal connected to the 3-5 touch/common routing wire W35 connected to the 3-5 touch/common electrode T35, a second terminal connected to the ground terminal GND, and a control terminal receiving the 4-3 switching control signal C43 supplied from the touch controller TC.

The o3-20 switching element oSc20 includes a first terminal connected to the 4-5 touch/common routing wire W45 connected to the 4-5 touch/common electrode T45, a second terminal connected to the ground terminal GND, and a control terminal receiving the 4-3 switching control signal C43 supplied from the touch controller TC.

The o4-1 switching element oSd01 includes a first terminal connected to the 1-1 touch/common routing wire W11 connected to the 1-1 touch/common electrode T11, a second terminal connected to the ground terminal GND, and a control terminal receiving a 4-4 switching control signal C44 supplied from the touch controller TC.

The o4-2 switching element oSd02 includes a first terminal connected to the 2-1 touch/common routing wire W21 connected to the 2-1 touch/common electrode T21, a second terminal connected to the ground terminal GND, and a control terminal receiving the 4-4 switching control signal C44 supplied from the touch controller TC.

The o4-3 switching element oSd03 includes a first terminal connected to the 3-1 touch/common routing wire W31 connected to the 3-1 touch/common electrode T31, a second terminal connected to the ground terminal GND, and a control terminal receiving the 4-4 switching control signal C44 supplied from the touch controller TC.

The o4-4 switching element oSd04 includes a first terminal connected to the 4-1 touch/common routing wire W41 connected to the 4-1 touch/common electrode T41, a second terminal connected to the ground terminal GND, and a control terminal receiving the 4-4 switching control signal C44 supplied from the touch controller TC.

The o4-5 switching element oSd05 includes a first terminal connected to the 1-2 touch/common routing wire W12 connected to the 1-2 touch/common electrode T12, a second terminal connected to the first input terminal 'a' of the second integrator I2, and a control terminal receiving the 4-4 switching control signal C44 supplied from the touch controller TC.

The o4-6 switching element oSd06 includes a first terminal connected to the 2-2 touch/common routing wire W22 connected to the 2-2 touch/common electrode T22, a second terminal connected to the touch driving voltage source Vtx, and a control terminal receiving the 4-4 switching control signal C44 supplied from the touch controller TC.

The o4-7 switching element oSd07 includes a first terminal connected to the 3-2 touch/common routing wire W32 connected to the 3-2 touch/common electrode T32, a second terminal connected to the ground terminal GND, and a control terminal receiving the 4-4 switching control signal C44 supplied from the touch controller TC.

The o4-8 switching element oSd08 includes a first terminal connected to the 4-2 touch/common routing wire W42 connected to the 4-2 touch/common electrode T42, a second terminal connected to the ground terminal GND, and a control terminal receiving the 4-4 switching control signal C44 supplied from the touch controller TC.

The o4-9 switching element oSd09 includes a first terminal connected to the 1-3 touch/common routing wire W13 connected to the 1-3 touch/common electrode T13, a second terminal connected to the touch driving voltage source Vtx, and a control terminal receiving the 4-4 switching control signal C44 supplied from the touch controller TC.

The o4-10 switching element oSd10 includes a first terminal connected to the 2-3 touch/common routing wire W23 connected to the 2-3 touch/common electrode T23, a second terminal connected to the first input terminal 'a' of the third integrator I3, and a control terminal receiving the 4-4 switching control signal C44 supplied from the touch controller TC.

The o4-11 switching element oSd11 includes a first terminal connected to the 3-3 touch/common routing wire W33 connected to the 3-3 touch/common electrode T33, a second terminal connected to the touch driving voltage source Vtx, and a control terminal receiving the 4-4 switching control signal C44 supplied from the touch controller TC.

The o4-12 switching element oSd12 includes a first terminal connected to the 4-3 touch/common routing wire W43 connected to the 4-3 touch/common electrode T43, a second terminal connected to the ground terminal GND, and a control terminal receiving the 4-4 switching control signal C44 supplied from the touch controller TC.

The o4-13 switching element oSd13 includes a first terminal connected to the 1-4 touch/common routing wire W14 connected to the 1-4 touch/common electrode T14, a second terminal connected to the ground terminal GND, and a control terminal receiving the 4-4 switching control signal C44 supplied from the touch controller TC.

The o4-14 switching element oSd14 includes a first terminal connected to the 2-4 touch/common routing wire W24 connected to the 2-4 touch/common electrode T24, a second terminal connected to the touch driving voltage source Vtx, and a control terminal receiving the 4-4 switching control signal C44 supplied from the touch controller TC.

The o4-15 switching element oSd15 includes a first terminal connected to the 3-4 touch/common routing wire W34 connected to the 3-4 touch/common electrode T34, a second terminal connected to the first input terminal 'a' of the fourth integrator I4, and a control terminal receiving the 4-4 switching control signal C44 supplied from the touch controller TC.

The o4-16 switching element oSd16 includes a first terminal connected to the 4-4 touch/common routing wire W44 connected to the 4-4 touch/common electrode T44, a second terminal connected to the touch driving voltage source Vtx, and a control terminal receiving the 4-4 switching control signal C44 supplied from the touch controller TC.

The o4-17 switching element oSd17 includes a first terminal connected to the 1-5 touch/common routing wire W15 connected to the 1-5 touch/common electrode T15, a second terminal connected to the ground terminal GND, and a control terminal receiving the 4-4 switching control signal C44 supplied from the touch controller TC.

The o4-18 switching element oSd18 includes a first terminal connected to the 2-5 touch/common routing wire W25 connected to the 2-5 touch/common electrode T25, a second terminal connected to the ground terminal GND, and a control terminal receiving the 4-4 switching control signal C44 supplied from the touch controller TC.

The o4-19 switching element oSd19 includes a first terminal connected to the 3-5 touch/common routing wire W35 connected to the 3-5 touch/common electrode T35, a second terminal connected to the touch driving voltage source Vtx, and a control terminal receiving the 4-4 switching control signal C44 supplied from the touch controller TC.

The o4-20 switching element oSd20 includes a first terminal connected to the 4-5 touch/common routing wire W45 connected to the 4-5 touch/common electrode T45, a second terminal connected to the first input terminal 'a' of the fifth integrator I5, and a control terminal receiving the 4-4 switching control signal C44 supplied from the touch controller TC.

Next, the third mutual capacitive sensing step of the diagonal direction is described with reference to FIGS. 9A to 9I.

When the touch controller TC supplies the 4-1 switching control signal C41 to the fourth multiplexer MUX-M3 of the multiplexer MUX, the 4-1 switching control signal C41 is supplied to the control terminals of the o1-1 to o1-20 switching elements oSa01 to oSa20 of the fourth multiplexer MUX-M3 and turns on the o1-1 to o1-20 switching elements oSa01 to oSa20.

Hence, the touch driving voltage Vtx is supplied to the 4-1 touch/common electrode T41 of a fourth row and a first column, the 3-2 touch/common electrode T32 of a third row and a second column, the 2-3 touch/common electrode T23 of a second row and a third column, the 1-4 touch/common electrode T14 of a first row and a fourth column, the 3-4 touch/common electrode T34 of the third row and a fourth column, and the 2-5 touch/common electrode T25 of a second row and a fifth column. The 3-1 touch/common electrode T31 of the third row and a first column is connected to the first input terminal 'a' of the first integrator I1, and the 4-2 touch/common electrode T42 of the fourth row and the second column is connected to the first input terminal 'a' of the second integrator I2. The 1-3 touch/common electrode T13 of the first row and the third column is connected to the first input terminal 'a' of the third integrator I3, and the 2-4 touch/common electrode T24 of the second row and the fourth column is connected to the first input terminal 'a' of the fourth integrator I4. The 3-5 touch/common electrode T35 of the third row and the fifth column is connected to the first input terminal 'a' of the fifth integrator I5.

As a result, as shown in FIG. 9C, sensing locations d11, d12, and d13 are obtained.

More specifically, as shown in FIG. 9B, the sensing location d11 shown in FIG. 9C is obtained by mutual capacitances generated between the 3-1 touch/common electrode T31 and the 3-2 touch/common electrode T32, between the 3-1 touch/common electrode T31 and the 4-1 touch/common electrode T41, between the 4-1 touch/common electrode T41 and the 4-2 touch/common electrode T42, and between the 4-2 touch/common electrode T42 and the 3-2 touch/common electrode T32.

Further, the sensing location d12 shown in FIG. 9C is obtained by mutual capacitances generated between the 1-3 touch/common electrode T13 and the 1-4 touch/common electrode T14, between the 1-3 touch/common electrode T13 and the 2-3 touch/common electrode T23, between the 2-3 touch/common electrode T23 and the 2-4 touch/common electrode T24, and between the 2-4 touch/common electrode T24 and the 1-4 touch/common electrode T14.

Further, the sensing location d13 shown in FIG. 9C is obtained by mutual capacitances generated between the 2-4 touch/common electrode T24 and the 2-5 touch/common electrode T25, between the 2-4 touch/common electrode T24 and the 3-4 touch/common electrode T34, between the 3-4 touch/common electrode T34 and the 3-5 touch/common electrode T35, and between the 3-5 touch/common electrode T35 and the 2-5 touch/common electrode T25.

Next, when the touch controller TC stops supplying the 4-1 switching control signal C41 and supplies the 4-2 switching control signal C42 to the fourth multiplexer MUX-M3 of the multiplexer MUX, the 4-2 switching control signal C42 is supplied to the control terminals of the o2-1 to o2-20 switching elements oSb01 to oSb20 of the fourth multiplexer MUX-M3 and turns on the o2-1 to o2-20 switching elements oSb01 to oSb20.

Hence, the touch driving voltage Vtx is supplied to the 3-1 touch/common electrode T31 of the third row and the first column, the 2-2 touch/common electrode T22 of the second row and the second column, the 4-2 touch/common electrode T42 of the fourth row and the second column, the 3-3 touch/common electrode T33 of the third row and the third column, the 2-4 touch/common electrode T24 of the second row and the fourth column, and the 1-5 touch/common electrode T15 of the first row and the fifth column. The 2-1 touch/common electrode T21 of the second row and the first column is connected to the first input terminal 'a' of the first integrator I1, and the 3-2 touch/common electrode T32 of the third row and the second column is connected to the first input terminal 'a' of the second integrator I2. The 4-3 touch/common electrode T43 of the fourth row and the third column is connected to the first input terminal 'a' of the third integrator I3, and the 1-4 touch/common electrode T14 of the first row and the fourth column is connected to the first input terminal 'a' of the fourth integrator I4. The 2-5 touch/common electrode T25 of the second row and the fifth column is connected to the first input terminal 'a' of the fifth integrator I5.

As a result, as shown in FIG. 9E, sensing locations d21, d22, and d23 are obtained.

More specifically, as shown in FIG. 9D, the sensing location d21 shown in FIG. 9E is obtained by mutual capacitances generated between the 2-1 touch/common electrode T21 and the 2-2 touch/common electrode T22, between the 2-1 touch/common electrode T21 and the 3-1 touch/common electrode T31, between the 3-1 touch/common electrode T31 and the 3-2 touch/common electrode T32, and between the 3-2 touch/common electrode T32 and the 2-2 touch/common electrode T22.

Further, the sensing location d22 shown in FIG. 9E is obtained by mutual capacitances generated between the 3-2 touch/common electrode T32 and the 3-3 touch/common electrode T33, between the 3-2 touch/common electrode T32 and the 4-2 touch/common electrode T42, between the 4-2 touch/common electrode T42 and the 4-3 touch/common electrode T43, and between the 4-3 touch/common electrode T43 and the 3-3 touch/common electrode T33.

Further, the sensing location d23 shown in FIG. 9E is obtained by mutual capacitances generated between the 1-4 touch/common electrode T14 and the 1-5 touch/common electrode T15, between the 1-4 touch/common electrode T14 and the 2-4 touch/common electrode T24, between the 2-4 touch/common electrode T24 and the 2-5 touch/common electrode T25, and between the 2-5 touch/common electrode T25 and the 1-5 touch/common electrode T15.

Next, when the touch controller TC stops supplying the 4-2 switching control signal C42 and supplies the 4-3 switching control signal C43 to the fourth multiplexer MUX-M3 of the multiplexer MUX, the 4-3 switching control signal C43 is supplied to the control terminals of the o3-1 to o3-20 switching elements oSc01 to oSc20 of the fourth multiplexer MUX-M3 and turns on the o3-1 to o3-20 switching elements oSc01 to oSc20.

Hence, the touch driving voltage Vtx is supplied to the 2-1 touch/common electrode T21 of the second row and the first column, the 1-2 touch/common electrode T12 of the first row and the second column, the 3-2 touch/common electrode T32 of the third row and the second column, the 2-3 touch/common electrode T23 of the second row and the third column, the 4-3 touch/common electrode T43 of the fourth row and the third column, and the 3-4 touch/common electrode T34 of the third row and the fourth column. The 1-1 touch/common electrode T11 of the first row and the first column is connected to the first input terminal 'a' of the first integrator I1, and the 2-2 touch/common electrode T22 of the second row and the second column is connected to the first input terminal 'a' of the second integrator I2. The 3-3 touch/common electrode T33 of the third row and the third column is connected to the first input terminal 'a' of the third integrator I3, and the 4-4 touch/common electrode T44 of the fourth row and the fourth column is connected to the first input terminal 'a' of the fourth integrator I4.

As a result, as shown in FIG. 9G, sensing locations d31, d32, and d33 are obtained.

More specifically, as shown in FIG. 9F, the sensing location d31 shown in FIG. 9G is obtained by mutual capacitances generated between the 1-1 touch/common electrode T11 and the 1-2 touch/common electrode T12, between the 1-1 touch/common electrode T11 and the 2-1 touch/common electrode T21, between the 2-1 touch/common electrode T21 and the 2-2 touch/common electrode T22, and between the 2-2 touch/common electrode T22 and the 1-2 touch/common electrode T12.

Further, the sensing location d32 shown in FIG. 9G is obtained by mutual capacitances generated between the 2-2 touch/common electrode T22 and the 2-3 touch/common electrode T23, between the 2-2 touch/common electrode T22 and the 3-2 touch/common electrode T32, between the 3-2 touch/common electrode T32 and the 3-3 touch/common electrode T33, and between the 3-3 touch/common electrode T33 and the 2-3 touch/common electrode T23.

Further, the sensing location d33 shown in FIG. 9G is obtained by mutual capacitances generated between the 3-3 touch/common electrode T33 and the 3-4 touch/common electrode T34, between the 3-3 touch/common electrode T33 and the 4-3 touch/common electrode T43, between the 4-3 touch/common electrode T43 and the 4-4 touch/common electrode T44, and between the 4-4 touch/common electrode T44 and the 3-4 touch/common electrode T34.

Next, when the touch controller TC stops supplying the 4-3 switching control signal C43 and supplies the 4-4 switching control signal C44 to the fourth multiplexer MUX-M3 of the multiplexer MUX, the 4-4 switching control signal C44 is supplied to the control terminals of the o4-1 to o4-20 switching elements oSd01 to oSd20 of the fourth multiplexer MUX-M3 and turns on the o4-1 to o4-20 switching elements oSd01 to oSd20.

Hence, the touch driving voltage Vtx is supplied to the 2-2 touch/common electrode T22 of the second row and the second column, the 1-3 touch/common electrode T13 of the first row and the third column, the 3-3 touch/common electrode T33 of the third row and the third column, the 2-4 touch/common electrode T24 of the second row and the fourth column, the 4-4 touch/common electrode T44 of the fourth row and the fourth column, and the 3-5 touch/common electrode T35 of the third row and the fifth column. The 1-2 touch/common electrode T12 of the first row and the second column is connected to the first input terminal 'a' of the second integrator I2, and the 2-3 touch/common electrode T23 of the second row and the third column is connected to the first input terminal 'a' of the third integrator I3. The 3-4 touch/common electrode T34 of the third row and the fourth column is connected to the first input terminal 'a' of the fourth integrator I4, and the 4-5 touch/common electrode T45 of the fourth row and the fifth column is connected to the first input terminal 'a' of the fifth integrator I5.

As a result, as shown in FIG. 9I, sensing locations d41, d42, and d43 are obtained.

More specifically, as shown in FIG. 9H, the sensing location d41 shown in FIG. 9I is obtained by mutual capacitances generated between the 1-2 touch/common electrode T12 and the 1-3 touch/common electrode T13, between the 1-2 touch/common electrode T12 and the 2-2 touch/common electrode T22, between the 2-2 touch/common electrode T22 and the 2-3 touch/common electrode T23, and between the 2-3 touch/common electrode T23 and the 1-3 touch/common electrode T13.

Further, the sensing location d42 shown in FIG. 9I is obtained by mutual capacitances generated between the 2-3 touch/common electrode T23 and the 2-4 touch/common electrode T24, between the 2-3 touch/common electrode T23 and the 3-3 touch/common electrode T33, between the 3-3 touch/common electrode T33 and the 3-4 touch/common electrode T34, and between the 3-4 touch/common electrode T34 and the 2-4 touch/common electrode T24.

Further, the sensing location d43 shown in FIG. 9I is obtained by mutual capacitances generated between the 3-4 touch/common electrode T34 and the 3-5 touch/common electrode T35, between the 3-4 touch/common electrode T34 and the 4-4 touch/common electrode T44, between the 4-4 touch/common electrode T44 and the 4-5 touch/common electrode T45, and between the 4-5 touch/common electrode T45 and the 3-5 touch/common electrode T35.

Figure 10:
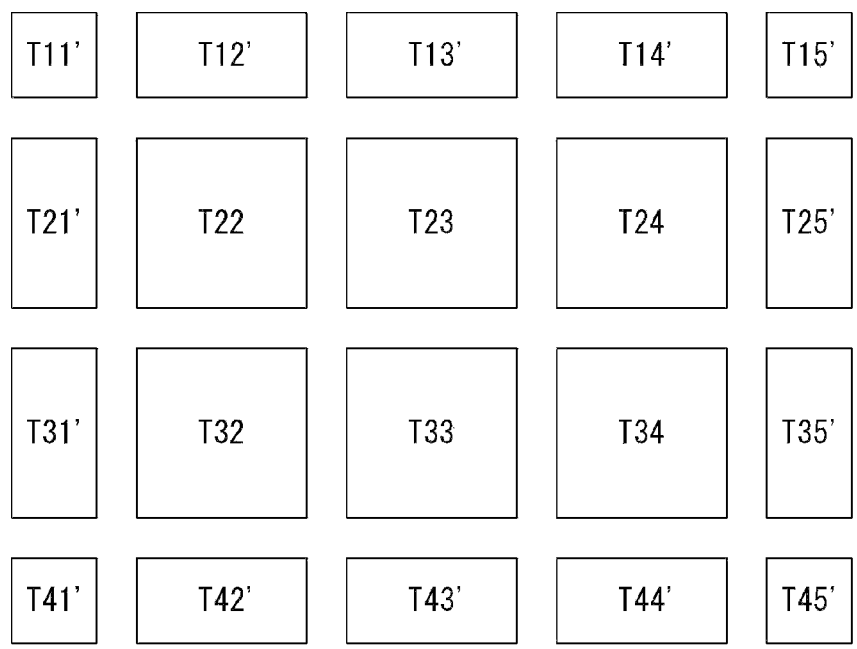
FIG. 10 is a plane view showing configuration of touch/common electrodes of a touch sensor integrated type display device according to another exemplary embodiment of the invention.
Figure 11:
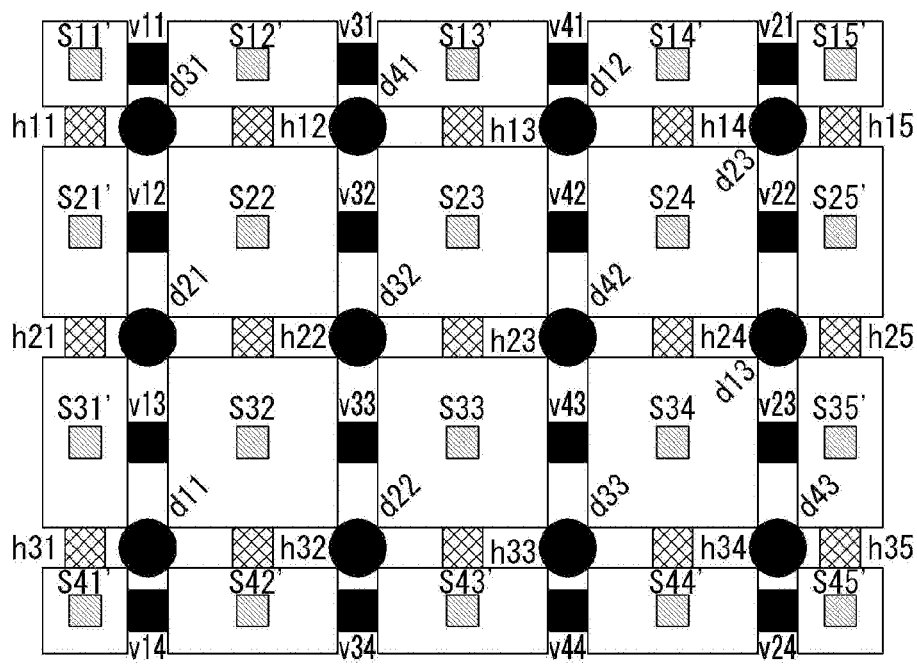
FIG. 11 is a plane view showing sensing locations obtained by the touch sensor integrated type display device shown in FIG. 10.

Next, a touch sensor integrated type display device according to a modified embodiment of the invention is described with reference to FIGS. 10 and 11. FIG. 10 is a plane view showing configuration of touch/common electrodes of a touch sensor integrated type display device according to a modified embodiment of the invention. FIG. 11 is a plane view showing sensing locations obtained by the touch sensor integrated type display device shown in FIG. 10.

Configuration of the touch sensor integrated type display device according to the modified embodiment of the invention shown in FIG. 10 is substantially the same as configuration of the touch sensor integrated type display device shown in FIG. 3, except that sizes of touch/common electrodes T11'-T15', T21', T25', T31', T35', and T41'-T45' disposed on the sides in FIG. 10 are smaller than sizes of the touch/common electrodes T11-T15, T21, T25, T31, T35, and T41-T45 shown in FIG. 5. Thus, a description of the touch sensor integrated type display device shown in FIG. 10 will not be repeated and may be briefly made or may be entirely omitted.

In the touch sensor integrated type display device according to the modified embodiment of the invention shown in FIG. 10, as shown in FIG. 11, a distance between sensing locations of each side and inside sensing locations decreases. Therefore, when the touch operation is performed on the sensing location positioned at an edge or each side, a touch resolution may increase.

The touch sensor integrated type display device according to the embodiments of the invention may be configured so that the size of the touch/common electrode is four or more times the size of the related art touch/common electrode while maintaining the touch resolution at the same level as the related art.

Figure 12A:
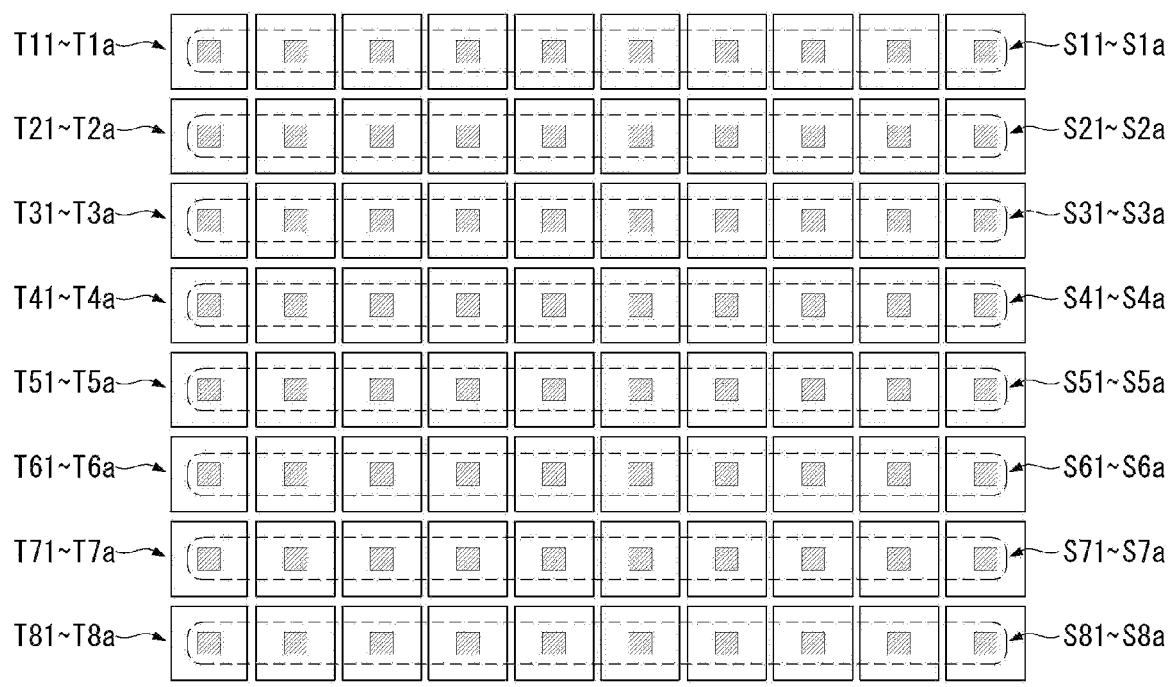
FIG. 12A is a plane view showing sensing locations obtained by a related art touch sensor integrated type display device.

A comparison between the touch sensor integrated type display device according to the embodiment of the invention and a related art touch sensor integrated type display device is described with reference to FIGS. 12A and 12B. FIG. 12A is a plane view showing touch/common electrodes and sensing locations of a related art touch sensor integrated type display device, and FIG. 12B is a plane view showing touch/common electrodes and sensing locations of the touch sensor integrated type display device according to the embodiment of the invention.

As shown in FIG. 12A, in the related art touch sensor integrated type display device, touch/common electrodes are arranged in the form of 10×8, and thus a total of 80 touch/common electrodes T11-T1a, T21-T2a, T31-T3a, T41-T4a, T51-T5a, T61-T6a, T71-T7a, and T81-T8a are disposed. Thus, a total number of sensing locations obtained by sensing the touch/common electrodes T11-T1a, T21-T2a, T31-T3a, T41-T4a, T51-T5a, T61-T6a, T71-T7a, and T81-T8a using the self-capacitive method is the same as the number of touch/common electrodes and is 80 (i.e., S11-S1a, S21-S2a, S31-S3a, S41-S4a, S51-S5a, S61-S6a, S71-S7a, and S81-S8a).

Figure 12B:
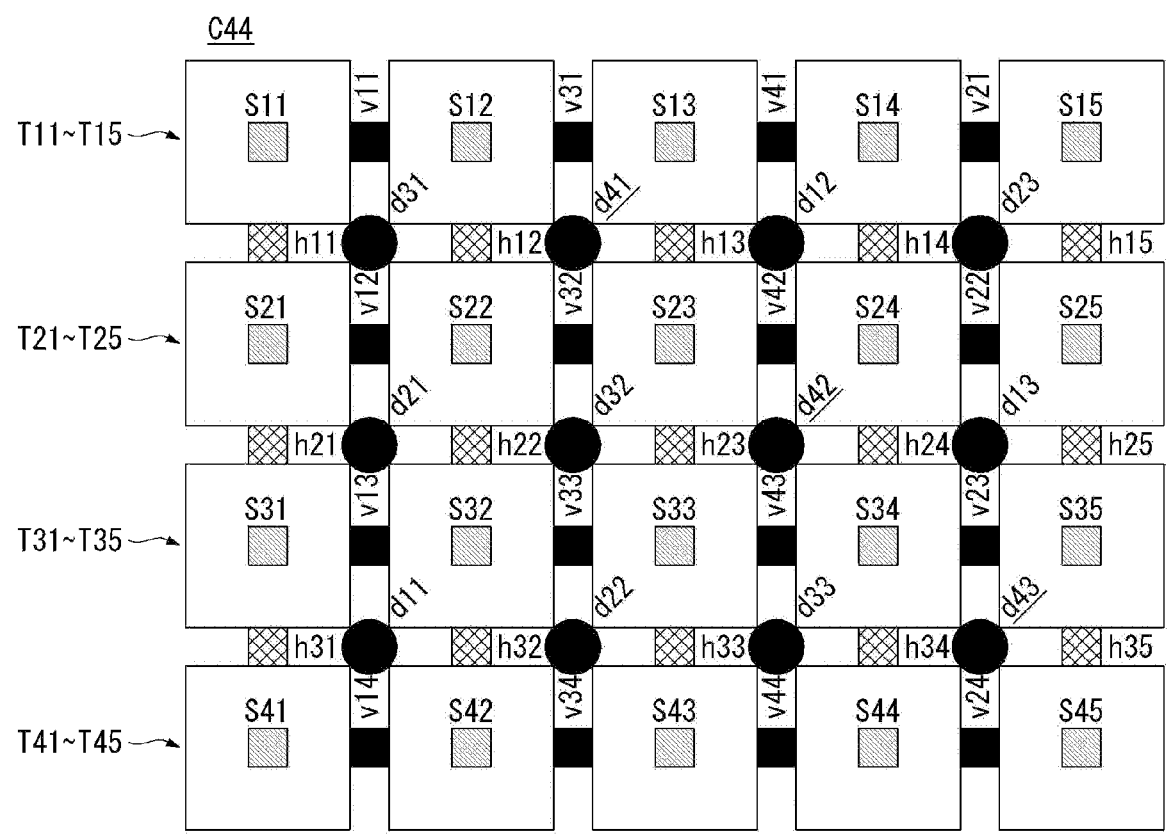
FIG. 12B is a plane view showing sensing locations obtained by a touch sensor integrated type display device according to an exemplary embodiment of the invention.

As shown in FIG. 12B, in the touch sensor integrated type display device according to the embodiment of the invention, the touch/common electrodes are arranged in the form of 5×4, and thus a total of 20 touch/common electrodes T11-T15, T21-T25, T31-T35, and T41-T45 are disposed. On the other hand, a total number of sensing locations obtained by sensing the touch/common electrodes T11-T15, T21-T25, T31-T35, and T41-T45 using the self-capacitive method and the mutual capacitive method is four times the number of touch/common electrodes and is 80 (i.e., S11-S15, S21-S25, S31-S35, S41-S45; h11-h15, h21-h25, h31-h35; v11-v14, v21-v24, v31-v34, v41-v44; and d11-d13, d21-d23, d31-d33, d41-d43).

As described above, because the size of the touch/common electrode in the touch sensor integrated type display device according to the embodiment of the invention is four or more times the size of the related art touch/common electrode, the embodiment of the invention can be applied to the large-screen display devices and also can reduce the number of touch channels of the readout IC, thereby reducing the manufacturing cost.

Further, even if the size of the touch/common electrode is four or more times the size of the related art touch/common electrode, the embodiment of the invention can obtain the touch resolution at the same level as the related art through the self-capacitive method and the first to third mutual capacitive methods.

Next, the touch/common electrodes of the touch sensor integrated type display device according to the embodiment of the invention are described in detail below with reference to FIGS. 5 and 13 to 15.

As shown in FIG. 5, each side of the touch/common electrodes T11 to T45 of the touch sensor integrated type display device according to the embodiment of the invention has linear type. In the touch sensor integrated type display device as shown in FIG. 5, when each touch/common electrode has a square of 4.5 mm×4.5 mm, a self capacitance value is measured at 9.96 pF per each touch/common electrode obtained by the self capacitive sensing method of the invention and a mutual capacitance value is measured at 0.094 pF per each touch/common electrode obtained by the mutual capacitive sensing method of the invention. As thus, the mutual capacitance value is merely about 0.9% of the self capacitance value. In the touch sensor integrated type display device having the rectangular touch/common electrode, it may make a difference on touch performance according to touch positions.

Therefore, it needs to increase mutual capacitance obtained by the mutual capacitive sensing method.

Figure 13:
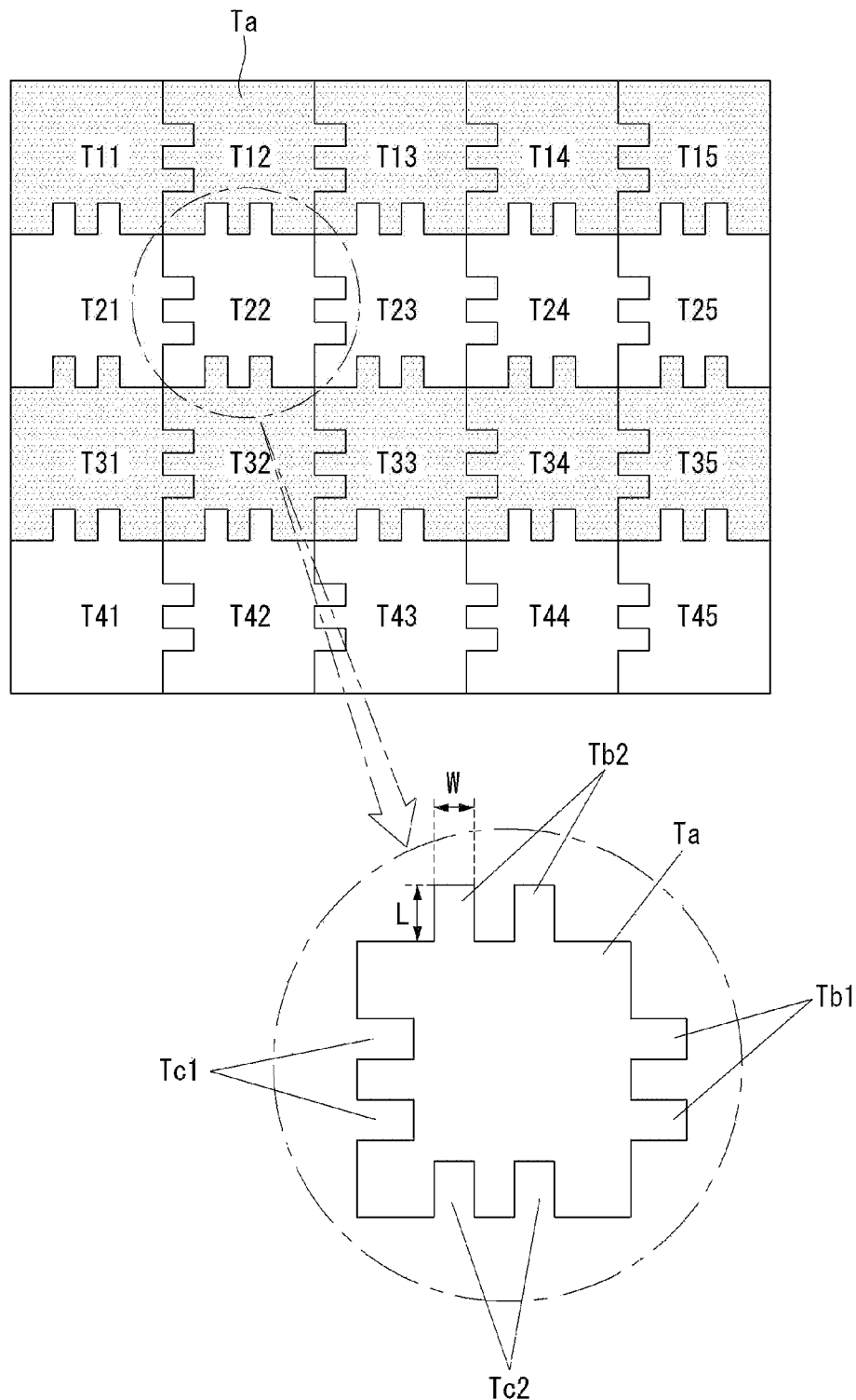
FIG. 13 is a plane view showing a first example of touch/common electrodes for increasing mutual capacitance of touch/common electrodes adjacent to each other.
Figure 14:
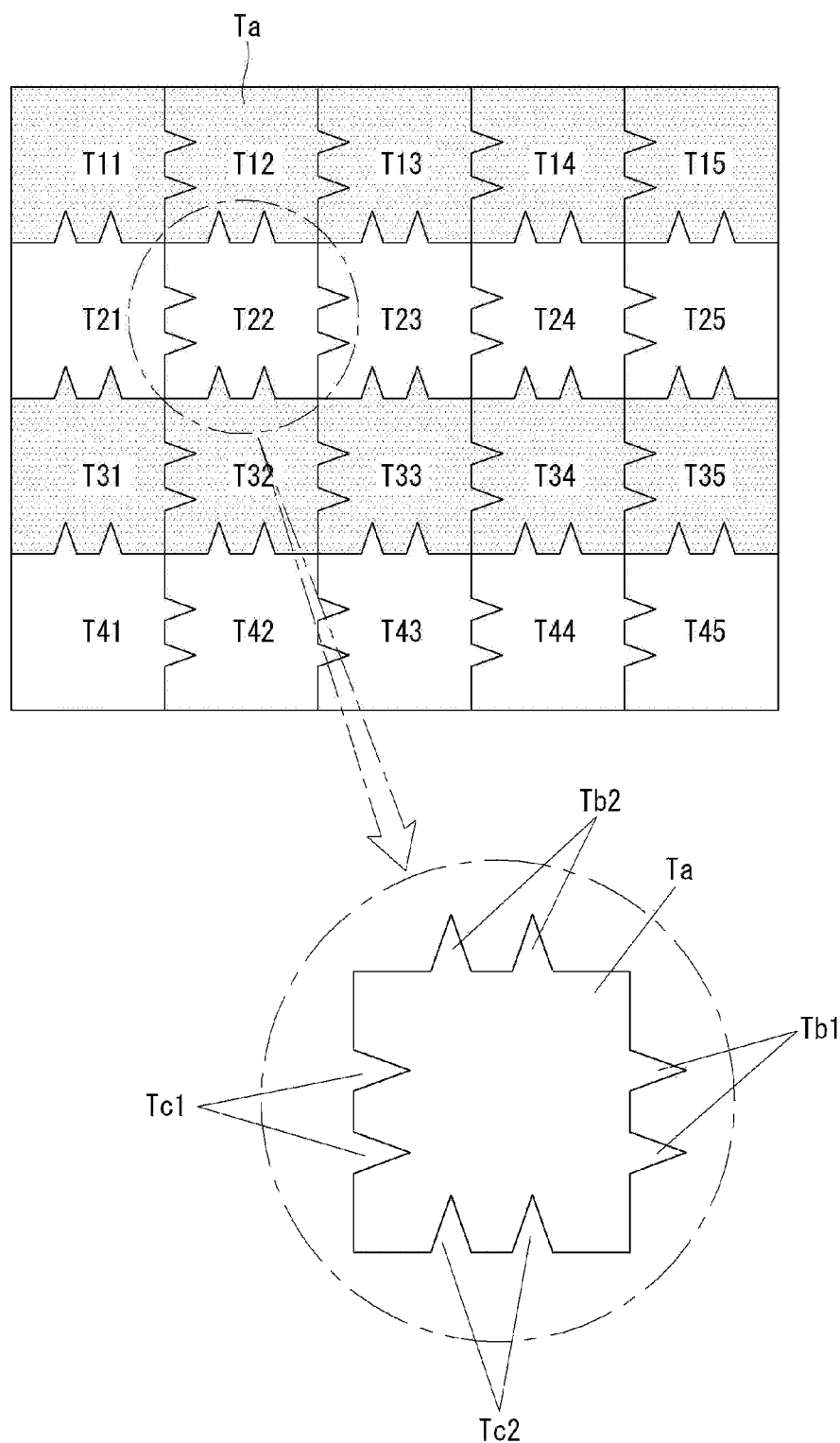
FIG. 14 is a plane view showing a second example of touch/common electrodes for increasing mutual capacitance of touch/common electrodes adjacent to each other.
Figure 15:
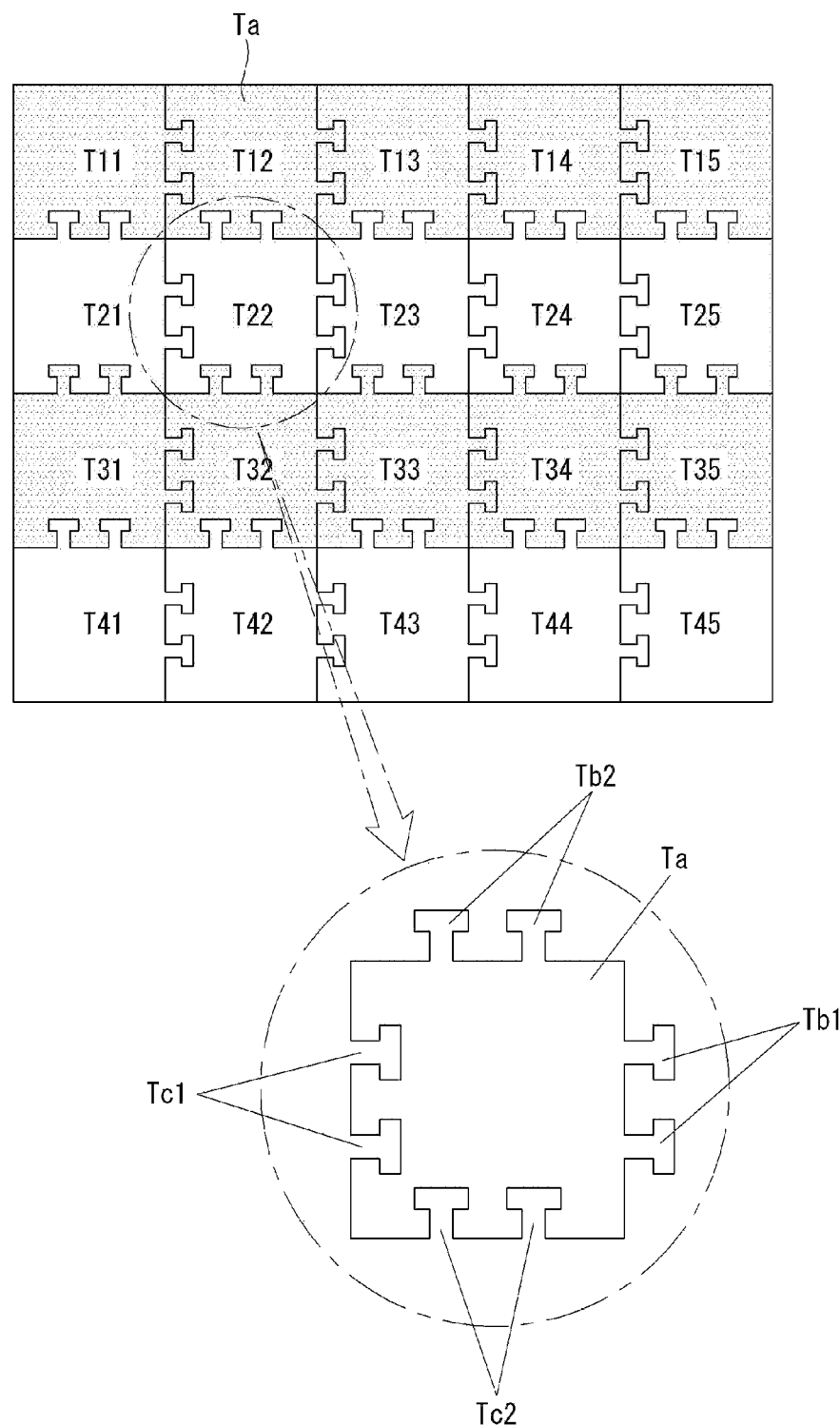
FIG. 15 is a plane view showing a third example of touch/common electrodes for increasing mutual capacitance of touch/common electrodes adjacent to each other.

FIGS. 13 to 15 are plane views showing various examples of the touch/common electrodes in the touch sensor integrated type display device according to an exemplary embodiment of the invention.

FIG. 13 is a plane view showing a first example of touch/common electrodes for increasing mutual capacitance of touch/common electrodes adjacent to each other. FIG. 14 is a plane view showing a second example of touch/common electrodes for increasing mutual capacitance of touch/common electrodes adjacent to each other. FIG. 15 is a plane view showing a third example of touch/common electrodes for increasing mutual capacitance of touch/common electrodes adjacent to each other.

Referring to FIGS. 13 to 15, each of the touch/common electrodes T11 to T45 includes a stem Ta, at least one branch Tb extended from the stem and at least one concave Tc formed towards inside of the stem Ta. The at least one branch Tb of one touch/common electrode is disposed in the at least one concave Tc of another touch/common electrode adjacent to the one touch/common electrode.

Figure 16:
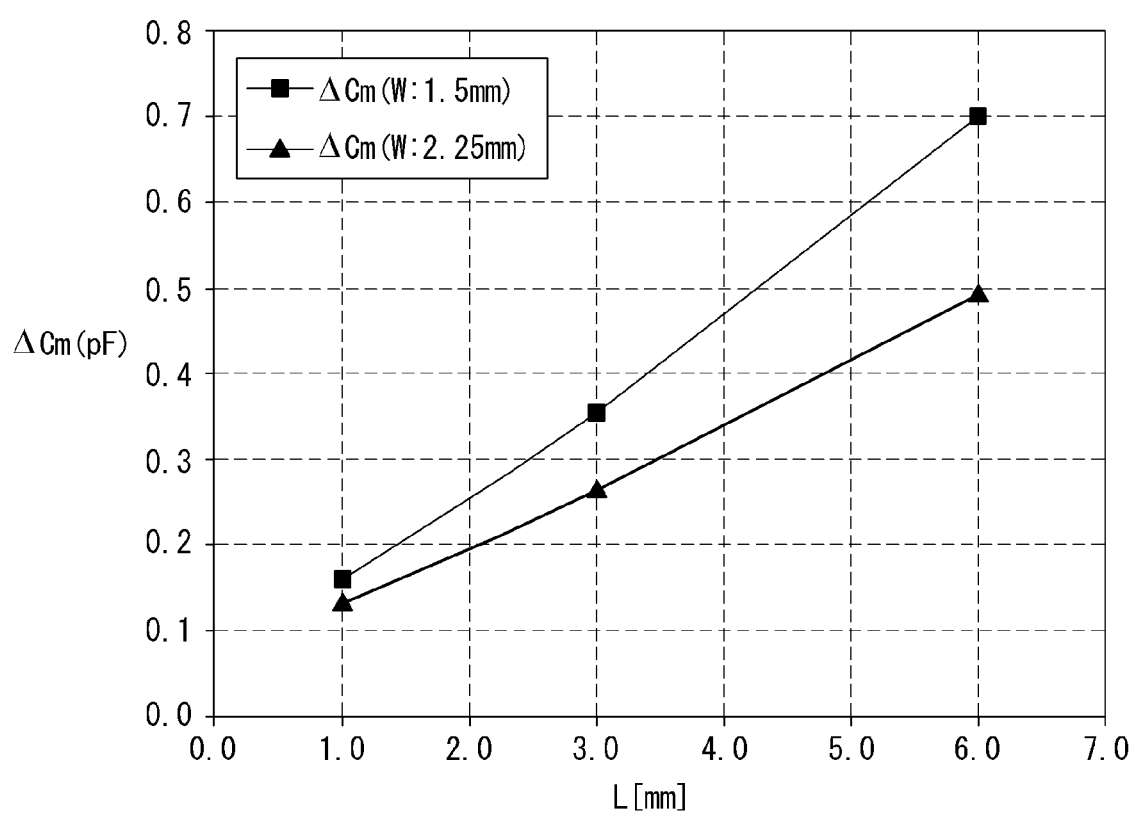
FIG. 16 is a graph showing mutual capacitance value according to variation of length and width of a branch of each touch/common electrode in a touch sensor integrated type display device according to an exemplary embodiment of the invention.

FIG. 16 is a graph showing mutual capacitance value according to variation of length and width of a branch of each touch/common electrode in a touch sensor integrated type display device according to an exemplary embodiment of the invention.

Hereinafter, a coupling configuration of touch/common electrodes adjacent to each other will be described, taking for example the touch/common electrode T22 disposed at a second row and a second column and touch/common electrodes T12, T21, T23 and T32 adjacent to the touch/common electrode T22.

In first concaves Tc1 of the first side (left side) of the touch/common electrode T22, first branches Tb1 of the touch/common electrode T21 disposed at the second row and a first column are disposed. Second branches Tb2 of the second side (upper side) of the touch/common electrode T22 are disposed in second concaves Tc2 of the touch/common electrode T12 disposed at the first row and the second column. First branches Tb1 of the third side (right side) of the touch/common electrode T22 are disposed in second concaves Tc1 of the touch/common electrode T23 disposed at the second row and a third column. In second concaves Tc2 of the fourth side (lower side) of the touch/common electrode T22, second branches Tb2 of the touch/common electrode T32 disposed at a third row and the second column are disposed.

In this way, the first and second branches Tb1 and Tb2 of one of the touch/common electrodes are disposed in the first and second concaves Tc1 and Tc2 of another touch/common electrode adjacent to one of the touch/common electrodes, respectively.

Lengths of sides of each touch/common electrode are increased by coupling construction in which the first and second branches Tb1 and Tb2 are disposed in the first and concaves Tc1 and Tc2 in touch/common electrodes adjacent to each other. Accordingly, it is possible to obtain an improved touch resolution because the mutual capacitance between the adjacent touch/common electrodes is increased.

Table 1 shows value of mutual capacitance measured by the mutual capacitive sensing method of the invention, when the branch Tb1 and Tb2 of the touch/common electrode having a size of 4.5 mm×9.0 mm, widths (W) of 1.5 mm and 2.25 mm and lengths (L) of 1.0 mm, 3.0 mm, and 6.0 mm. In the table 1, Cm represents a first mutual capacitance between the touch/common electrodes before a touch event, Cm' represents a second mutual capacitance between the touch/common electrodes after the touch event, and ΔCm represents a third mutual capacitance which is a difference between the first mutual capacitance Cm and the second mutual capacitance Cm'. The units of Cm, Cm' and ΔCm are pF.

TABLE 1

|  |  | 1.0 mm (L) |  | 3.0 mm (L) |  | 6.0 mm (L) |
|---|---|---|---|---|---|---|
| 1.5 mm (W) | Cm | 0.93 | Cm | 2.01 | Cm | 3.71 |
|  | Cm' | 0.77 | Cm' | 1.65 | Cm' | 3.01 |
|  | ΔCm | 0.16 | ΔCm | 0.35 | ΔCm | 0.70 |
| 2.25 mm (W) | Cm | 0.75 | Cm | 1.48 | Cm | 2.62 |
|  | Cm' | 0.62 | Cm' | 1.21 | Cm' | 2.12 |
|  | ΔCm | 0.13 | ΔCm | 0.26 | ΔCm | 0.50 |

Table 1 can be illustrated as shown in FIG. 16. FIG. 16 is a graph showing mutual capacitance value according to variation of length and width of a branch of each touch/common electrode in a touch sensor integrated type display device according to an exemplary embodiment of the invention.

As known from the table 1 and FIG. 16, the final mutual capacitance ΔCm (that is, difference between the first mutual capacitance Cm and the second mutual capacitance Cm') increases in proportion to the length of the branch of the touch/common electrode, and decreases in inverse proportion to the width of the branch of the touch/common electrode.

Also, the third mutual capacitance ΔCm obtained from the touch/common electrode shown in FIG. 13 has a range of 0.13 pF to 0.70 pF. Accordingly, the third mutual capacitance ΔCm of the invention increase to 1.5 to 7.4 times than that of the related art because the third mutual capacitance ΔCm of the related art is 0.094 pF.

Although embodiments have been described with reference to a number of illustrative embodiments thereof, it should be understood that numerous other modifications and embodiments can be devised by those skilled in the art that will fall within the scope of the principles of this disclosure. For example, in the embodiments of the invention, the touch/common electrodes are arranged in the form of 4×5, but the arrangement of the touch/common electrodes is merely an example. The arrangement of the touch/common electrodes may be variously changed, if necessary or desired. Thus, various variations and modifications are possible in the component parts and/or arrangements of the subject combination arrangement within the scope of the disclosure, the drawings and the appended claims.

What is claimed is:

1. A touch sensor integrated display device comprising:
a display panel including a plurality of data lines and a plurality of gate lines that cross the plurality of data lines, a plurality of touch/common electrodes arranged in a plurality of rows and a plurality of columns, and a plurality of touch/common routing wires that are each connected to a corresponding one of the plurality of touch/common electrodes, the display panel being time-division driven in one frame period including a display driving period for displaying an image on the display panel and a plurality of touch driving periods, the plurality of touch driving periods including a first touch driving period and a second touch driving period, a touch of the display panel sensed during at least one of the first touch driving period and the second touch driving period;
a multiplexing unit configured to supply a common voltage to the plurality of touch/common electrodes during the display driving period of the one frame period of the display panel to display the image on the display panel, and the multiplexing unit configured to supply a touch driving voltage to the plurality of touch/common electrodes during the plurality of touch driving periods to sense the touch of the display panel during the one frame period, and the multiplexing unit sensing the plurality of touch/common electrodes using a self-capacitive touch sensing during the first touch driving period of the one frame period of the display panel and a mutual capacitive touch sensing during the second touch driving period of the one frame period of the display panel;
wherein the self-capacitive touch sensing includes the plurality of touch/common electrodes receiving the touch driving voltage via the plurality of touch/common routing wires and sensing first sensing voltages from the plurality of touch/common electrodes via the plurality of touch/common routing wires based on the touch driving voltage, and
wherein the mutual capacitive touch sensing includes a first plurality of touch/common electrodes from the plurality of touch/common electrodes receiving the touch driving voltage via a first plurality of touch/common routing wires from the plurality of touch/common routing wires that are connected to the first plurality of touch/common electrodes, and sensing second sensing voltages via a second plurality of touch/common electrodes from the plurality of touch/common electrodes based on the touch driving voltage; and
a touch controller configured to calculate a touch location based on the first sensing voltages from the plurality of touch/common electrodes during the self-capacitive touch sensing, or calculate a touch location based on the second sensing voltages from the second plurality of touch/common electrodes during the mutual capacitive touch sensing.

2. The touch sensor integrated display device of claim 1, further comprising:
a switching block connected to the multiplexing unit and configured to switch between supplying the common voltage to the plurality of touch/common electrodes during the display driving period and supplying the touch driving voltage to the plurality of touch/common electrodes during the first touch driving period and the second touch driving period, and outputting the first sensing voltages and the second sensing voltages;
an integrating block connected to the switching block and configured to integrate the first sensing voltages and the second sensing voltages supplied from the switching block during the first touch driving period and the second touch driving period and output integrated first sensing voltages and integrated second sensing voltages;
a readout integrated circuit (IC) configured to receive the integrated first sensing voltages and the integrated second sensing voltages from the integrating block and output the integrated first sensing voltages and the integrated second sensing voltages to the touch controller that calculates the touch location based on the integrated first sensing voltages and the integrated second sensing voltages; and
a timing controller configured to generate timing control signals for controlling operation timings of a data driving circuit configured to supply video data voltages to the plurality of data lines during the display driving period and a scan driving circuit configured to sequentially supply scan pulses synchronized with the video data voltages to the plurality of gate lines during the display driving period, and a touch/display control signal for controlling the switching block.

3. The touch sensor integrated display device of claim 2, wherein the multiplexing unit includes a first multiplexer for having input terminals connected to the plurality of touch/common electrodes,
wherein the switching block includes a plurality of switching units selectively connected to output terminals of the first multiplexer, each of the plurality switching units configured to switch between outputting the common voltage or the touch driving voltage; and
wherein the integrating block includes a plurality of integrators that are each connected to a corresponding one of the plurality of switching units.

4. The touch sensor integrated display device of claim 3, wherein during the first touch driving period the first multiplexer supplies the touch driving voltage outputted by the plurality of switching units to the plurality of touch/common electrodes via the plurality of touch/common routing wires and receives via the plurality of touch/common routing wires the first sensing voltages from the plurality of touch/common electrodes responsive to the plurality of touch/common electrodes receiving the touch driving voltage.

5. The touch sensor integrated display device of claim 4, wherein the first multiplexer includes:
a plurality of first switching elements respectively connected to the plurality of touch/common electrodes and configured to perform a first switching operation of signals outputted to the plurality of touch/common electrodes in response to a first switching control signal received from the touch controller, wherein the first switching operation includes turning on the plurality of first switching elements in response to the first switching control signal;
a plurality of second switching elements respectively connected to the plurality of touch/common electrodes and configured to perform a second switching operation of the signals outputted to the plurality of touch/common electrodes in response to a second switching control signal supplied from the touch controller, wherein the second switching operation includes turning on the plurality of second switching elements in response to the second switching control signal;

a plurality of third switching elements respectively connected to the plurality of touch/common electrodes and configured to perform a third switching operation of the signals outputted to the plurality of touch/common electrodes in response to a third switching control signal supplied from the touch controller, wherein the third switching operation includes turning on the plurality of third switching elements in response to the third switching control signal; and a plurality of fourth switching elements respectively connected to the plurality of touch/common electrodes and configured to perform a fourth switching operation of the signals outputted to the plurality of touch/common electrodes in response to a fourth switching control signal supplied from the touch controller, wherein the fourth switching operation includes turning on the plurality of fourth switching elements in response to the fourth switching control signal.

6. The touch sensor integrated display device of claim 5, wherein the multiplexing unit includes a second multiplexer having input terminals connected to the plurality of touch/common electrodes and output terminals selectively connected to the plurality of integrators.

7. The touch sensor integrated display device of claim 6, wherein the second multiplexer, during the second touch driving period, supplies the touch driving voltage outputted by the plurality of switching units to the first plurality of touch/common electrodes positioned in a first row of the plurality of rows, and outputs the second sensing voltages sensed from the second plurality of touch/common electrodes positioned in a second row of the plurality of rows that is directly adjacent to the first row.

8. The touch sensor integrated display device of claim 7, wherein the second multiplexer includes:

a plurality of first switching elements respectively connected to the plurality of touch/common electrodes and configured to perform a first switching operation of signals outputted to the plurality of touch/common electrodes in response to a first switching control signal supplied from the touch controller, wherein the first switching operation includes turning on the plurality of first switching elements in response to the first switching control signal;

a plurality of second switching elements respectively connected to the plurality of touch/common electrodes and configured to perform a second switching operation of the signals outputted to the plurality of touch/common electrodes in response to a second switching control signal supplied from the touch controller, wherein the second switching operation includes turning on the plurality of second switching elements in response to the second switching control signal; and a plurality of third switching elements respectively connected to the plurality of touch/common electrodes and configured to perform a third switching operation of the signals outputted to the plurality of touch/common electrodes in response to a third switching control signal supplied from the touch controller, wherein the third switching operation includes turning on the plurality of third switching elements in response to the third switching control signal.

9. The touch sensor integrated display device of claim 7, wherein the multiplexing unit includes a third multiplexer having input terminals connected to the plurality of touch/common electrodes and output terminals selectively connected to the plurality of integrators.

10. The touch sensor integrated display device of claim 9, wherein the third multiplexer, during the second touch driving period, supplies the touch driving voltage outputted by the plurality of switching units to the first plurality of touch/common electrodes positioned in a first column of the plurality of columns and outputs the second sensing voltages sensed from the second plurality of touch/common electrodes positioned in a second column of the plurality of columns that is directly adjacent to the first column.

11. The touch sensor integrated display device of claim 10, wherein the third multiplexer includes:

a plurality of first switching elements respectively connected to the plurality of touch/common electrodes and configured to perform a first switching operation of signals outputted to the plurality of touch/common electrodes in response to a first switching control signal supplied from the touch controller, wherein the first switching operation includes turning on the plurality of first switching elements in response to the fourth switching control signal;

a plurality of second switching elements respectively connected to the plurality of touch/common electrodes and configured to perform a second switching operation of the signals outputted to the plurality of touch/common electrodes in response to a fifth switching control signal supplied from the touch controller, wherein the second switching operation includes turning on the plurality of second switching elements in response to the fifth switching control signal;

a plurality of second switching elements respectively connected to the plurality of touch/common electrodes and configured to perform a third switching operation of the signals outputted to the plurality of touch/common electrodes in response to a sixth switching control signal supplied from the touch controller, wherein the third switching operation includes turning on the plurality of second switching elements in response to the sixth switching control signal; and a plurality of third switching elements respectively connected to the plurality of touch/common electrodes and configured to perform a fourth switching operation of the signals outputted to the plurality of touch/common electrodes in response to an seventh switching control signal supplied from the touch controller, wherein the fourth switching operation includes turning on the plurality of third switching elements in response to the seventh switching control signal.

12. The touch sensor integrated display device of claim 10, wherein the multiplexing unit includes a fourth multiplexer having input terminals connected to the plurality of touch/common electrodes and output terminals selectively connected to the plurality of integrators.

13. The touch sensor integrated display device of claim 12, wherein the fourth multiplexer, during the second touch driving period, supplies the touch driving voltage outputted by the plurality of switching units to a first touch/common electrode from the first plurality of touch/common electrodes and a second touch/common electrode from the first plurality of touch/common electrodes that are diagonally adjacent to each other and respectively located in different first rows of the plurality of rows and different first columns of the plurality of columns of the display panel, and outputs the second sensing voltages sensed from a third touch/common electrode from the second plurality of touch/ common electrodes and a fourth touch/common electrode from the second plurality of touch/common electrodes that are each directly adjacent to both the first touch/common electrode and the second touch/common electrode, and the third touch/common electrode and the fourth touch/common electrode are diagonally adjacent to each other and respectively located in different second rows of the plurality of rows and different second columns of the plurality of columns of the display panel.

14. The touch sensor integrated display device of claim 13, wherein the fourth multiplexer includes:
 a plurality of first switching elements respectively connected to the plurality of touch/common electrodes and configured to perform a first switching operation of signals outputted to the plurality of touch/common electrodes in response to a first switching control signal supplied from the touch controller, wherein the first switching operation includes turning on the plurality of first switching elements in response to the first switching control signal;
 a plurality of second switching elements respectively connected to the plurality of touch/common electrodes and configured to perform a second switching operation of the signals outputted to the plurality of touch/common electrodes in response to a second switching control signal supplied from the touch controller, wherein the second switching operation includes turning on the plurality of second switching elements in response to the second switching control signal;
 a plurality of third switching elements respectively connected to the plurality of touch/common electrodes and configured to perform a third switching operation of the signals outputted to the plurality of touch/common electrodes in response to a third switching control signal supplied from the touch controller, wherein the third switching operation includes turning on the plurality of third switching elements in response to the third switching control signal; and
 a plurality of fourth switching elements respectively connected to the plurality of touch/common electrodes and configured to perform a fourth switching operation of the signals outputted to the plurality of touch/common electrodes in response to a fourth switching control signal supplied from the touch controller, wherein the fourth switching operation includes turning on the plurality of fourth switching elements in response to the fourth switching control signal.

15. The touch sensor integrated display device of claim 13, wherein the plurality of integrators integrate the first sensing voltages to the second sensing voltages and output the integrated first sensing voltages to the integrated second sensing voltages to the readout IC.

16. The touch sensor integrated display device of claim 1, wherein touch/common electrodes of the plurality of touch/common electrodes that are positioned along sides of the display panel are smaller than the remaining touch/common electrodes.

17. The touch sensor integrated display device of claim 1, wherein each of the plurality of touch/common electrodes includes a stem, at least one branch that extends outward from the stem and at least one concave portion formed inside the stem, wherein the at least one branch is disposed in a concave portion of another touch/common electrode that is adjacent to the touch/common electrode.

18. The touch sensor integrated display device of claim 17, wherein the at least one branch has one shape of a rectangular shape, a sawtooth shape, a T character shape, and a reverse T character shape.

19. The touch sensor integrated display device of claim 17, wherein the plurality of touch/common electrodes have a same size.

20. The touch sensor integrated display device of claim 17, wherein touch/common electrodes of the plurality of touch/common electrodes positioned along sides of the display panel are smaller than the remaining touch/common electrodes.

* * * * *